United States Patent [19]

Tarnay et al.

[11] 4,420,811
[45] Dec. 13, 1983

[54] WATER TEMPERATURE AND FLOW RATE SELECTION DISPLAY AND CONTROL SYSTEM AND METHOD

[75] Inventors: Matthew G. Tarnay, Pasadena; John T. LaBelle, Long Beach, both of Calif.

[73] Assignee: Price-Pfister Brass Mfg. Co., Pacoima, Calif.

[21] Appl. No.: 231,727

[22] Filed: Feb. 5, 1981

Related U.S. Application Data

[63] Continuation-in-part of Ser. No. 126,325, Mar. 3, 1980, abandoned.

[51] Int. Cl.³ .............................................. G06F 15/46
[52] U.S. Cl. .................................... 364/510; 364/502; 137/561 R
[58] Field of Search ........................ 364/510, 557, 479; 137/2, 8, 79, 80, 337, 468, 561 R, 564, 560, 3, 101.19, 101.21, 487.5; 222/54; 236/12 R, 12 A, 12 M; 73/199

[56] References Cited

U.S. PATENT DOCUMENTS

| | | | |
|---|---|---|---|
| 3,474,438 | 10/1969 | Lauher | 340/722 X |
| 3,878,376 | 4/1975 | Sholes, Jr. et al. | 364/509 |
| 3,940,600 | 2/1976 | Alexander et al. | 364/502 X |
| 4,001,807 | 1/1977 | Dallimonti | 340/525 X |
| 4,074,354 | 2/1978 | Nakagawa et al. | 364/510 X |
| 4,202,211 | 5/1980 | Perry | 364/510 X |
| 4,215,409 | 7/1980 | Strowe | 364/510 |
| 4,250,747 | 2/1981 | Diprose et al. | 364/510 X |
| 4,262,686 | 4/1981 | Heim et al. | 137/101.19 X |
| 4,275,822 | 6/1981 | Juffa | 364/479 X |
| 4,277,832 | 7/1981 | Wong | 364/510 |

OTHER PUBLICATIONS

Control System; J. F. McCabe et al; IBM Technical Disclosure Bulletin; vol. 12, No. 12, May 1970, p. 2064.

*Primary Examiner*—Edward J. Wise
*Attorney, Agent, or Firm*—Fred Flam; Leonard Tachner

[57] ABSTRACT

Apparatus and method for selecting, displaying and automatically controlling water flow rates and temperatures at the outlets of devices used in plumbing fixtures such as sinks, bathtubs, showers, or lavatories; the apparatus includes a temperature sensor at the water output, a control panel for selecting desired output water temperatures and flow rates, a comparator for comparing the selected temperature to the output temperature, and for generating signals to control separate hot and cold water valves to achieve and automatically maintain, within limits, any desired combination of flow rate and temperature. In one embodiment the comparator is embodied in a microprocessor which receives a digital signal representative of the actual water temperature, and generates a modified signal to adjust hot and cold water flow to the output means until the actual output temperature matches the selected temperature within a small error range while maintaining flow rate at a constant level.

10 Claims, 39 Drawing Figures

E = TEMPERATURE ERROR
Er = RATE OF CHANGE OF ERROR
Em = MAGNITUDE OF ERROR
Ei = INTEGRAL OF ERROR

Ec = COMPOSITE ERROR
Hv = COMMAND TO HOT WATER VALVE
Cv = COMMAND TO COLD WATER VALVE

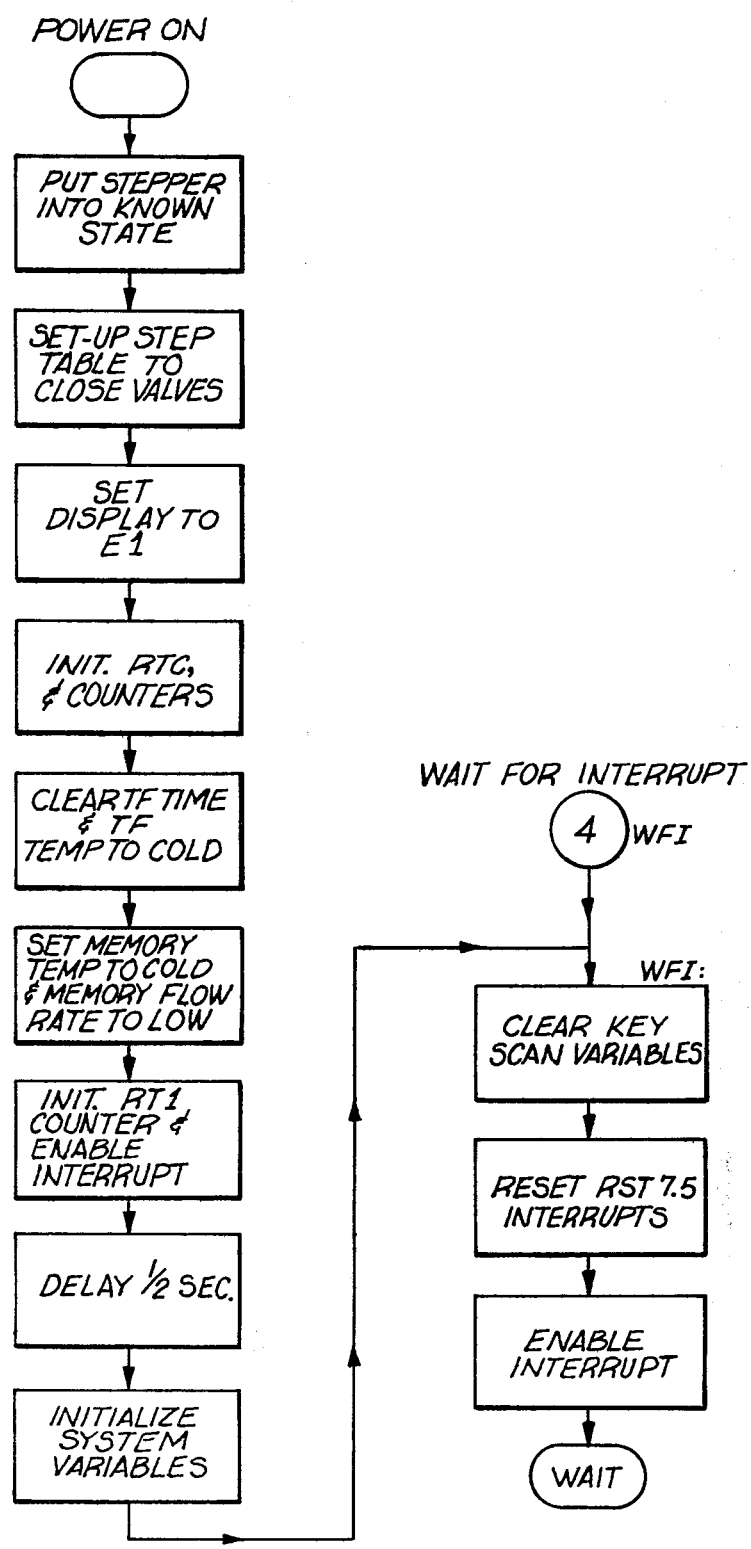

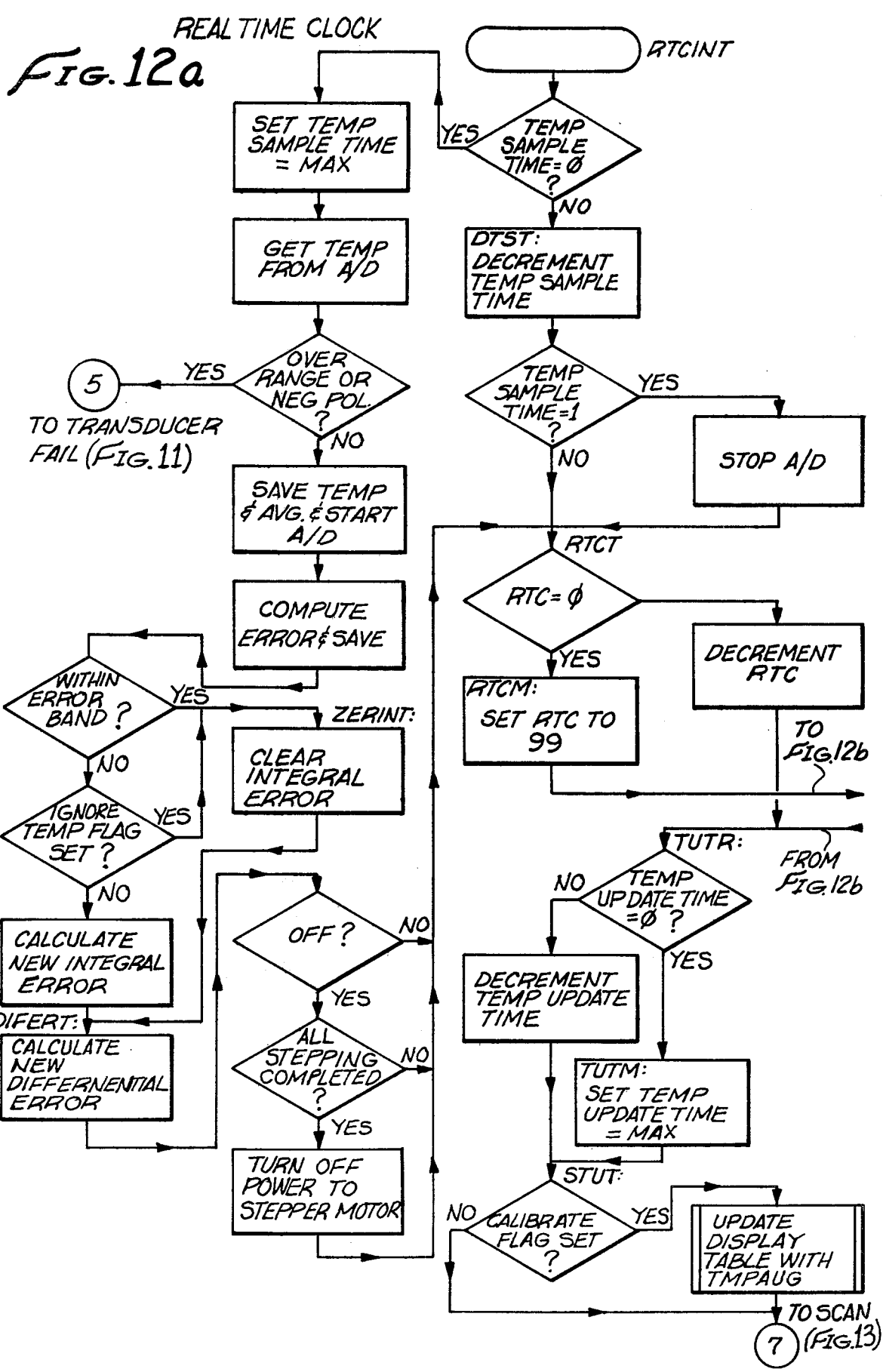

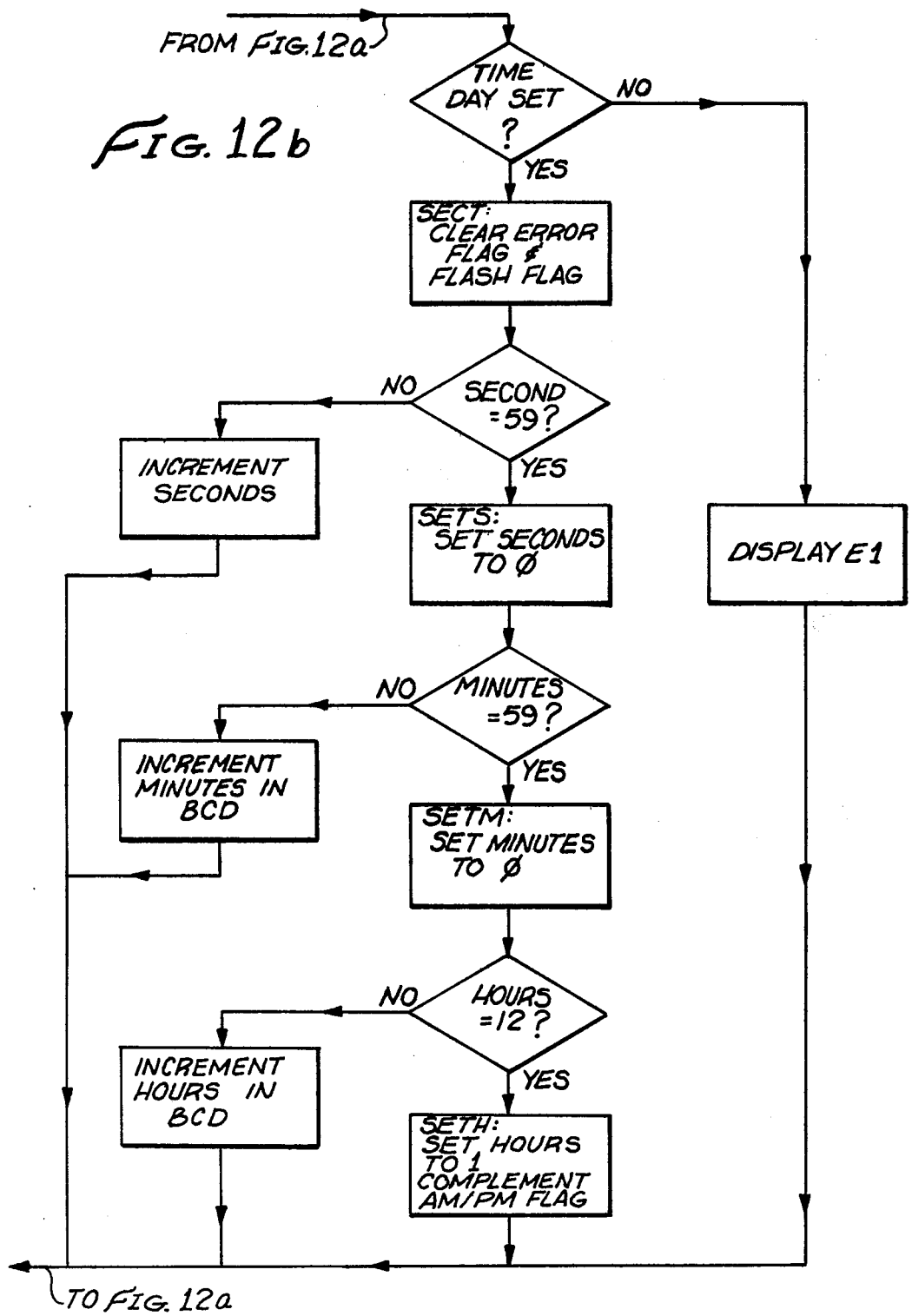

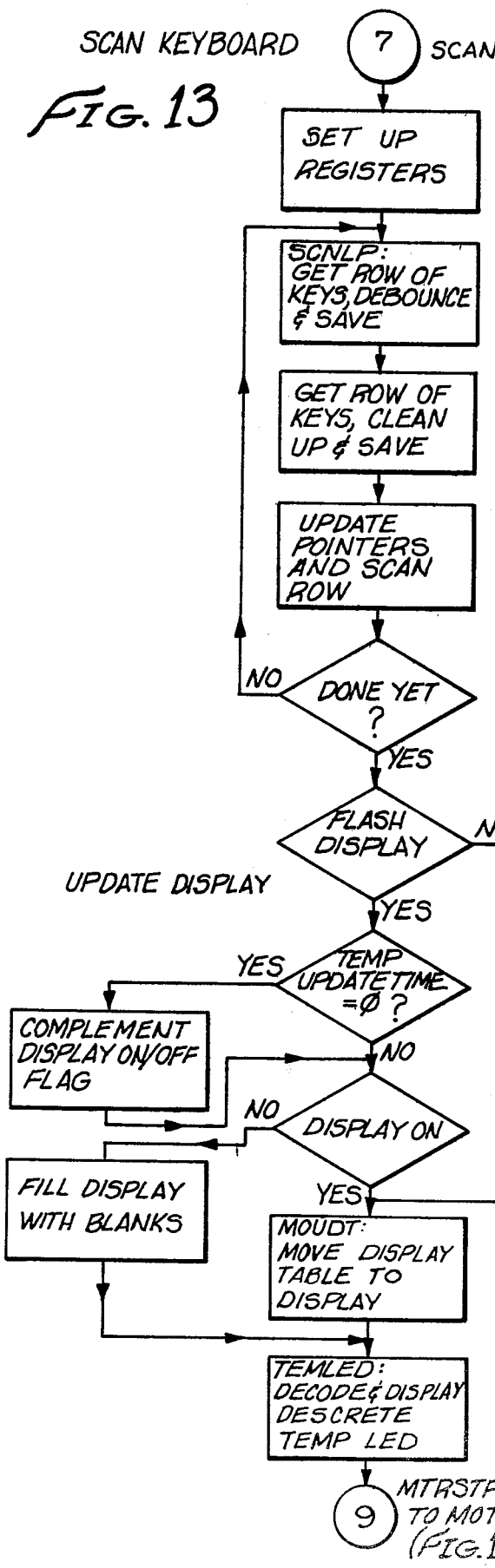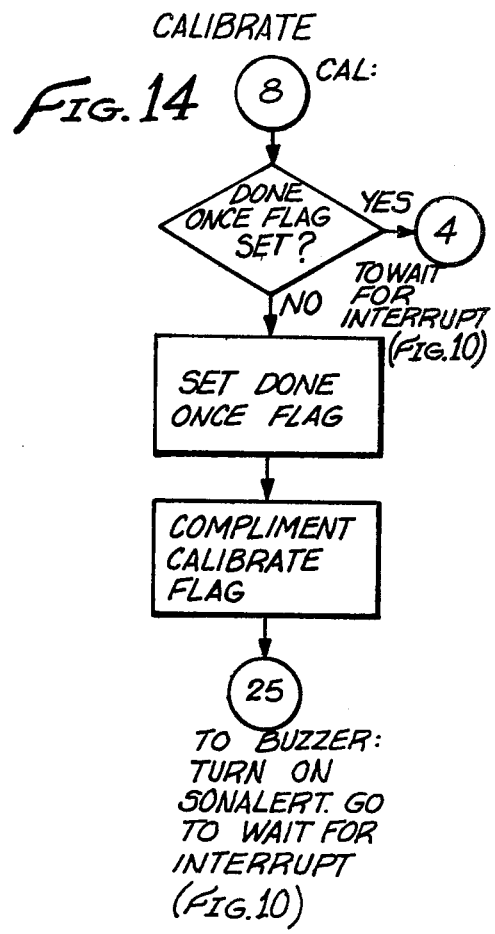

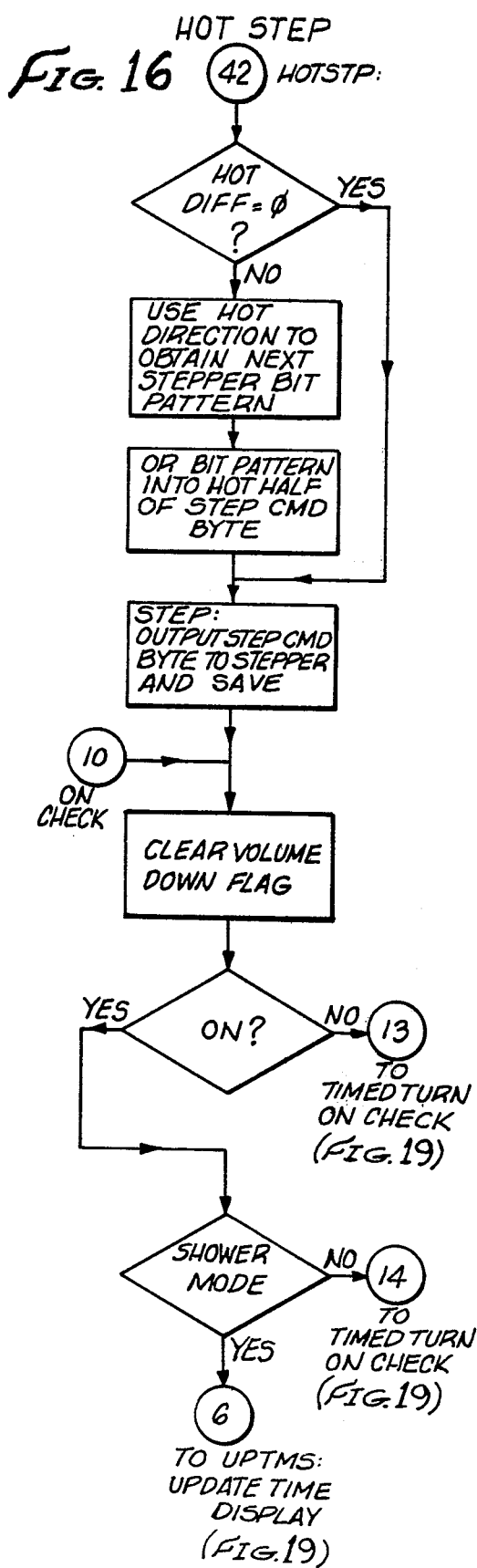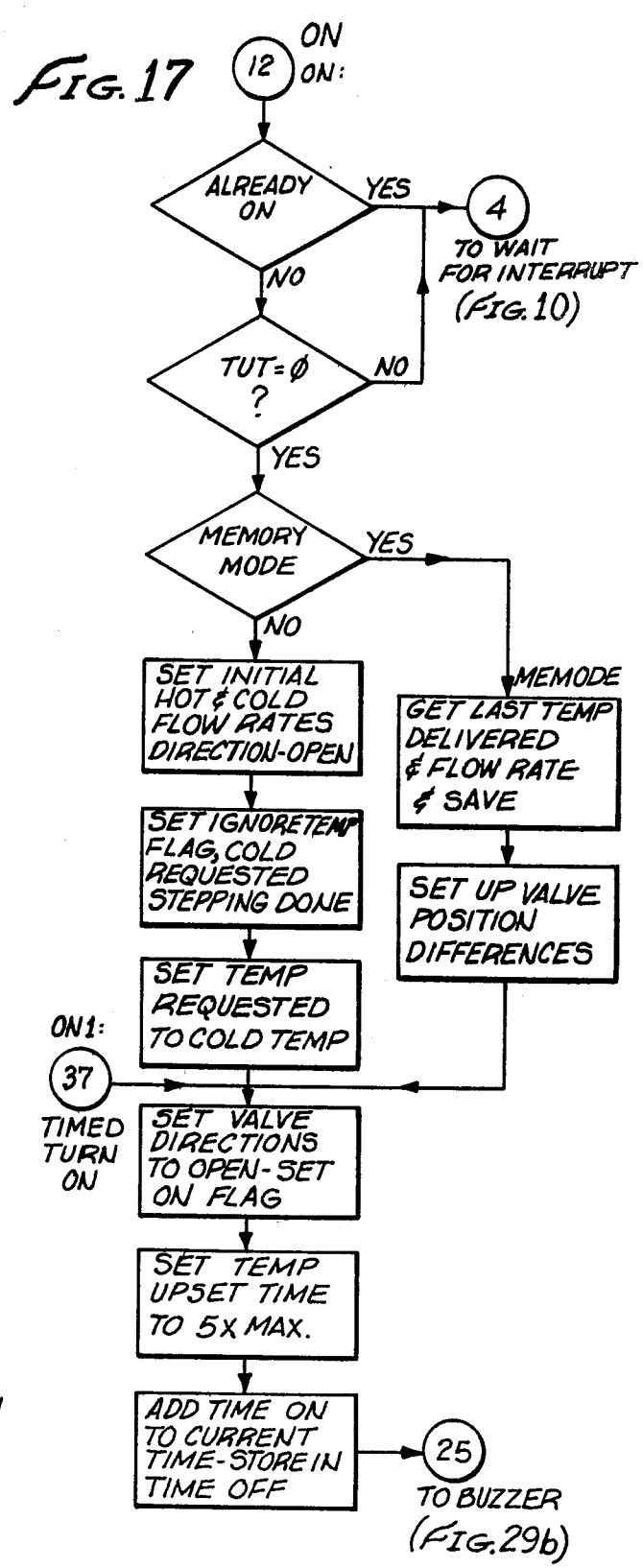

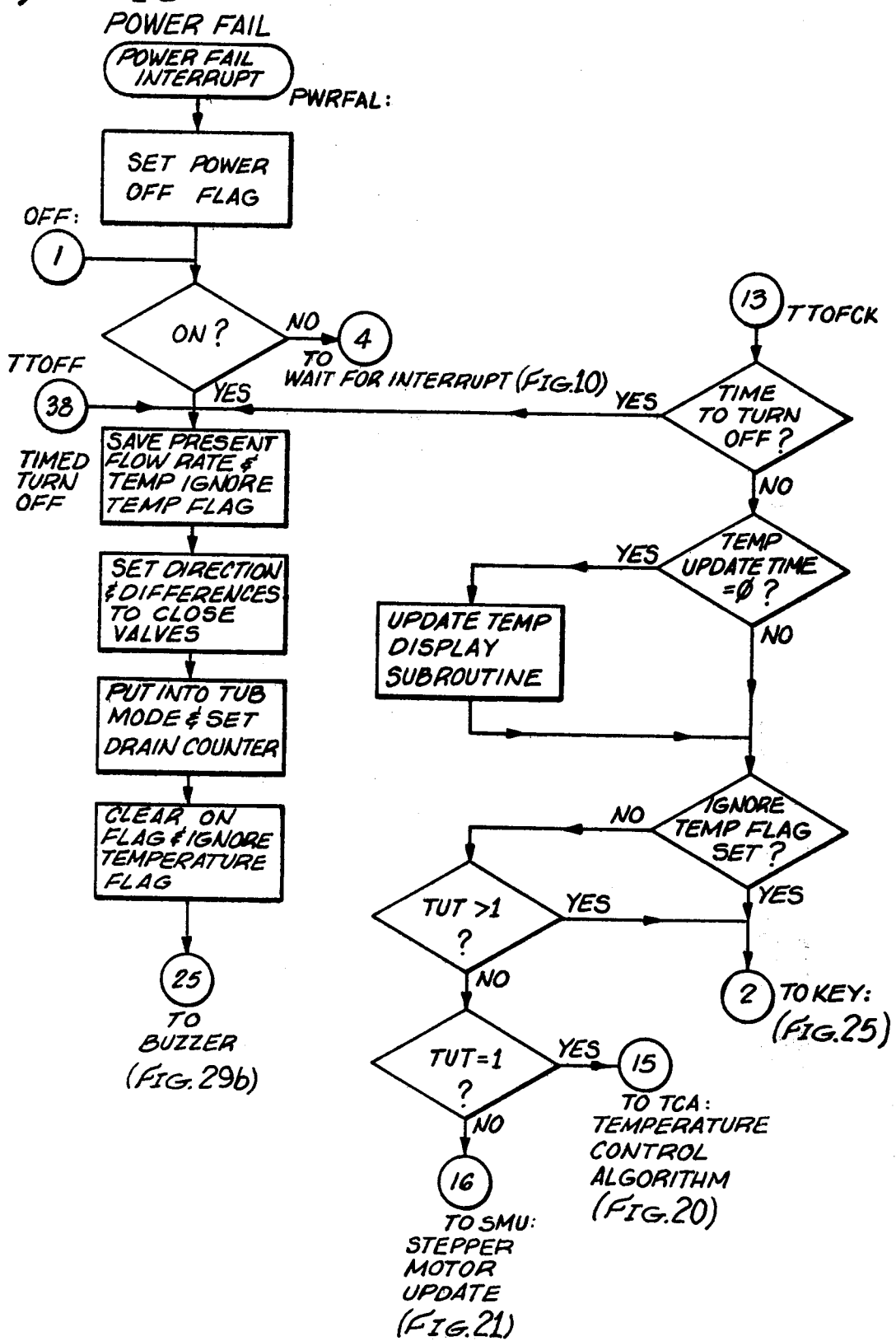

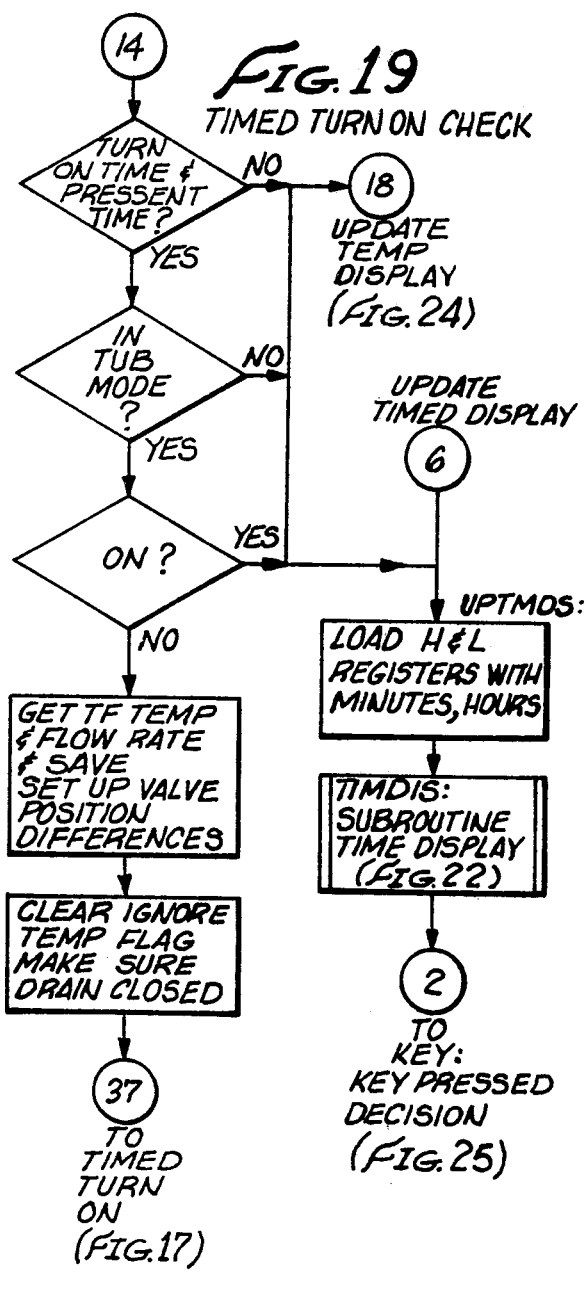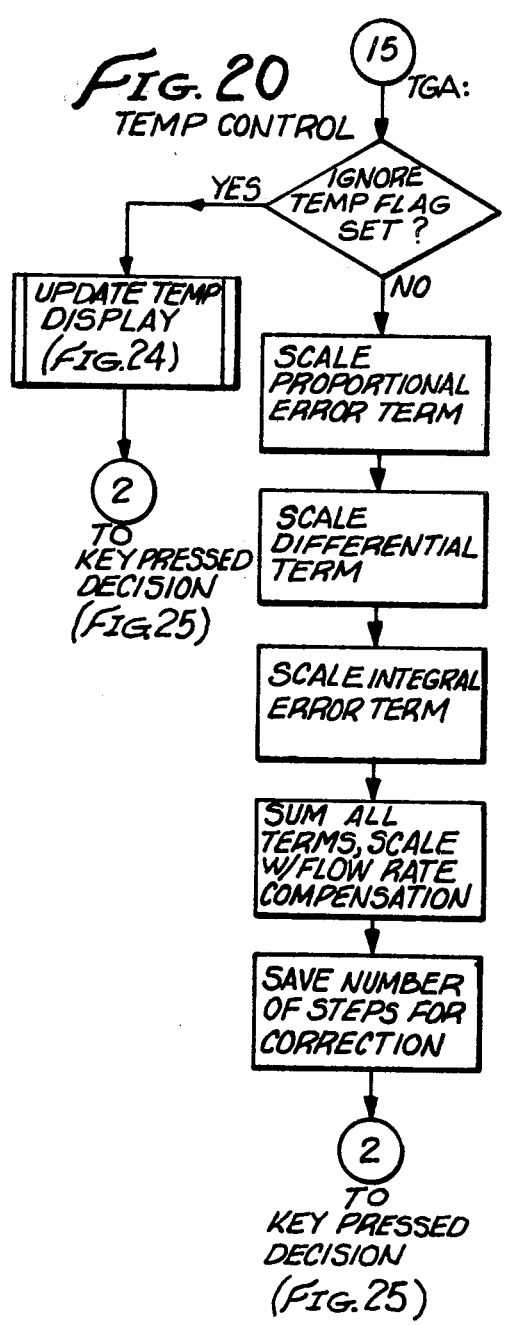

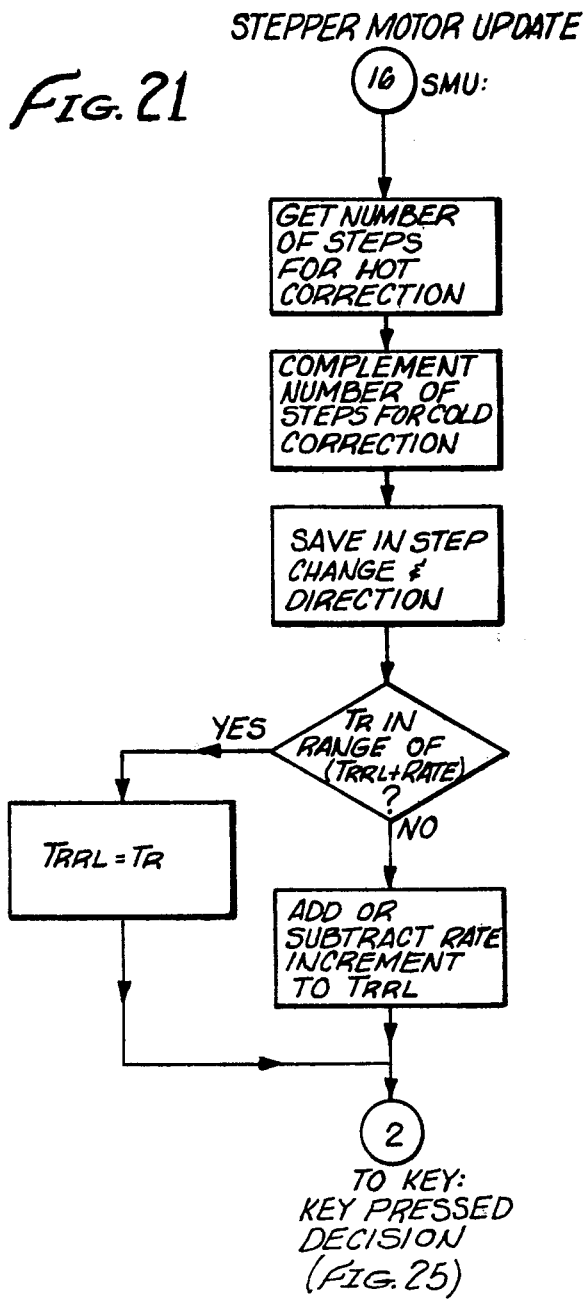
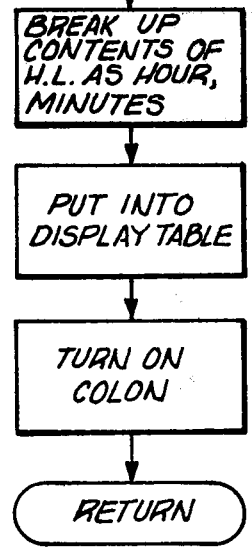
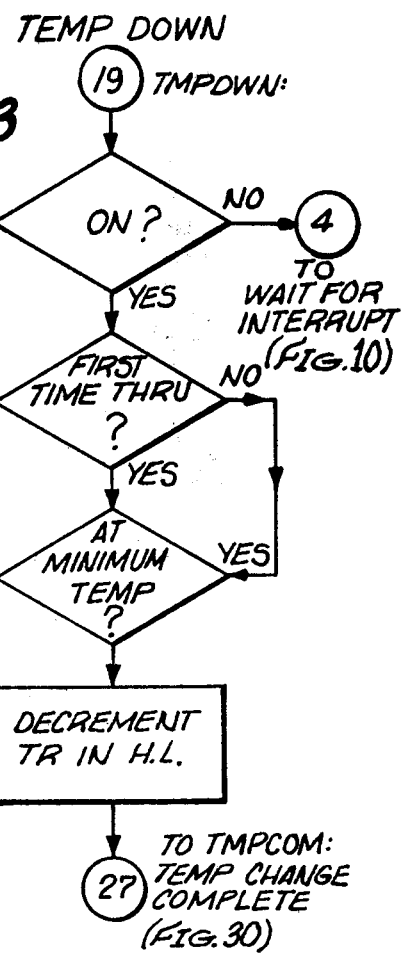

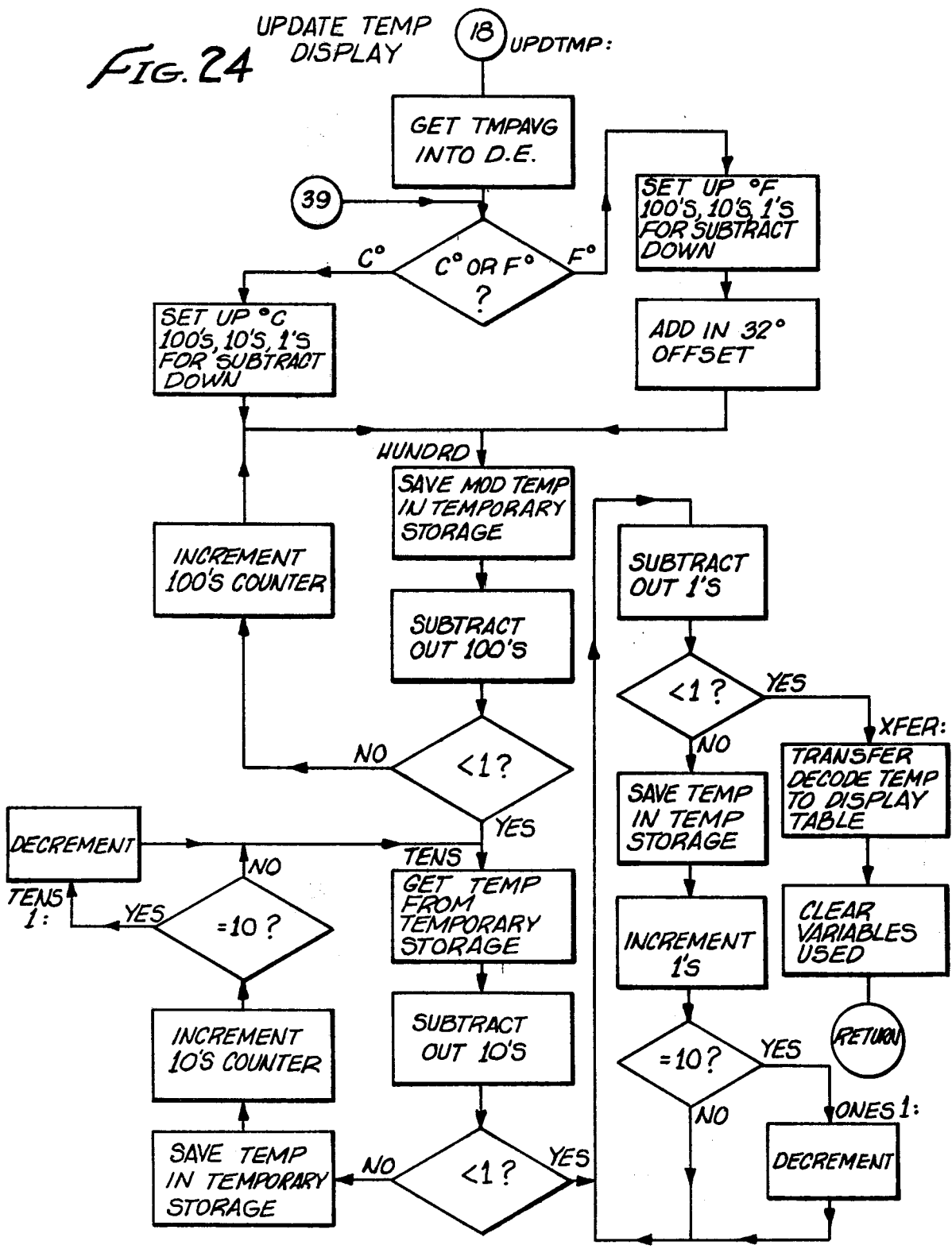

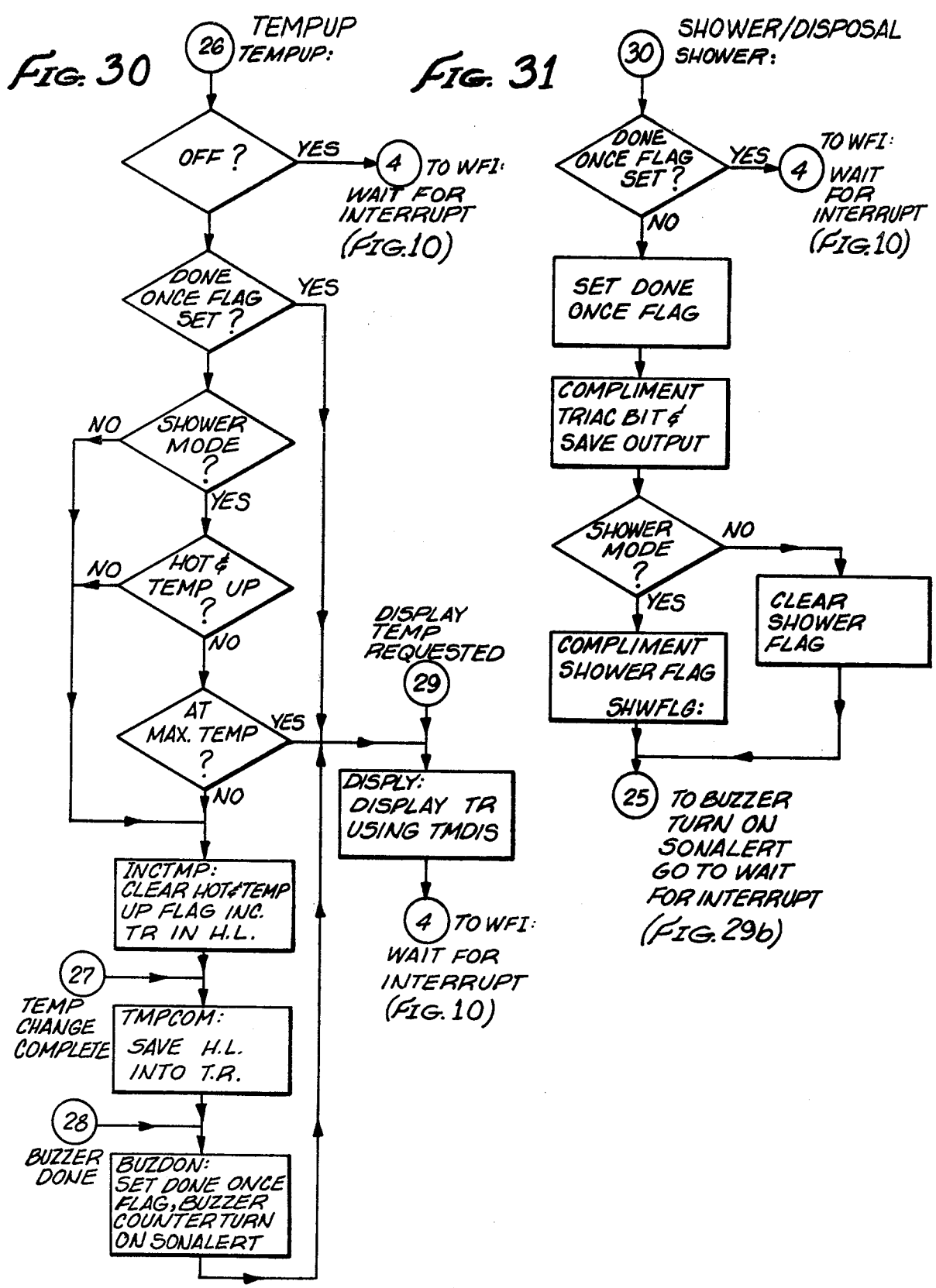

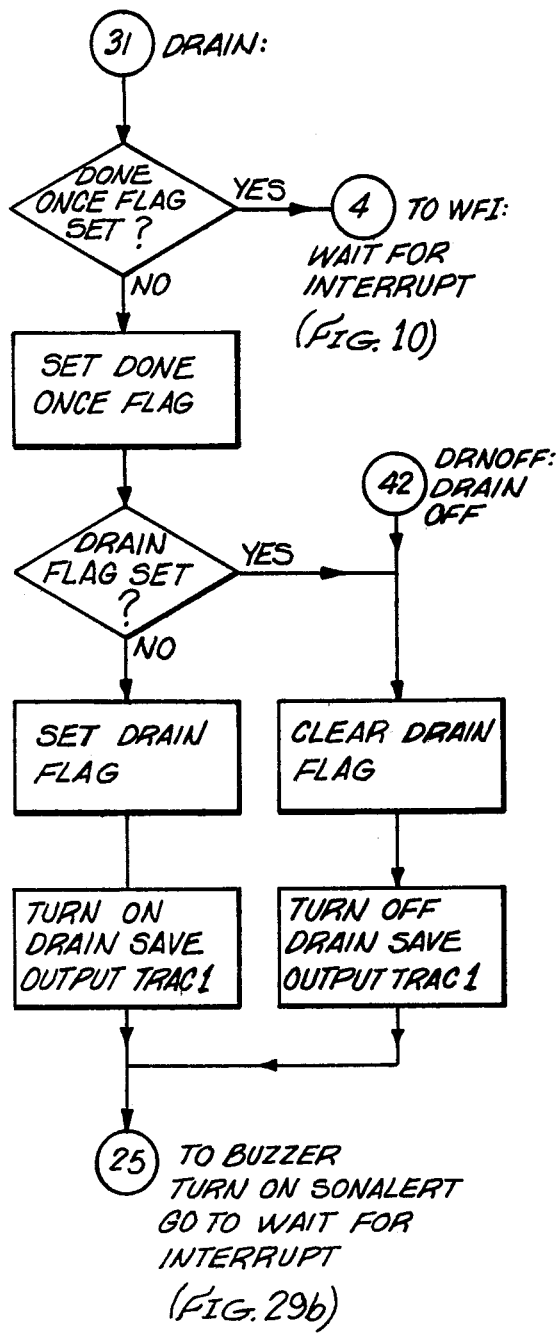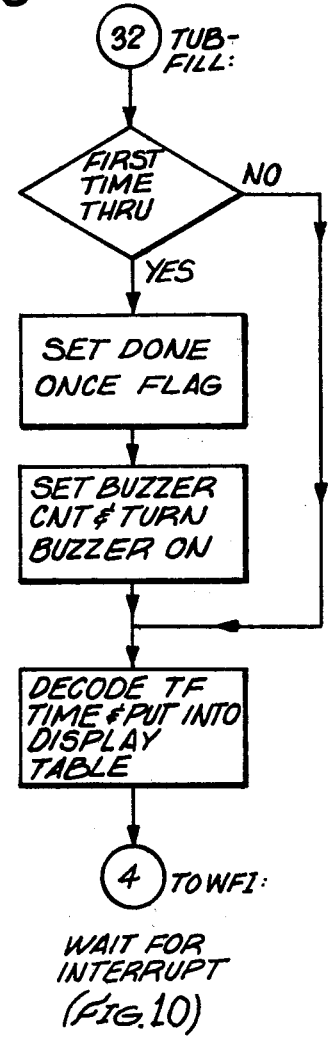

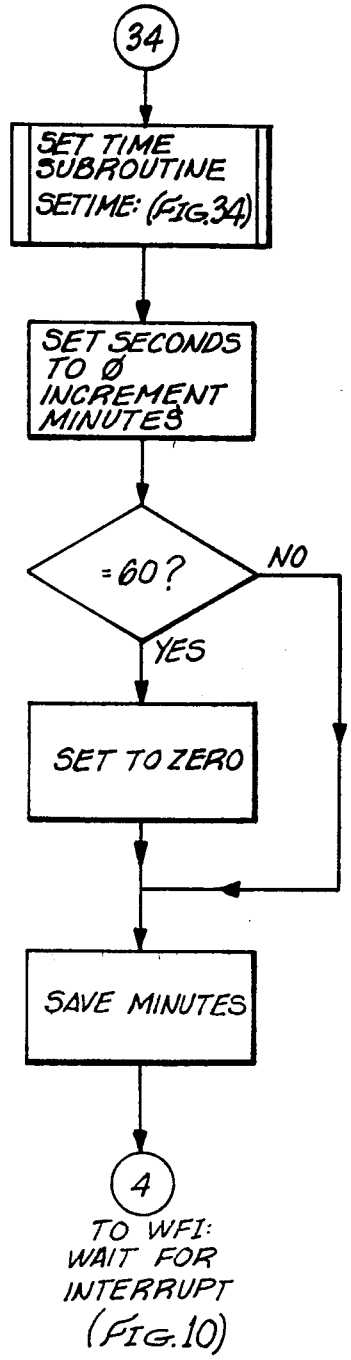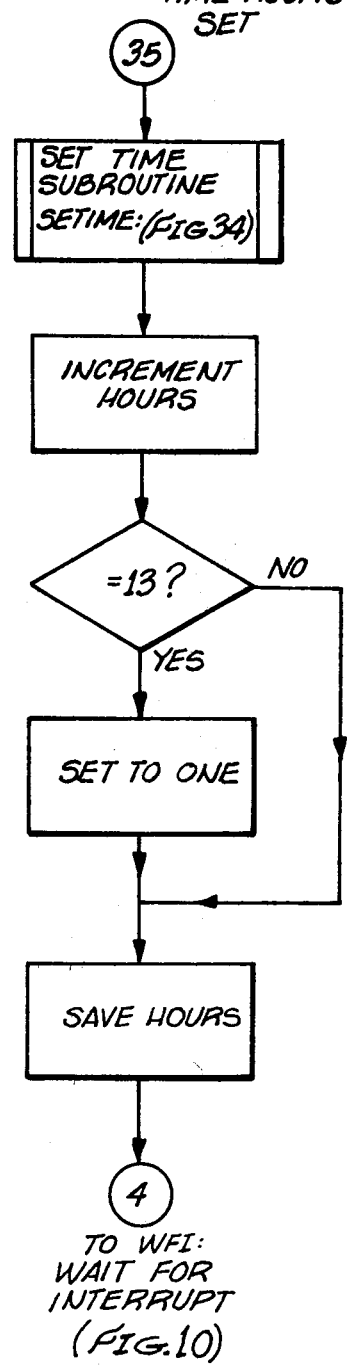

WATER TEMPERATURE AND FLOW RATE SELECTION DISPLAY AND CONTROL SYSTEM AND METHOD

CROSS REFERENCE TO RELATED APPLICATIONS

This application is a continuation-in-part of patent application Ser. No. 126,325 filed on Mar. 3, 1980 abandoned.

BACKGROUND OF THE INVENTION

1. Field of the Invention

This invention relates to a system for delivering water at selected flow rates and temperatures to an output means and automatically controlling the selected flow rate and temperature. More particularly, this invention relates to a system of this character which has the ability to rapidly and automatically respond to changes in inlet supply water temperatures and pressures, as is common in residential and commercial plumbing systems and make corrections such that the output temperature and pressure and flow rate remain constant within predetermined limits. The system includes a control panel such as a touch plate instead of conventional control handles. This panel may be elegantly set into a wall or deck near to or even remote from the water output means.

2. Prior Art

Faucets and valves with conventional hot and cold handles (or other control means) are widely used to control output water temperature and flow rates for sinks, bathtubs and other plumbing related fixtures. However, such valves simply provide a fixed proportioning of hot water to cold, with no automatic control of either flow rate or temperature. When external disturbances in supply line temperatures and pressures are present some valves incorporate thermostatic control elements to provide automatic control of temperature but have relatively slow response to selection changes, supply temperature variations and supply pressure fluctuations. Still other valves have mechanical components that rapidly compensate for hot and cold supply line pressure fluctuations, but attendant with this function is an inherent fluctuation in flow rate.

OBJECTS OF THE INVENTION

An object of this invention is to provide a system and method for selecting, monitoring, and controlling output water temperature independently of flow rate.

Another object of this invention is to provide a closed loop system of this kind which controls variables such as water flow rate and temperature in response to single or plural mode signals.

Still another object is to provide a low cost, reliable digital control system of this kind for delivering water to the output for use in plumbing fixtures such as a sink, lavatory, shower and tub at selected temperatures and flow rates.

Another object is to provide a system of this kind which monitors the actual output water temperature, compares the actual output water temperature to a selected output water temperature, and generates signals to change the actual output water temperature as needed to attain the selected value.

Another object is to provide a system of this kind which displays the actual output water temperatures and/or flow rates.

Another object is to provide a system that automatically responds rapidly to changes in the water supply temperature and pressure to maintain selected flow rate and temperature within predetermined limits.

Another object of this invention is to provide an open loop control system to control water flow rate in response to input selection and maintain flow rate constant independent of the temperature control function.

SUMMARY OF THE INVENTION

The apparatus includes output water means and selector means for selecting desired output water temperatures and/or flow rates at the output water means; display means for displaying the actual output water temperatures and flow rates at the output water means; sensing means for sensing the actual output water temperature at the output water means; comparator means for comparing the selected output water temperature to the actual output water temperature, and for generating signals to change output water flow rate and/or temperature as needed to attain the selected value; and control means for controlling hot water and cold water flow to a common water output means in response to such signals.

The selector means includes means for selecting a predetermined output water temperature from a plurality or series of predetermined temperatures. The selector means may also determine intermediate output water temperatures for refined control In the preferred embodiment, the selector means includes a pair of switches, operation of which incrementally respectively increases or decreases the output temperature by, say, 0.5° or 1° F. in accordance with the number of times that the switches are closed.

The selector means can include a plurality of switches. Examples of such switches are mechanical types, capacitance types, audible sensor and metallic contact membrane types.

In a preferred embodiment, the selector means includes a touch control panel having a plurality of touch plate switches, each permitting selection of a predetermined output water temperature. This plurality permits selection of any one of a series of predetermined temperatures from the maximum to the minimum available, subject to the temperatures of the available hot and cold water sources. Moreover, additional switches may permit selection of an incremental series of temperatures between any two predetermined temperatures. Effectively, these switches permit a fine tuning of the output temperature throughout all or any part of the temperature range that the plurality of predetermined temperature switches covers.

Independent of the output water temperature selector means, the system may also include means for selecting and maintaining the output water flow rate at a desired level. Such selector means may also include means for incrementally increasing or decreasing the flow rate while maintaining output water temperature at any selected level.

Although the embodiment of the invention described herein in detail utilizes closed loop temperature control and open loop flow control, it will be understood that embodiments utilizing closed loop flow control are within the contemplated scope of the invention. In that case a flow sensor would continuously monitor the output flow rate at the water output means and provide a representative signal to the comparator means.

The means for displaying selected output water temperatures and flow rates may be a digital alpha-numeric display such as one that utilizes a plurality of seven-segment display elements. The display indicates the selected temperature as long as any temperature selection switch is activated. Preferably, the actual output water temperature flashes on the display panel until the selected temperature (within a predetermined error band) is attained. Once the selected temperature is attained, the temperature displayed ceases flashing, but remains in a steady state to indicate that the selected output water temperature has been attained.

The means for displaying the selected output water flow rate may be and preferably is the same as the display means for the output water temperature. That display indicates selected flow rate as long as the flow selection switch is activated. In those embodiments that include closed loop output water flow control, the flow monitoring means may be a small turbine in the output water flow path operatively linked to means for measuring the turbine rotation rate.

The temperature-sensing means, which may be a device such as a silicon diode sensor, continuously monitors output water temperatures at the water output means. The sensing means produces a signal representative of the actual temperature of the water at that location. That signal is fed to comparator means within a microprocessor, and compared with the selected output water temperature. If the selected temperature differs from the actual temperature, the comparator generates a temperature error signal that, after processing, is used to control the relative amounts of hot and cold water flowing to the output means. Adjustment of hot and cold flow continues until the selected output water temperature is attained. Further adjustment of the control means takes place only if and as the comparator means detects a new difference between selected and actual output water temperatures, as, for example, when the selected output water temperature is changed or when changes occur in cold and hot water source temperatures or pressures. In those embodiments that include closed loop control of water flow rates, the comparator operates in similar fashion to monitor and to control the flow rate.

The temperature control system may be an open loop system, but is preferably a closed loop system of the single mode or plural mode type. The single mode type generates a control signal for controlling water output temperature from the magnitude of the error signal. In the preferred embodiment, a three-mode control system is used to close the loop. The system determines the difference, if any, between actual output water temperature and selected temperature, and generates a temperature error signal. The system then generates a control signal based on the magnitude of the error signal, the rate of change in that signal, and the length of time the error has existed. That control signal is fed to the control means for making adjustments as necessary to bring the actual output water temperature to the selected output water temperature, plus or minus a small margin of error. The plural mode signal provides good accuracy and permits rapid correction of temperature with minimum oscillation about the temperature. Moreover, with the use of separately operable cold water and hot water valves, the flow rate from each can be controlled so that, for example, the net flow remains constant but the ratio of hot to cold is changed to produce a different output temperature.

Preferably, the comparator means is embodied in a microcomputer. This permits electronic selection and control of output water temperature and output water flow rate, and provides rapid, reliable response to changes in these values with low power consumption.

The control means for controlling hot and cold water flow may be valve/motor combinations, hot and cold water mixing valves or other available means. Where the control means are valve/motor combinations, one of them may be joined to the hot water source means, and another to the cold water source means, upstream of the (common) output water means. Preferably, the motors are high speed linearly actuated stepper motors, and the valves are pilot-operated proportional valves. In response to signals indicating adjustment of either the hot water flow, cold water flow or both, to attain a selected output water temperature and/or flow rate, the valve openings are adjusted until the desired water temperature and/or flow rate is attained. Such valve/motor combinations permit separate or simultaneous control of output water temperatures and flow rates. They also permit rapid adjustment to newly selected output water temperatures and/or flow rates or to external changes in hot and cold inlet temperatures and/or pressures. Further, such combinations permit maintaining a constant output water flow rate during adjustment from one selected output water temperature to another, and vice-versa.

In the preferred embodiment using separate hot water and cold water valve/motor combinations, temperature control at a constant flow rate are made by equal and opposite incremental changes in the hot and cold water valve openings. Flow rate changes at a constant temperature are made by weighted percentage changes in the same direction in each valve so as to maintain a constant ratio of hot and cold water during valve movement.

Because in preferred embodiments this system utilizes a microprocessor for control of output water temperature and flow rate, the system can readily accommodate inclusion of other electronically controlled means which are adjuncts to or complementary with the system. For example, the system may also include means for controlling total water volume dispensed; means for switching output water flow from one device to another, such as from a tub spout to a shower; means for operating a drain plug in such devices as sinks, tubs and showers; means for operating a disposal device such as a kitchen disposal; and memory means for programming any desired combination of output water flow rate and temperature as a function of elapsed time. Further, the system may also include means for displaying the selected output water temperature and flow rate in conventional or metric units, and means for converting the display from conventional to metric units and vice-versa. The system may also include means for displaying the time of day, as when the system is not used for its primary purposes.

In general, output temperature flow rate and time can be programmed as independent variables producing any combination of a automatically controlled outputs.

Among the programmable features that may be included in the system are means for limiting the maximum output temperature to a desired level, means for limiting water flow to a predetermined elapsed time, and/or means for selecting the maximum flow rate, minimum flow rate or both; sequencing a series of flow rates and temperatures in the shower for personal user preference.

Two methods of incorporating such programmable features in the system are:
   (1) Incorporating a dual in-line package (DIP) switch in an external control panel which can be manually switched to a predetermined programming mode for inputting instructions and other data into memory.
   (2) Including means for inputting data for one function following a predetermined activation of keyboard switches. For example, simultaneous activation of two switches, each of which normally effects one function when activated alone, may effect a different function allowing the keyboard to be used for the programming mode.

BRIEF DESCRIPTION OF THE DRAWINGS

Our new system can be better understood by reference to the drawings in which:

FIGS. 8 through 36 provide flow chart representations of the software portion of the invention.

DETAILED DESCRIPTION OF A PREFERRED EMBODIMENT

Figure 1:
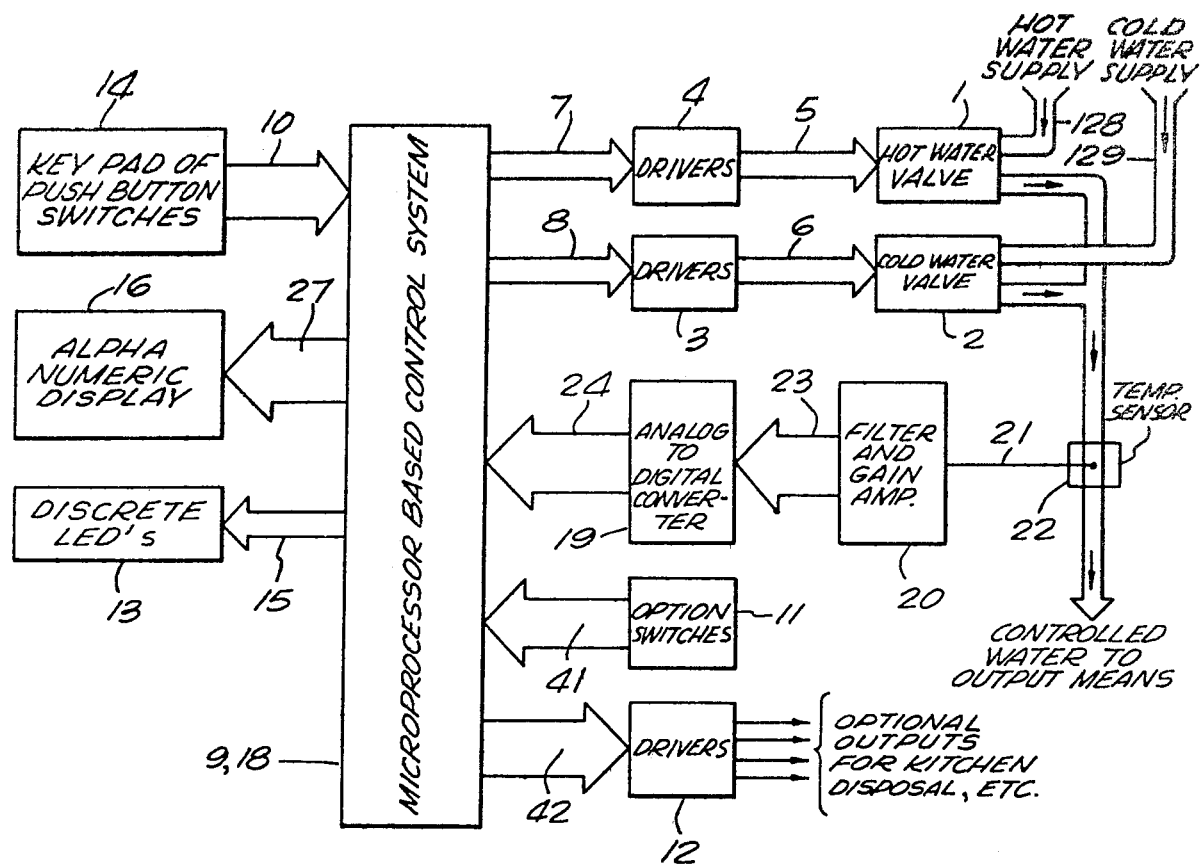
FIG. 1 is a general functional block diagram of the system.

Referring now to FIG. 1, the apparatus includes temperature sensor 22 at the output means which continuously monitors output water temperature and conveys a signal representative of that temperature along path 21 to filter 20. Filter 20 provides a filtered signal on path 23 to analog-to-digital converter 19. That converter provides a digital signal representative of the output water temperature on path 24 to microprocessor 18, which includes comparator 9.

The selector means 14 consists of a touch plate of switches (see FIGS. 3 and 4) for selecting any one of a plurality of predetermined output water temperatures. Signals representative of these selected temperatures are fed on path 10 to comparator 9, which compares the selected temperature to the actual output water temperature, and generates an error signal representing the difference between the two, if any. That error signal alone may be used as a control signal, or may be used to derive a more sophisticated control signal (e.g., through a multimode transfer function) for adjustment to the hot and cold water values to attain the desired responses of the water delivery channel.

The control signal passes along paths 7 and 8 through drivers 4 and 3, respectively, and from those drivers along paths 5 and 6 to hot water valve/motor 1 and cold water valve/motor 2, respectively. These stepper motor/pilot operated valves incrementally adjust hot and cold flow rates in response to the control signals received from the microprocessor. Adjustment of the valves continues until the selected output water temperature matches the actual output water temperature within an acceptable error range. Further adjustment takes place only as the microprocessor determines differences between actual output water temperature and selected output water temperature, as when a new output water temperature is selected.

The selected output water temperature signal also travels from the microprocessor 9 along path 27 to alphanumeric display 16, which displays, in alphanumeric terms, the actual output water temperature. In the preferred embodiment, that temperature flashes on the display until the actual temperature matches the selected water temperature. Discrete light-emitting diodes 13 illuminate those touch plate switches 14 which are engaged, via signals carried on path 15 to microprocessor 18.

Option switches, generally designated 11, permit selection of such optional features as the programming of volume control and other functions via drivers generally designated 12.

Figure 2:
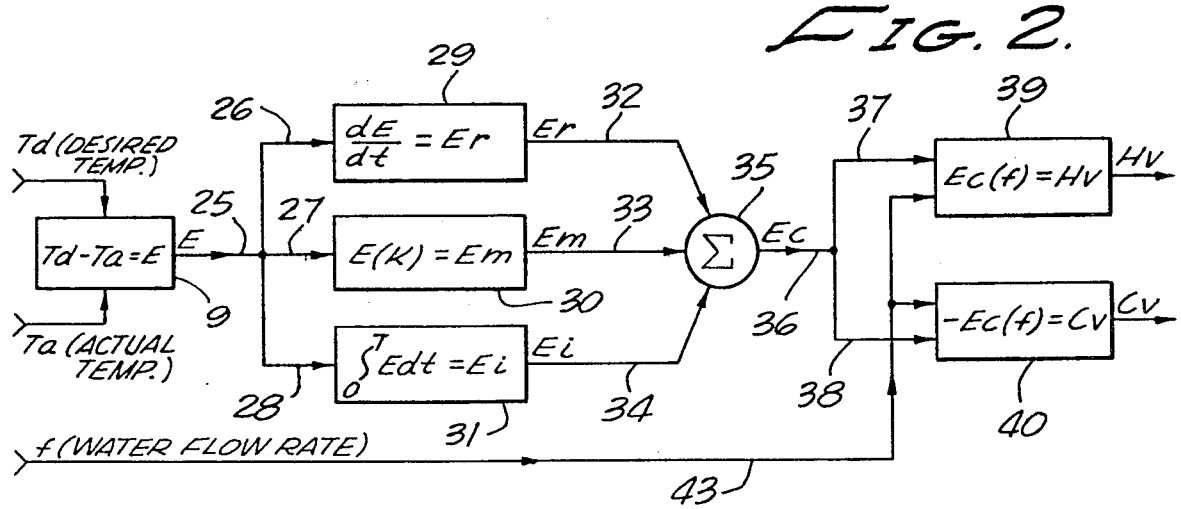
FIG. 2 is a block diagram representation of the temperature control algorithm.

FIG. 2 shows the derivation of a closed loop three-mode control signal from a single error signal generated by the microprocessor. In FIG. 2, the selected temperature and actual temperature are fed to comparator 9, which generates an error signal representative of the difference between the two, if any. That error signal emerges from comparator 9 on path 25, and passes via paths 26, 27 and 28 to means 29, 30 and 31 for determining the rate of change of the error, the magnitude of the error and the length of time the error has existed respectively. Those signals emerge on paths 32, 33 and 34, respectively, are combined at a summing means 35, and emerge on path 36 for passage via paths 37 and 38 to blocks 39 and 40. These blocks provide differential control of the hot water and cold water valves. The signal passes from blocks 39 and 40 to the hot and cold water valve motors and provide flow rate adjustment.

Figure 3:
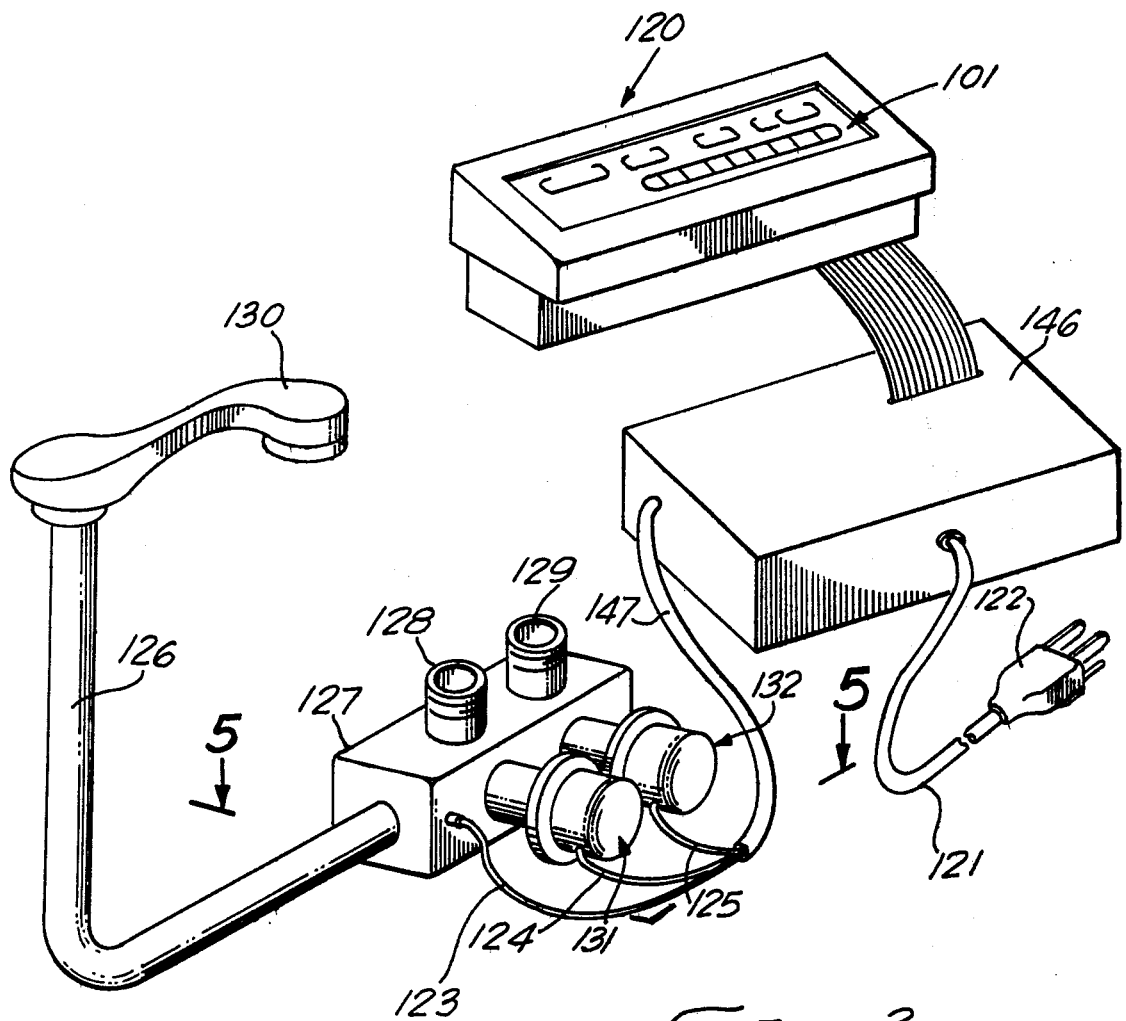
FIG. 3 is a perspective view of components of a preferred embodiment.

FIG. 3 shows the components of the system for installation in an environment such as a bathroom lavatory. That system includes touch plate panel 101 set into selector/display means generally designated 120. Signals from the selector means 101 pass on path 147 to system circuitry in housing 146, and signals for display pass on that path from the circuitry in housing 146 to display panel 101. The system receives power via line 121 and three-prong plug 122 from a conventional power source. The system includes two linearly-actuated stepper motors 131 and 132 which are operatively linked to separate pilot-operated valves within housing 127. The motors are operatively linked to driver means in housing 146 via lines 124 and 125. Valve housing 127 also includes inlet lines 128 and 129 for hot and cold water sources, respectively. Water passes from valve housing 127 via line 126 to water spout 130, or other delivery device such as a shower head. Valve housing 127 also incorporates a sensor means 123 for generating a signal representative of the output temperature (see FIG. 5). The processor utilizes this signal for system control and display as will be more fully disclosed hereinafter in conjunction with FIGS. 6 and 7.

Figure 4:
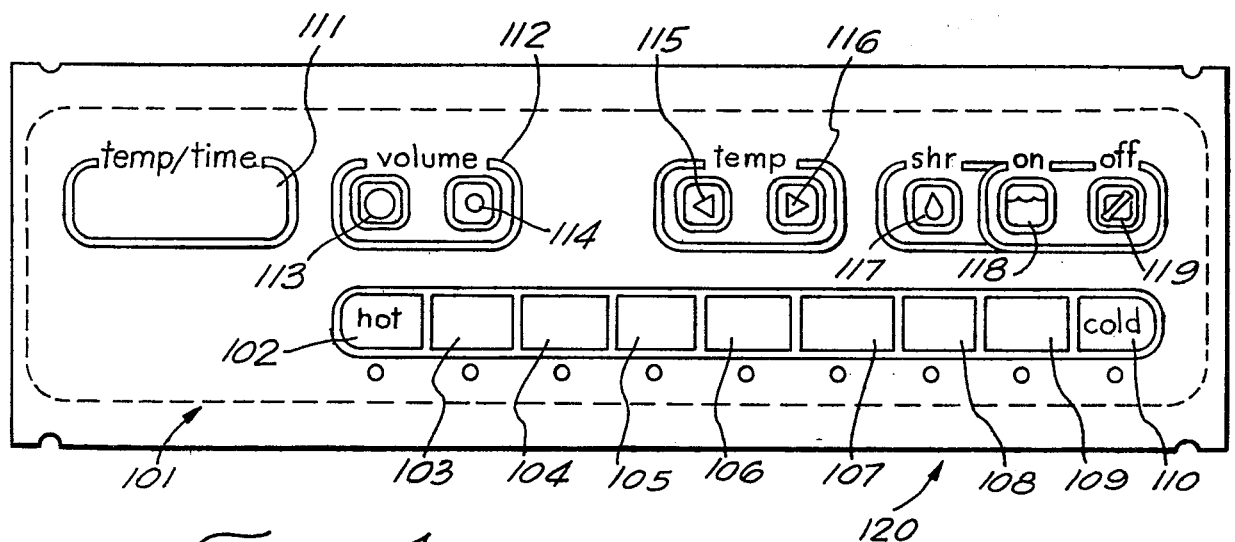
FIG. 4 is a representative display of the graphics and touch plate switches in the selector means shown in FIG. 3.

FIG. 4 shows a preferred embodiment of the touch plate panel 101 mounted in selector/display means 120. The touch plate generally designated 101 includes a series of contact switches 102, 103, 104, 105, 106, 107, 108, 109 and 110 for selecting any one of a series of predetermined output water temperatures. Arbitrarily, the maximum predetermined output water temperature may be 120° F., or greater, the minimum 80° F., or lower. Then switch 103 may arbitrarily produce a predetermined output water temperature of 115° F.; switch 104, an output water temperature of 110° F.; switch 105, 100° F.; switch 106, 95° F.; switch 107, 90° F.; switch 108, 85° F.; switch 109, 80° F.; and switch 110, 75° F. Preferably, activation of any one switch in the series 102–110 deactivates all others. Any further attempt to activate two switches simultaneously either turns the system off or priortizes the system to the lowest temperature.

Once any predetermined temperature switch is activated, display 111 begins flashing actual output water temperature, and continues to flash actual temperature until the actual temperature matches the selected temperature, plus or minus a small margin of error. Then flashing ceases, but the actual output water temperature is displayed in steady state to indicate that the selected temperature has been attained.

The system includes fine tuning temperature control switches 115 and 116. Switch 115 incrementally increases the temperature upwardly a small amount, depending on the number of times the switch is pressed or released. Switch 116 incrementally decreases the temperature again depending on the number of times the switch is pressed or released. With this fine tuning feature over the entire temperature range of the system, the user can select any temperature between the predetermined temperatures.

Volume control 112 permits incremental increase and decrease of output water flow rates. Switch 113 incrementally increases flow rate; switch 114 incrementally decreases the flow rate. Both switches change flow rate in proportion to the length of time they are engaged. In the preferred embodiment, this control means cannot shut off water flow completely. Preferably water flow is limited to a minimum level to permit inadvertent shut off of flow with the system in the "ON" mode. The shut off function is controlled solely by the ON/OFF switches.

Switch 117 permits diversion of water flow from one output, say a shower output, to another output, say a bathtub output. Switches 118 and 119 turn the system on or off.

Figure 5:
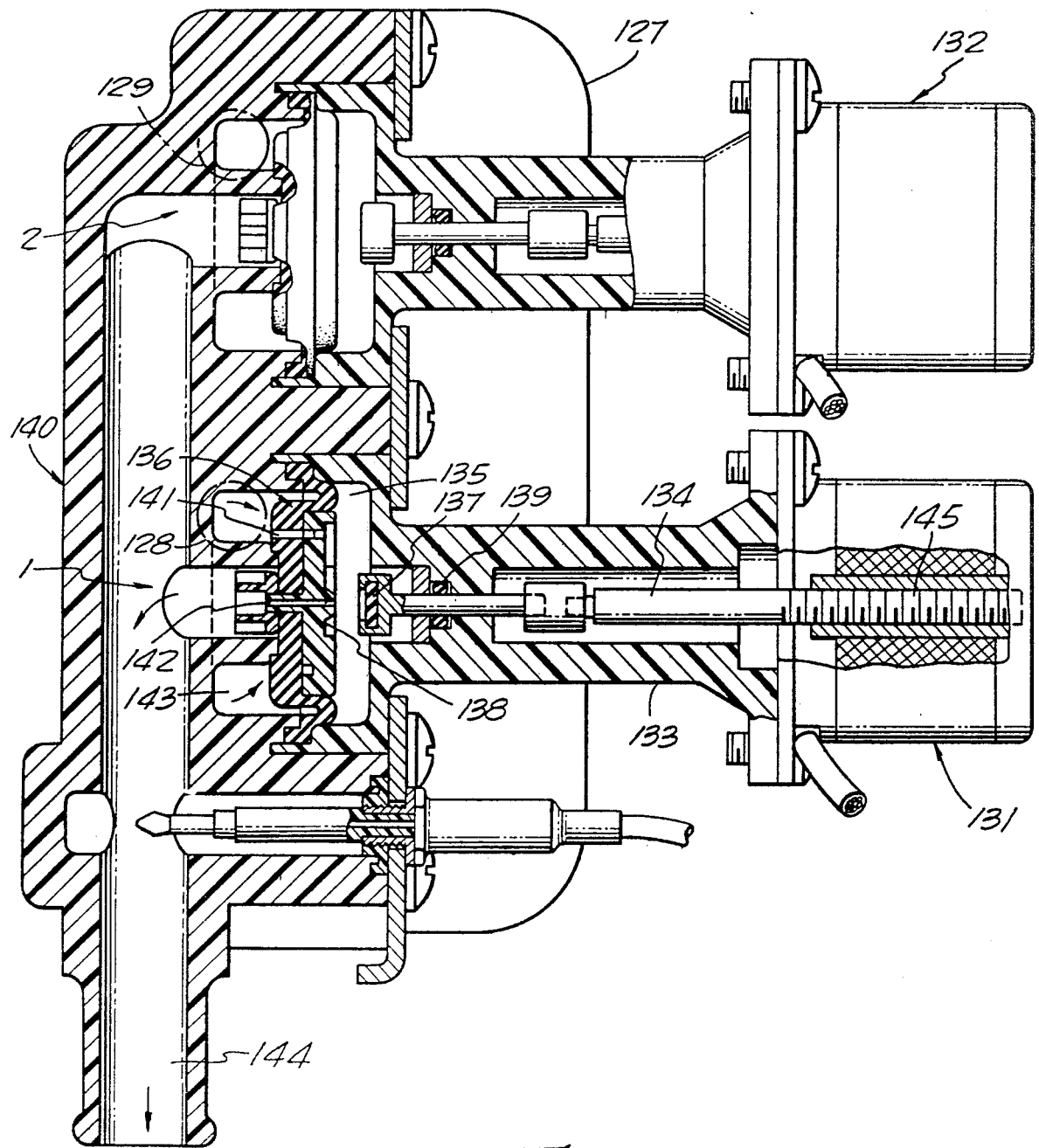
FIG. 5 is a partially sectioned view of the valves shown in FIG. 3, taken on line 5—5 of FIG. 3.

FIG. 5 shows a sectional view of the stepper-motor 131 (see FIG. 3) and of pilot-operated valve 140, which controls the flow of hot water from source 128 (see FIG. 3) through outlet line 126. A separate valve/motor combination including motor 132 (see FIG. 3) controls the flow of cold water from inlet 129 to outlet 126 (see FIG. 3). Motor 131 is mounted on housing 133, and includes a lead screw mechanism 145 to convert the motor's rotary motion to linear motion. The pitch of screw 145 is selected to obtain the optimum mechanical advantage from the motor torque available to operate the valve. Shaft 134 is linked to screw 145, and extends into valve chamber 135 above diaphragm 136. Stopper 137 is seated in the end of shaft 134, and is designed to engage seat 138 on the upper surface of diaphragm 136. Engagement of the stopper 137 on the seat 138 closes a bleed hole 142 at diaphragm 136. O-ring 139 seals shaft 134 from the exterior, but permits shaft 134 to move within chamber 135 which is normally under hydrostatic pressure.

Hot water enters valve 140 via source 128 and passes into inlet annular chamber 143, and leaves the valve via outlet 144. With diaphragm 136 open, water passes directly from inlet 143 to outlet 144. With diaphragm 136 closed, however, water passes from inlet 143 through bleed hole 141 into chamber 135, and then through bleed hole 142 to a primary control orifice 150 and outlet 144. In valve 140, differences between the pressures across the upper and lower parts of diaphragm 136 provide the forces to open and close the diaphragm.

Diaphragm 136 opens when the pressure in chamber 135 is lower than the pressure in inlet 143. However, when diaphragm 136 opens fully, stopper 137 seats on seat 138, closing bleed hole 142. When that happens, the pressure rises in chamber 135 until the diaphragm is forced downwardly, unseating stopper 137 from seat 138 and opening bleed hole 142. When that happens, the pressure in chamber 135 drops and diaphragm 136 moves towards the closed position. The diaphragm comes to an equilibrium position when the integrated pressure/area differential across the diaphragm is equal to zero. Small adjustments in the position of stopper 137 via movement of shaft 134 permit relatively small changes in the quantity of water flowing through the diaphragm at any time, thereby providing for proportioned control.

The cold water valve/motor combination works in the same way as the hot water valve/motor combination. Because the two valve/motor combinations are separately controlled by a microprocessor based, multimode system, they permit precise proportioning of hot water to cold, and therefore precise control of output water temperature and flow rate. Moreover, because the valves are independently actuated, output water temperature can be changed in small or large increments with little or no effect on the flow rate, and vice versa.

A more detailed description of the electronics and program portions of the invention will now be provided to enable those skilled in the art to more fully comprehend the invention, its use and operation.

Figure 6:
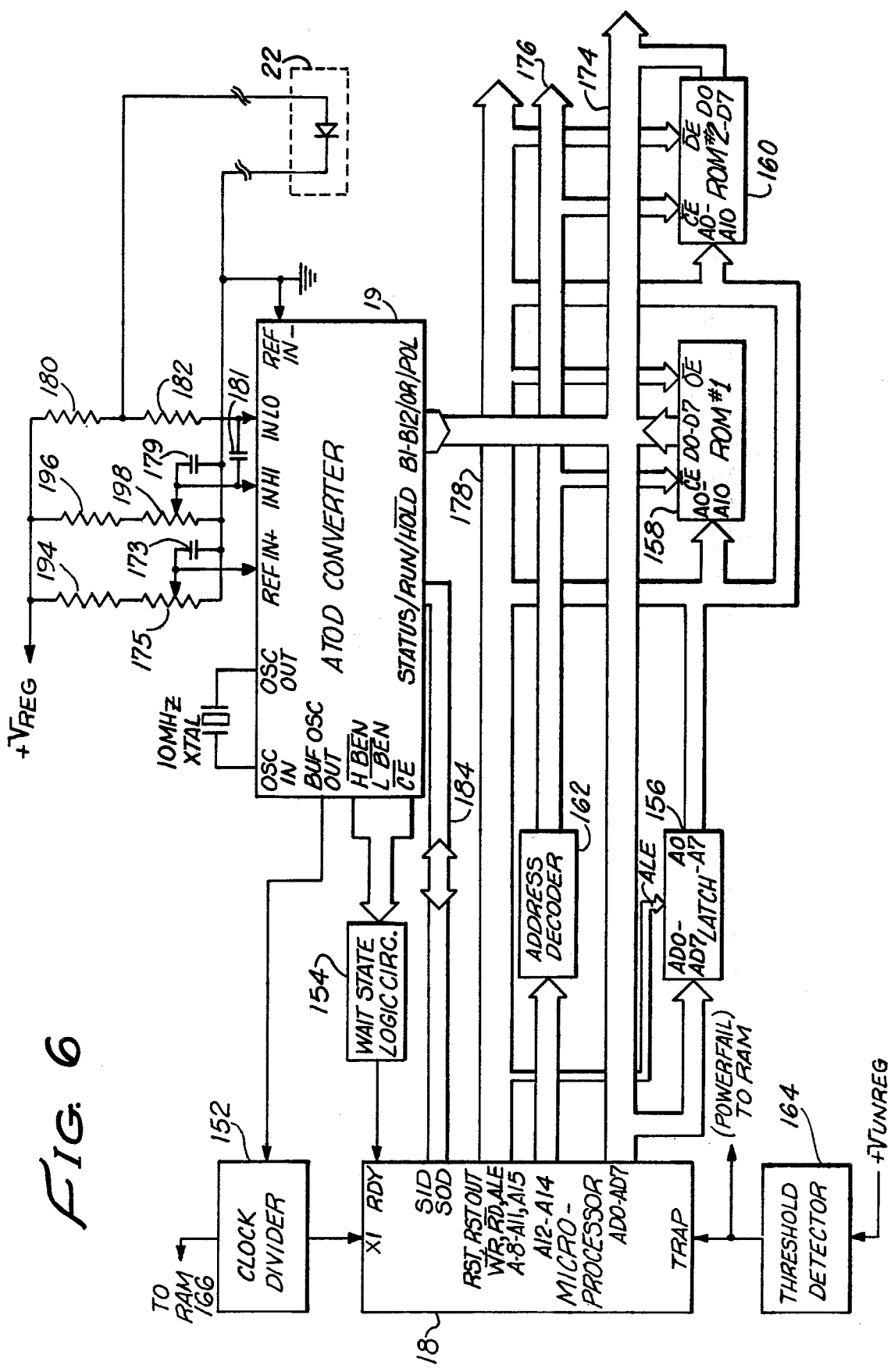
FIGS. 6 and 7 together comprise a more detailed schematic/block diagram of the electronics portion of the invention.
Figure 7:
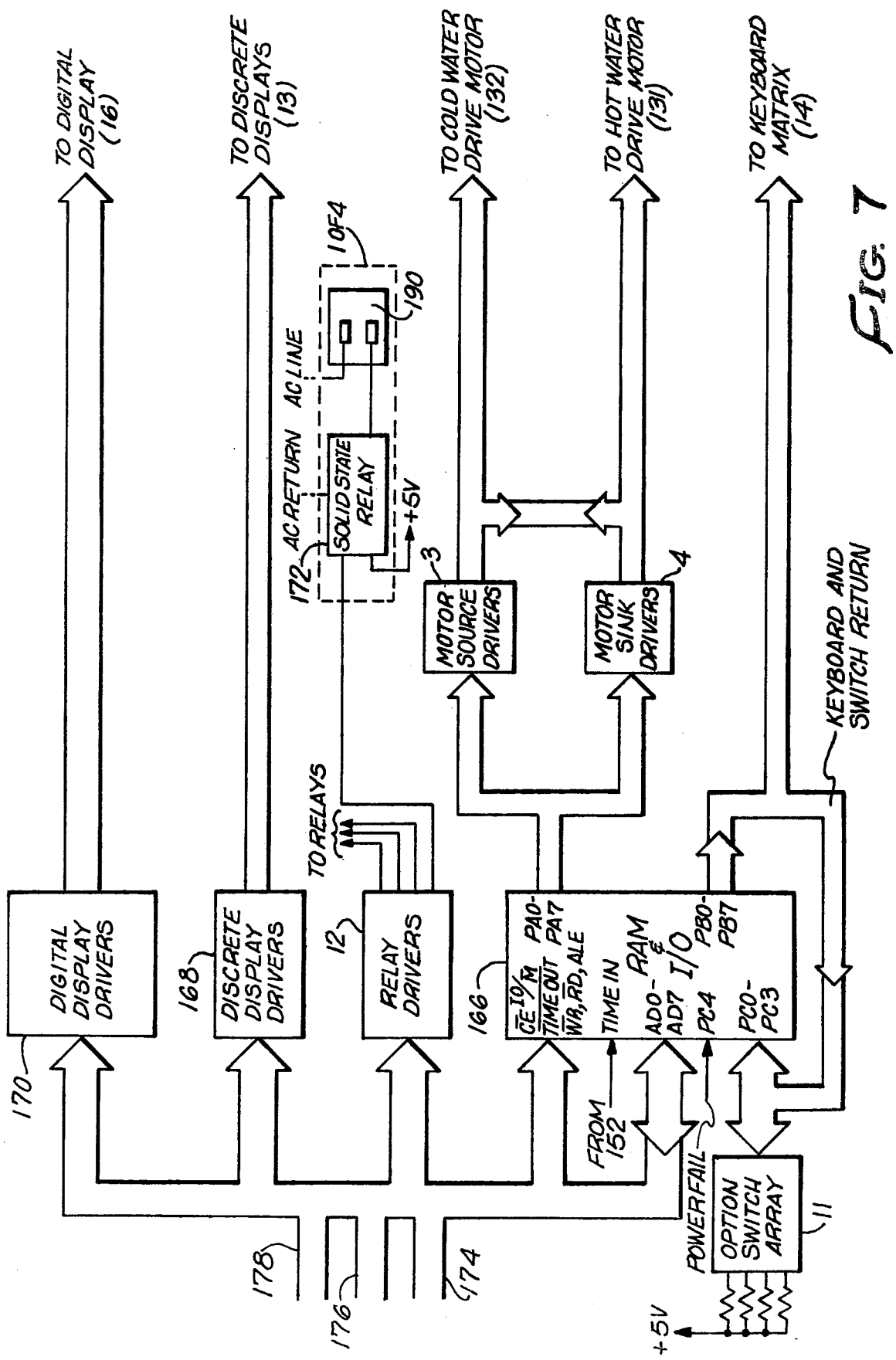

Referring now to FIGS. 6 and 7 concurrently, it will be observed that the electronics portion of the present invention comprises a microprocessor 18, an A-to-D converter 19, a clock divider circuit 152, a wait state logic circuit 154, an eight-bit latch 156, a pair of read only memory circuits, namely ROM 158 and ROM 160, an address decoder 162, a threshold detector circuit 164, a random access memory and input-output chip 166, discrete display drivers 168, digital display drivers 170, relay drivers 12, a plurality of relay assemblies 172, an option switch array 11 and motor source and sink drivers 3 and 4, respectively. A temperature sensor 22 and associated circuitry for converting temperature to voltage over a pre-selected range for input to the A-to-D converter, is connected to the A-to-D converter to provide a digital representation of the actual sensed temperature of the output water provided by the invention. This temperature compensation network comprises fixed resistors 194, 196, 180, and 182, adjustable resistors 175 and 198 and capacitors 173, 179, and 181. Temperature sensor 22 is a silicon diode which has a voltage drop that varies with temperature in a precise, known manner.

In one embodiment A-to-D converter 19 may consist of an Intersil, Model ICL 7109, Twelve Bit Binary A-to-D Converter which is a high performance, low power integrating A-to-D converter designed to interface with microprocessors. This particular circuit provides input terminals for receiving an analog input voltage for conversion to a digital output. These input terminals are identified as input high and input low. Terminals identified as reference in-plus and reference in-minus, input an external reference voltage. The reference voltage is input to provide a scale factor other than unity between the absolute output voltage to be measured and a desired digital output and also to provide a zero reading for non-zero input.

Thus, in the temperature sending compensation circuit of FIG. 6, the value of fixed resistor 194 and variable resistor 175 and an adjustment thereof are selected to provide a reference input positive to the A-to-D converter 19 which will generate a full scale digital output for 100° C. Similarly, the value of fixed resistor 176, and variable resistor 178 and the adjustment thereof are selected to provide a zero digital output at 0° C. by means of the corresponding voltage applied to the in-high and in-low terminals of A-to-D converter 19, in conjunction with the selected values of voltage divider network consisting of fixed resistors 180 and 182. In one preferred embodiment, resistor 194 is 5.1k Ohms, resistor 196 is 2.7k Ohms, resistor 180 is 11K Ohms and resistor 182 is 1 megaOhm. In addition, potentiometer 175 is a maximum of 100K Ohms and potentiometer 198 is a maximum of 1K Ohm. Capacitors 173, 179, and 181, which are used for transient rejection to protect the A-to-D converter and to prevent inaccurate responses to such transients, are valued at 0.1 micro-Farads. A 10 mega-Hertz crystal is applied to the oscillator-in and oscillator-out terminals to control the clock rate of the A-to-D converter.

The digital output of the A-to-D converter is provided at terminals B-1 through B-12 in the form of a twelve bit digital representation of the analog input of the temperature sensor. In addition, polarity and over range signals are provided at terminals labeled POR and OR, respectively. In addition, a run/hold input and a status output allow monitoring and control of A-to-D conversion timing. Also output from the A-to-D converter are signals labeled low-byte enable LBEN and high-byte enable HBEN and chip enable load CE, all of which applied to wait state logic circuit 154 before being applied to the ready terminal of microprocessor 18, to compensate for the difference in processing speed between the A-to-D converter and the microprocessor.

Also shown in FIG. 6 is an A-to-D converter output signal BUF/OSC/OUT, buffered oscillator output, which is applied to clock divider 152, to preclude the need for a separate timing crystal for the rest of the circuit. Clock divider 152 divides the 10 mega-Hertz oscillator output from A-to-D converter 19 to a 1.25 mega-Hertz signal that is applied to RAM chip 166. In addition, the clock divider provides an output signal to the X1 terminal of microprocessor 18 which represents a divide by 2 signal or 5 mega-Hertz input clock signal to the microprocessor. In a preferred embodiment, clock divider 152 may be a TI/SN74161 synchronized 4-bit binary counter chip.

Microprocessor 18 may be, by way of example, an INTEL Model 8085A, 8-bit general purpose microprocessor as described in the INTEL Publication entitled MCS-80/85 Family User's Manual dated October, 1979. As used in the present invention as depicted in FIG. 6, the principal output signals of the microprocessor are divided into three buses, namely, bus 174, bus 176, and bus 178. Microprocessor 18 operates with an 8-bit data input/output, a 16-bit address output, and a plurality of input and output control signals. On bus 174 both the 8 bits of data and 8 of the 16 address bits, share the bus on the time-multiplex basis. It is for this reason that latch 156 is used, namely to temporarily store the address bits A-0 through A-7, which were last generated by microprocessor 18, while bus 174 is used to transfer data bits. An additional three of the address bits, namely address bits A-12 through A-14, are applied to address decoder 162 to provide an increase in the number of address lines to the rest of the electronics of the invention over bus 176. Address decoder 162 may preferably be a TI/SN74155 dual 2-line-to-4-line decoder used as a 3-to-8-line decoder to control 8 lines with address bits A-12 through A-14.

Microprocessor 18 generates a plurality of control signals and additional address signals which are applied to bus 178. These signals include reset RST and reset output RSTOUT, which are used for the synchronization of slower speed memories, system reset and system timing. Also included among the control signals are the read and write signals RD and WR which identify the type and timing of the data transfer cycle and the address latch enable signal, ALE, which enables the latching of the address signals A-0 through A-7, in conjunction with latch 156, and RAM and I/O chip 166. In addition, address signals A-8 through A-11 are applied directly to ROM 158 and ROM 160, bypassing latch 156, because those address signals do not share common lines with the data signals.

An additional two-line serial bus 184, connects the serial input terminal SID of microprocessor 18 to the status output of A-to-D converter 19 and the serial output terminal SOD of the microprocessor to the run/hold input of the A-to-D converter to provide appropriate protocol status lines between the microprocessor and A-to-D converter.

Threshold detector 164, which may by way of example, be an INTERSIL Model ICL 8212 Micro-Power Voltage Detector/Indicator, receives an unregulated voltage signal from the system power supply (not shown). Threshold detector 164 generates an output signal and applies it to the trap terminal of the microprocessor 18 and to the power fail terminal of RAM chip 166 whenever the unregulated voltage supply decreases below a preselected minimum voltage, which would be indicative of a loss of primary power. The trap input terminal of microprocessor 18 is a non-maskable hardware interrupt which receives immediate response from the microprocessor. Accordingly, in case of a power failure, the system retains sufficient information to return to its nominal operating condition when power is returned to the system.

The two read only memory chips, 158 and 160, may both be, by way of example, INTEL, Model 2316, Read Only Memory Devices. ROMS 158 and 160 receive address signals, A-0 through A-10, from the microprocessor output buses 174 and 178, and chip enable and output enable signals from buses 176 and 178, respectively, to control the timing of the selection of the data stored in memory, comprising ROM No. 1 and ROM No. 2. Each such ROM has 8 output data lines, D-0 through D-7, which are connected to bus 174 for transfer to RAM chip 166 and the display drivers which will be hereinafter discussed more fully in conjunction with FIG. 7.

The three microprocessor buses 174, 176, and 178 are applied to the RAM and I/O chip 166, as well as to relay drivers 12, discrete display drivers 168, and digital display drivers 170. The RAM and Input-Output chip 166 contains the random access memory and input-output interface required to perform the program routines of the invention and also to interface with the hot water and cold water drive motors 131 and 132, respectively, and with the keyboard matrix 14. In addition, option switch array 11 is connected directly to the RAM and I/O chip 166 to provide a plurality of option functions, including the following:

1. Selection of degrees centigrade or degrees Fahrenheit for the displayed temperature.
2. A time-out time delay for auto shut-off.
3. A memory mode switch that allows the invention to provide upon turn-on, the water temperature and flow rate that was selected the last time the system was in operation.
4. A shower mode switch which limits the maximum water temperature to 120° for safety purposes when, as in a shower mode, the output water is likely to come in direct contact with the user.

The RAM and I/O chip 166 may be, by way of example, an INTEL Model 8155, 2K bit static Mos RAM with I/O ports and timer as described beginning at page 6-17 of the previously mentioned INTEL publication. The input-output portion of RAM chip 166 consists of 3 general purpose I/O ports identified in FIG. 7 as PA, PB, and PC, respectively. The PA I/O port, consisting of terminals PA-0 through PA-7, is used to control the motor source drivers consisting of an inverter driver chip, such as Sprague Model 2803 and also to drive the motor sink drivers consisting of a non-inverting driver chip such as a Sprague Model 2983, the output terminals of which are interconnected in a well-known manner to provide a pair of bridge drive circuits connected to hot water drive motor 131 and cold water drive motor 132 as previously indicated in FIG. 5.

The PB I/O port, consisting of terminals PB-0 through PB-7, is used to provide output signals to keyboard matrix 14 discussed previously in conjunction with FIGS. 1 and 4, and also to provide ground returns for option switch array 11 on a selectable basis. The PC I/O port, comrising terminals PC-0 through PC-4, includes a 4-line input for option switch array 11, as well as keyboard return lines for keyboard matrix 14. In addition, terminal PC-4 provides a power fail input generated by threshold detector 164 during a failure of primary power to the system as discussed previously in conjunction with the trap terminal of microprocessor 18.

Additional terminals of RAM and I/O chip 166, consist of 8 address/data input lines, terminals AD-0 through AD-7, that interface with the microprocessor address/data lines AD-0 through AD-7 discussed previously in conjunction with FIG. 6. Also included in chip 166 is a chip enable terminal to activate the entire chip 166. An IO/M terminal selects either the input-output section or memory section of the chip 166 for the incoming address depending upon the logic state of the signal on that line. The WR and RD lines determine whether the 8 bit data applied to the RAM I/O chip 166 is to be written into the chip or read from the chip depending upon the logic state of those two input signals. In addition, a time-in signal from clock divider 152 and a timer-out signal from the RAM and I/O chip 166, provide timing at 100 HZ for all software functions. The ALE terminal transfers an address latch enable signal that latches both the address and the address/data lines AD-0 through AD-7, and the state of the chip enable and the IO/M signal into the RAM and I/O chip 166.

Relay drivers chip 12 and discrete display drivers chip 168 are each an 8-bit input-output port such as an INTEL, Model 8212 which consists of an 8-bit latch with 3-state output buffers with control and device selection logic. Relay drivers chip 12 controls four solid state relays which use the Motorola Model MOC 3010 optically isolated triac drivers, which control the application of AC power to a plurality of conventional AC outlets 190 in four identical relay assemblies of which relay assembly 172 is a typical example. Such microprocessor-controlled AC outlets may be used optionally with the present invention to control associated electrical devices such as a kitchen disposal unit and additional valves when the present invention is used to control the water temperature and flow rate of a kitchen sink or the like, or to concurrently control a drain valve, or tub/shower diverter valve or the like.

Discrete display drivers chip 168 provides means for controlling up to nine discrete LEDs that comprise the temperature indicating bar 102 of display 101 discussed previously in conjunction with FIG. 4.

Digital display drivers chip 170 consists of a single chip driver such as an INTERSIL, Model 7235, 4-digital display-decoder-driver which is used to control the temperature-timer alphanumeric display 16 as previously discussed in conjunction with FIGS. 1 and 4.

The hardware portion of the present invention, having been disclosed in sufficient degree to enable one skilled in the art to make and use the present invention, the software portion of the invention will now be described in detail in conjunction with FIGS. 8 through 36, and in conjunction with the listing of the program of a preferred embodiment of the invention, included herein as Appendix 1.

Figure 8:
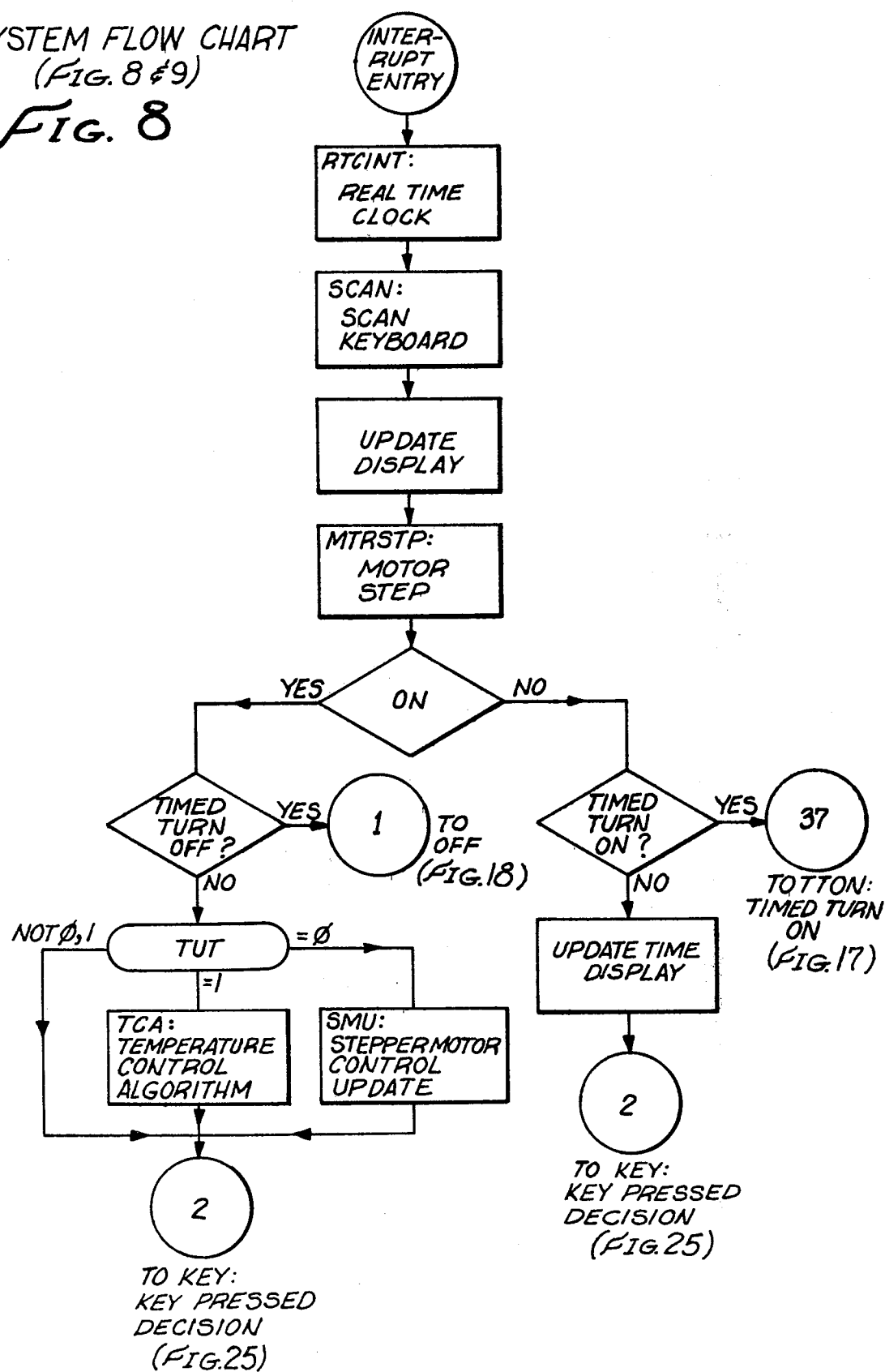
Figure 9:
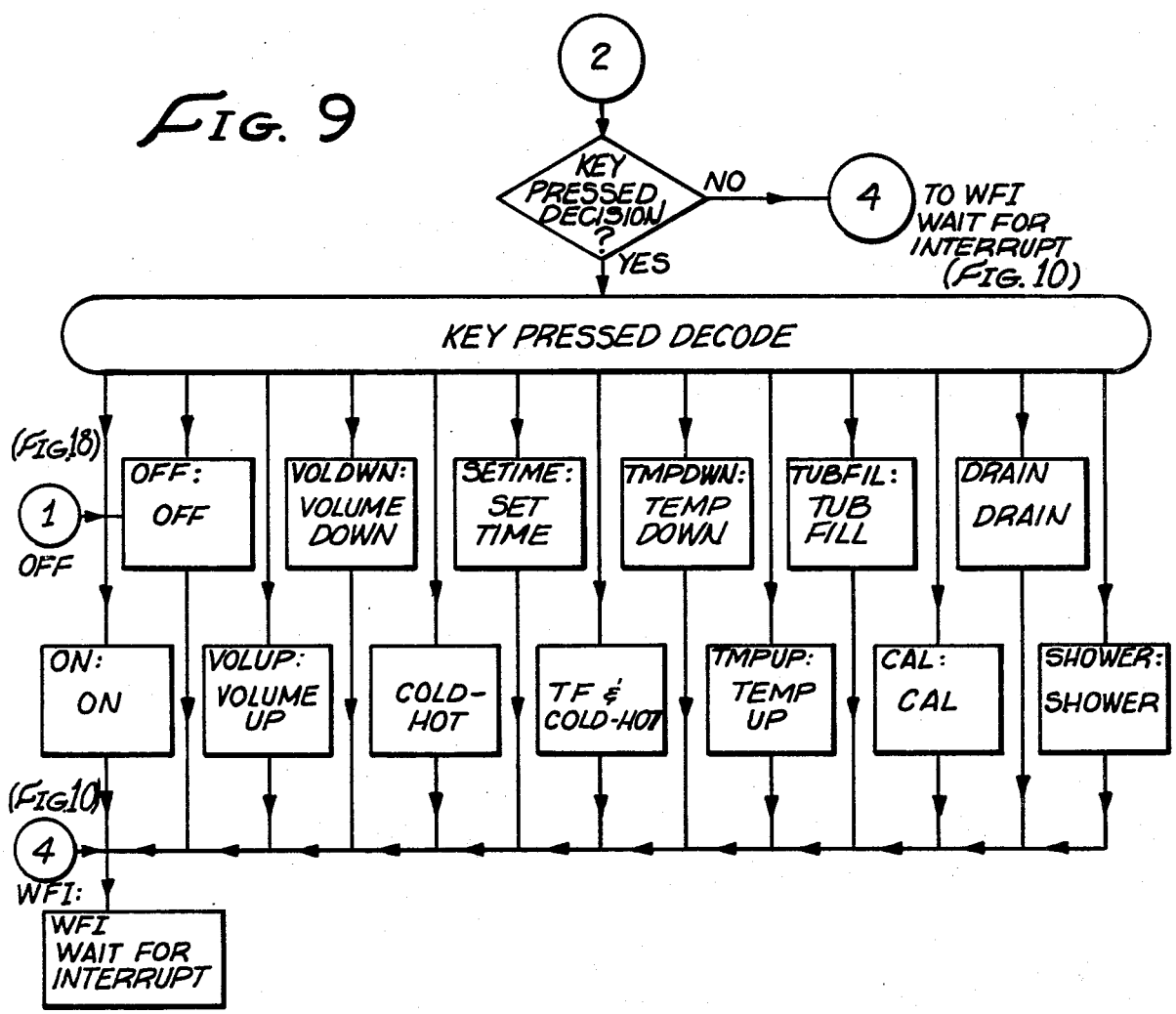
Figure 11:
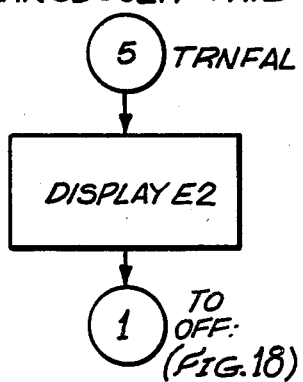
Figure 15:
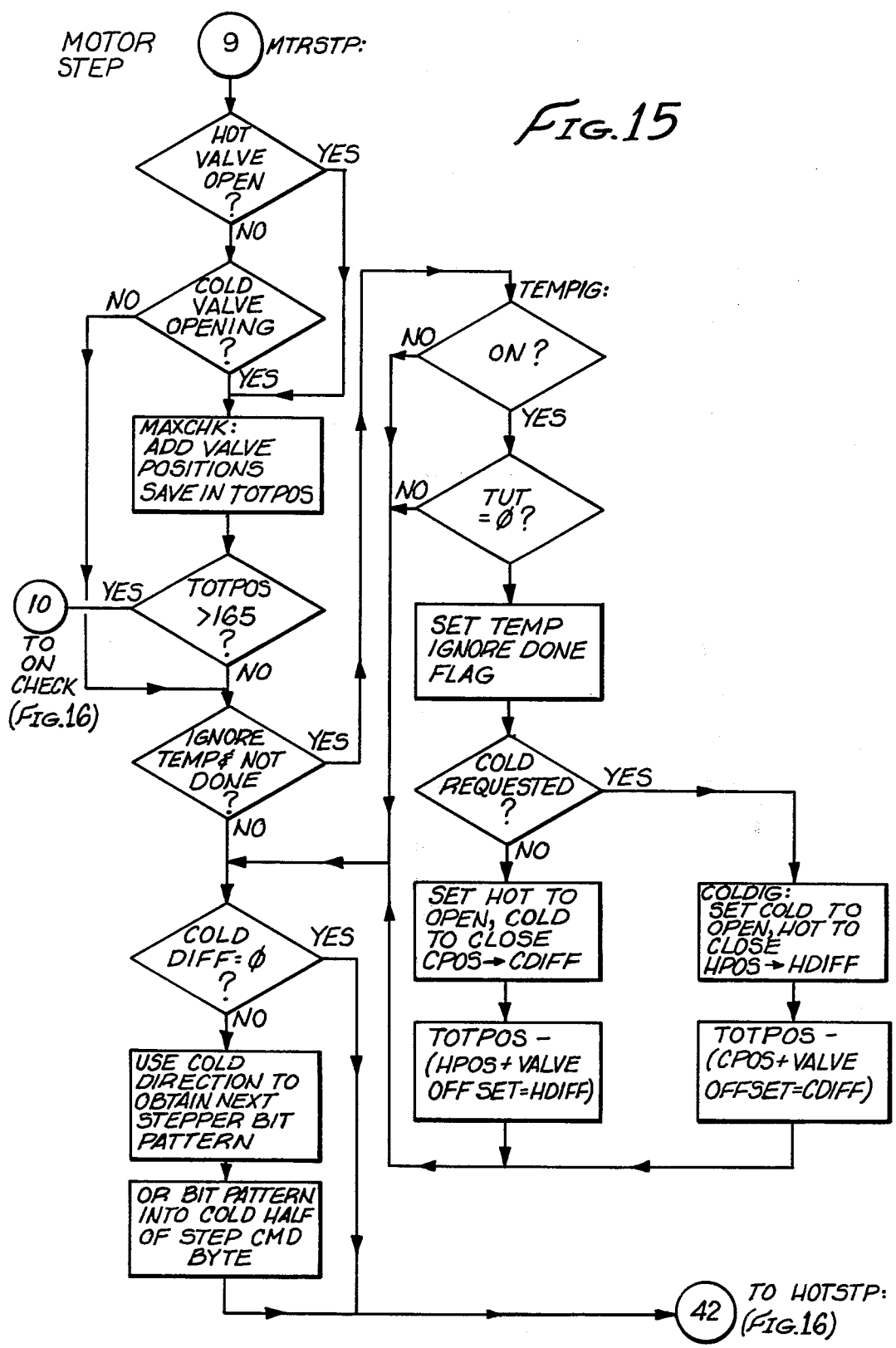
Figure 25:
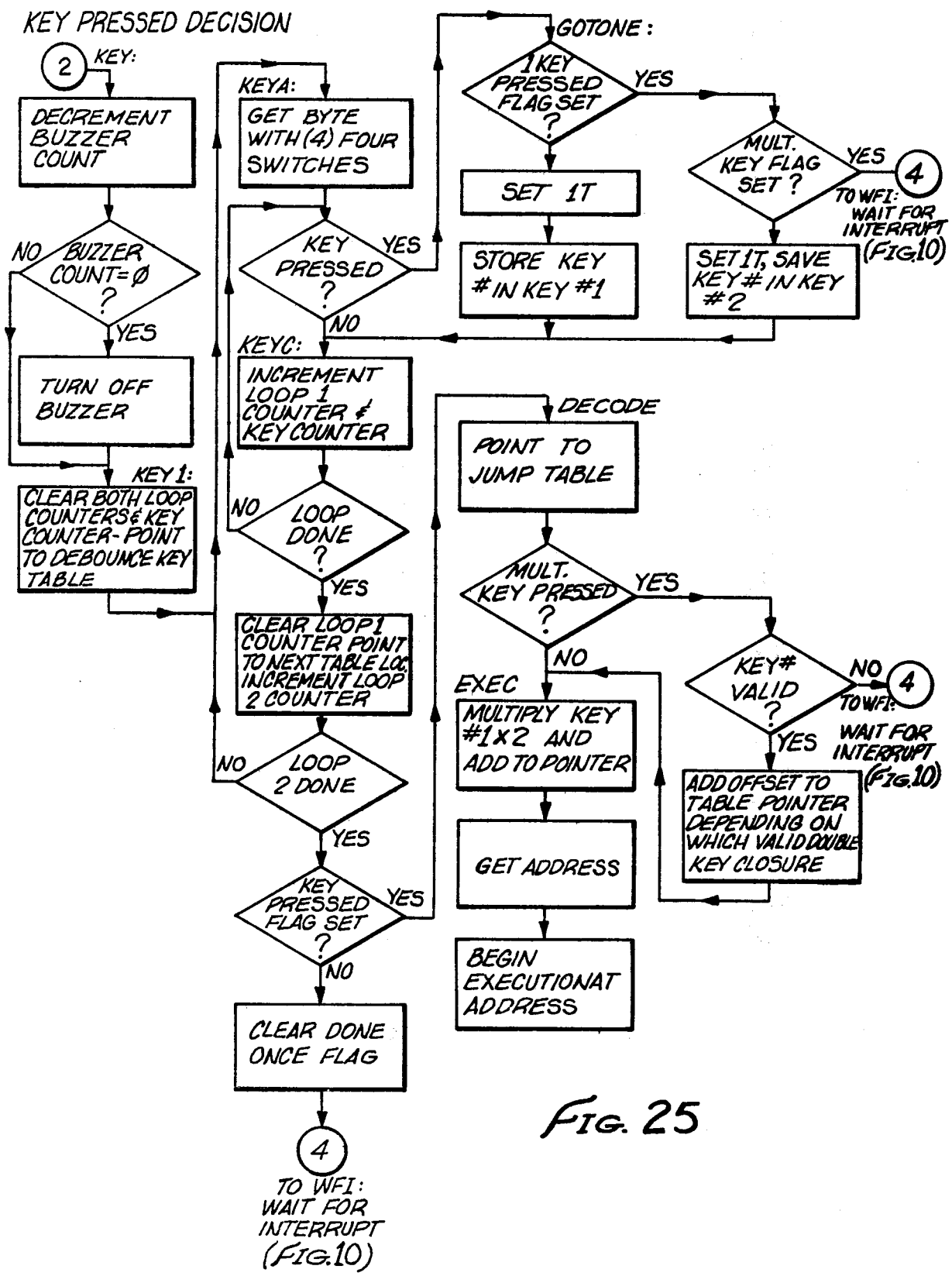
Figure 26:
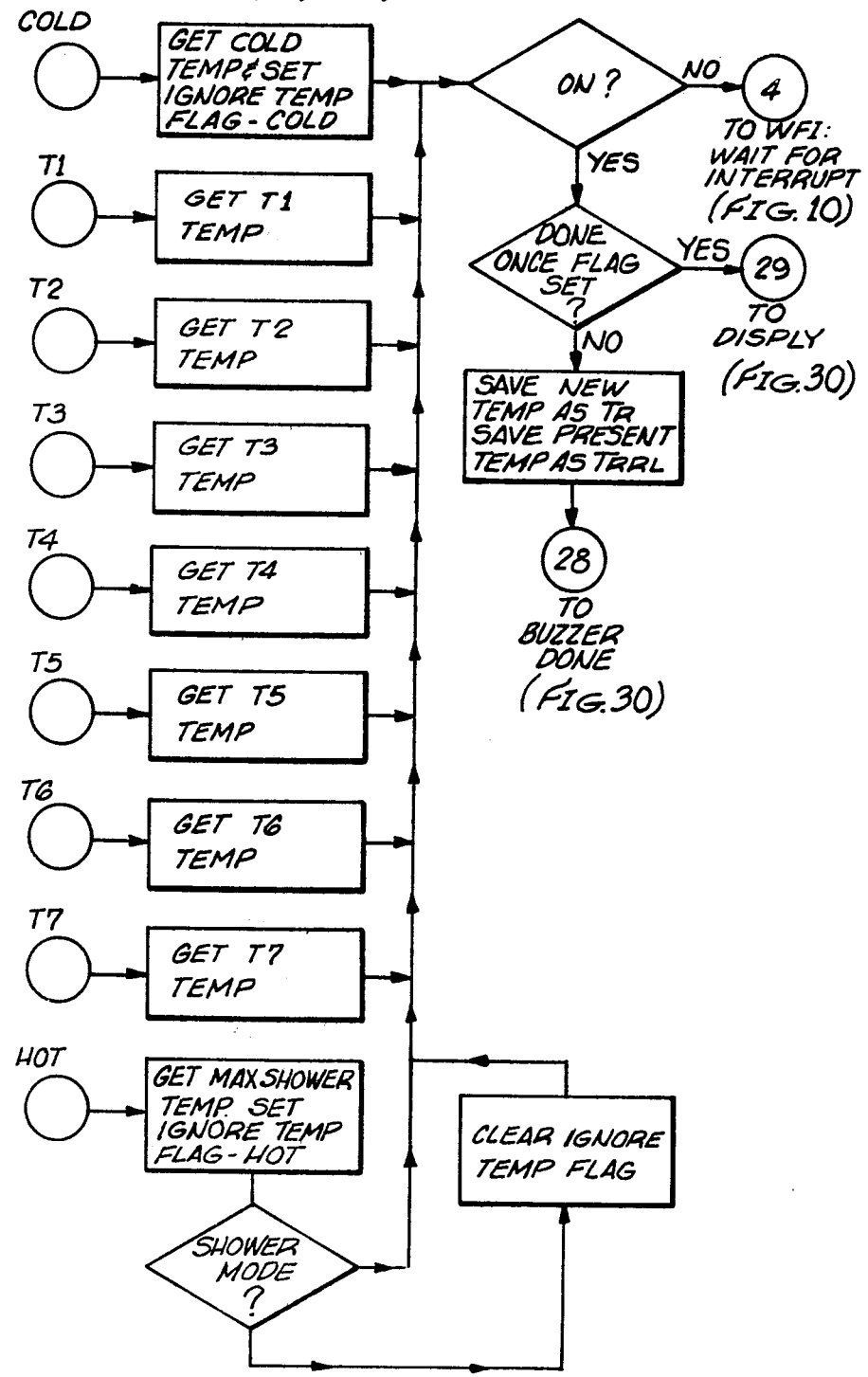
Figure 27:
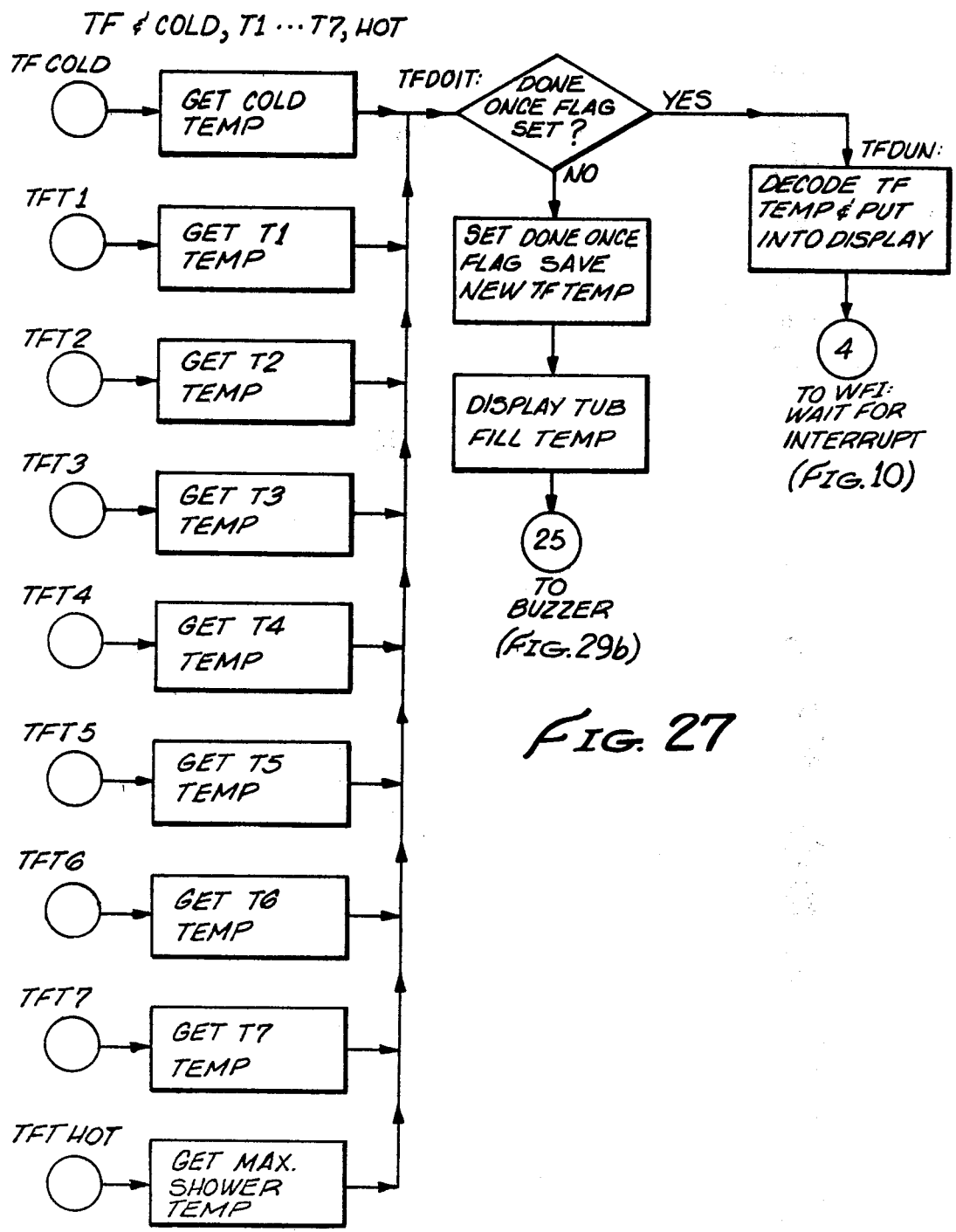
Figure 28A:
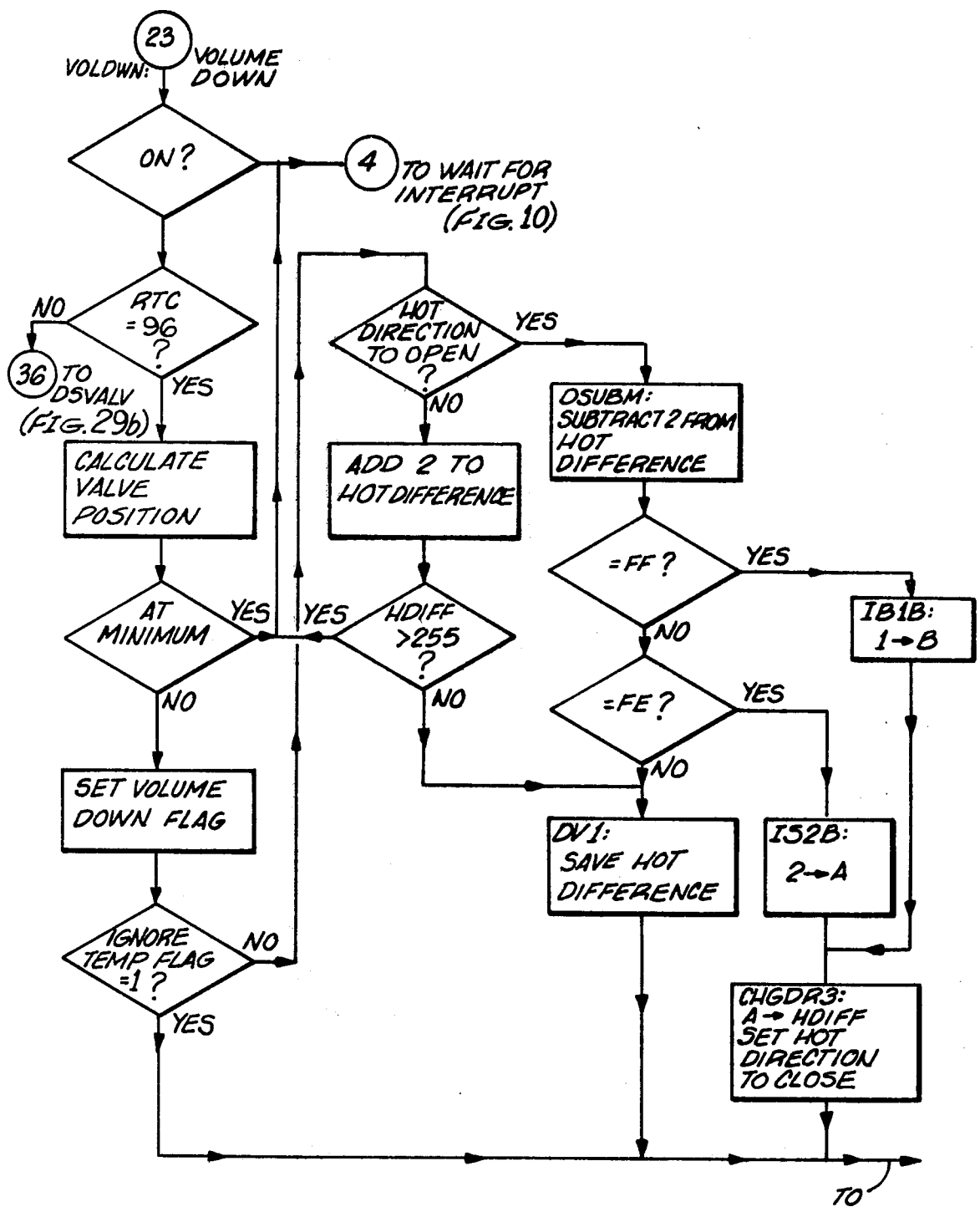
Figure 28B:
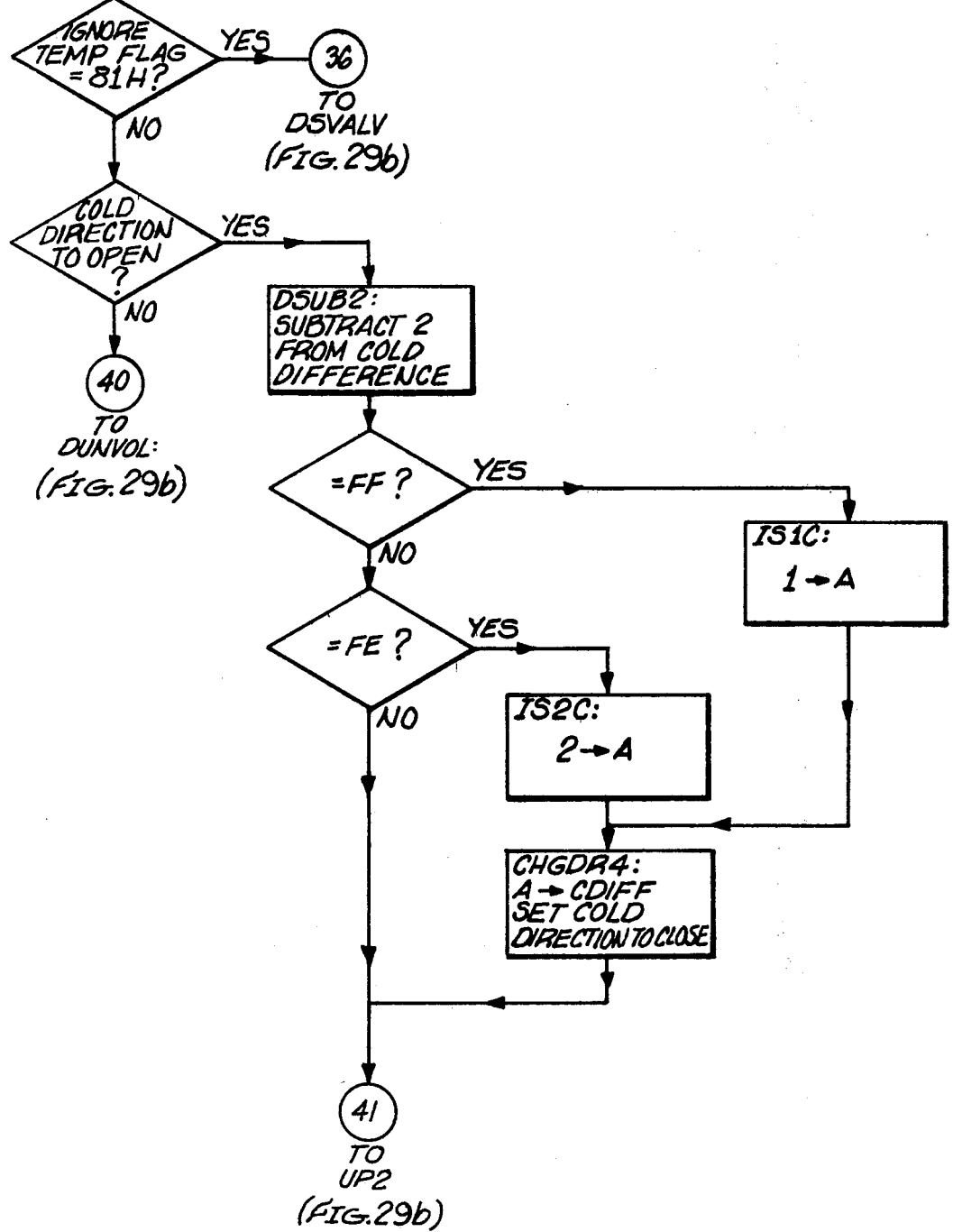
Figure 29A:
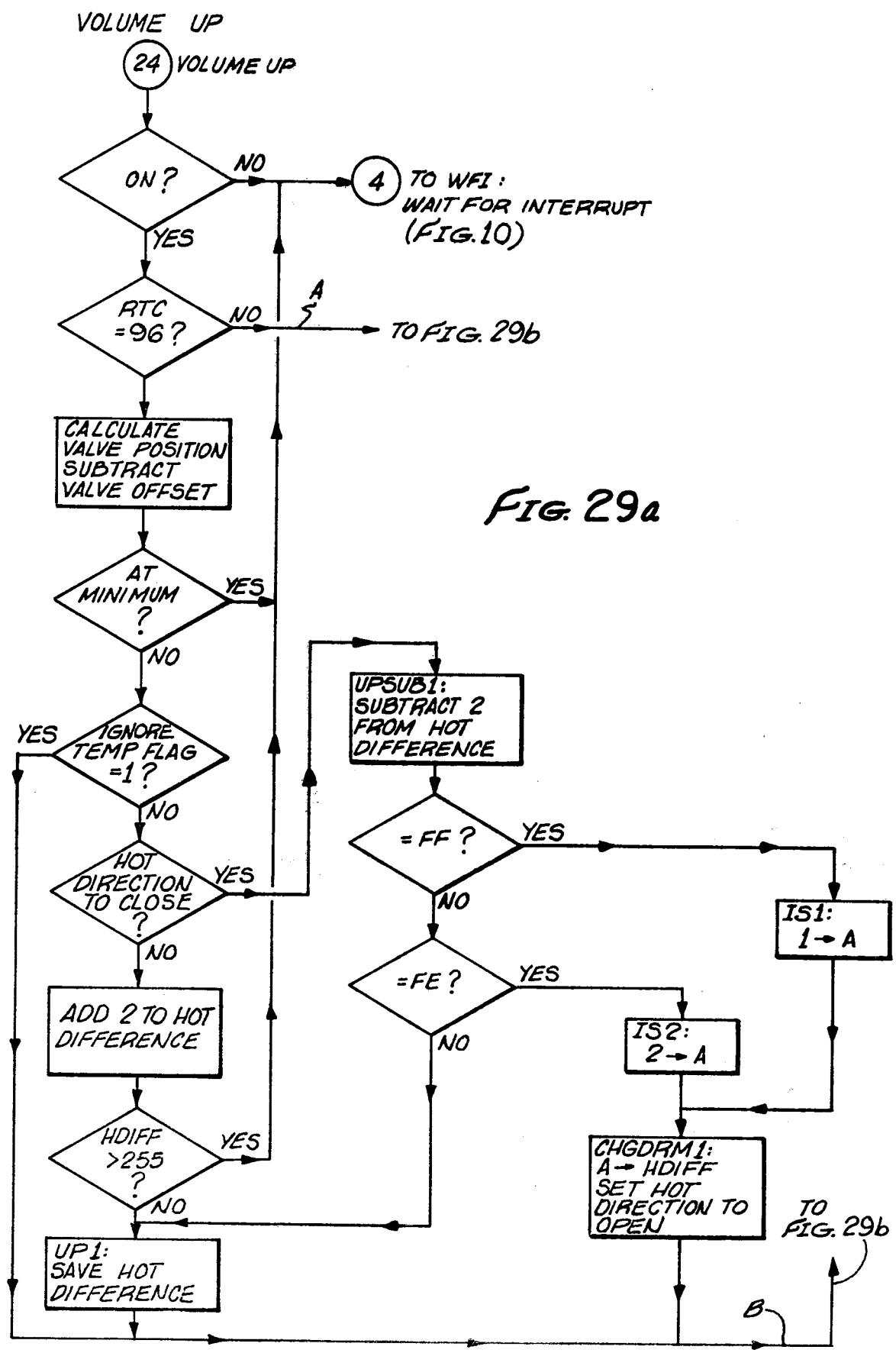
Figure 29B:
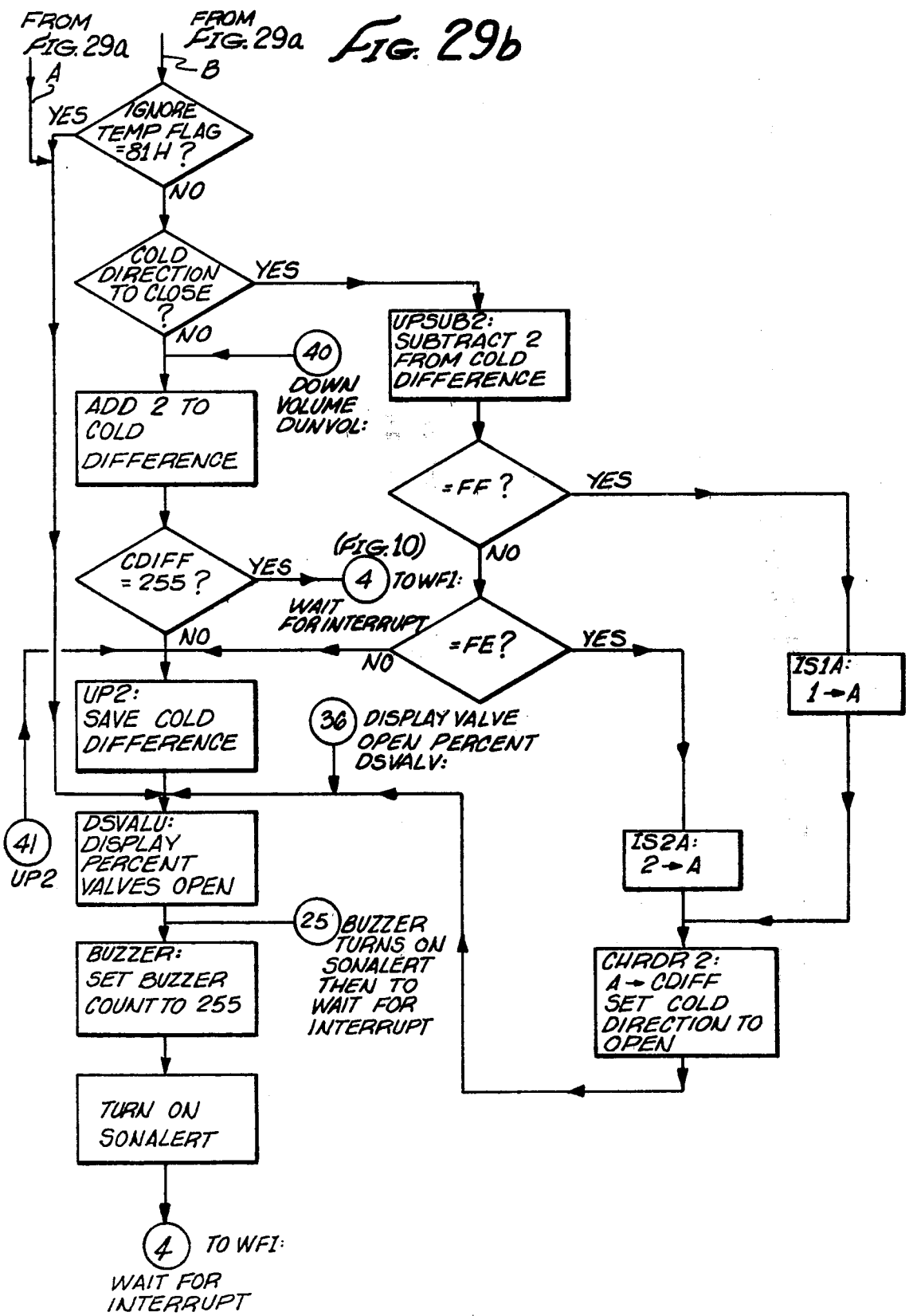
Figure 34:
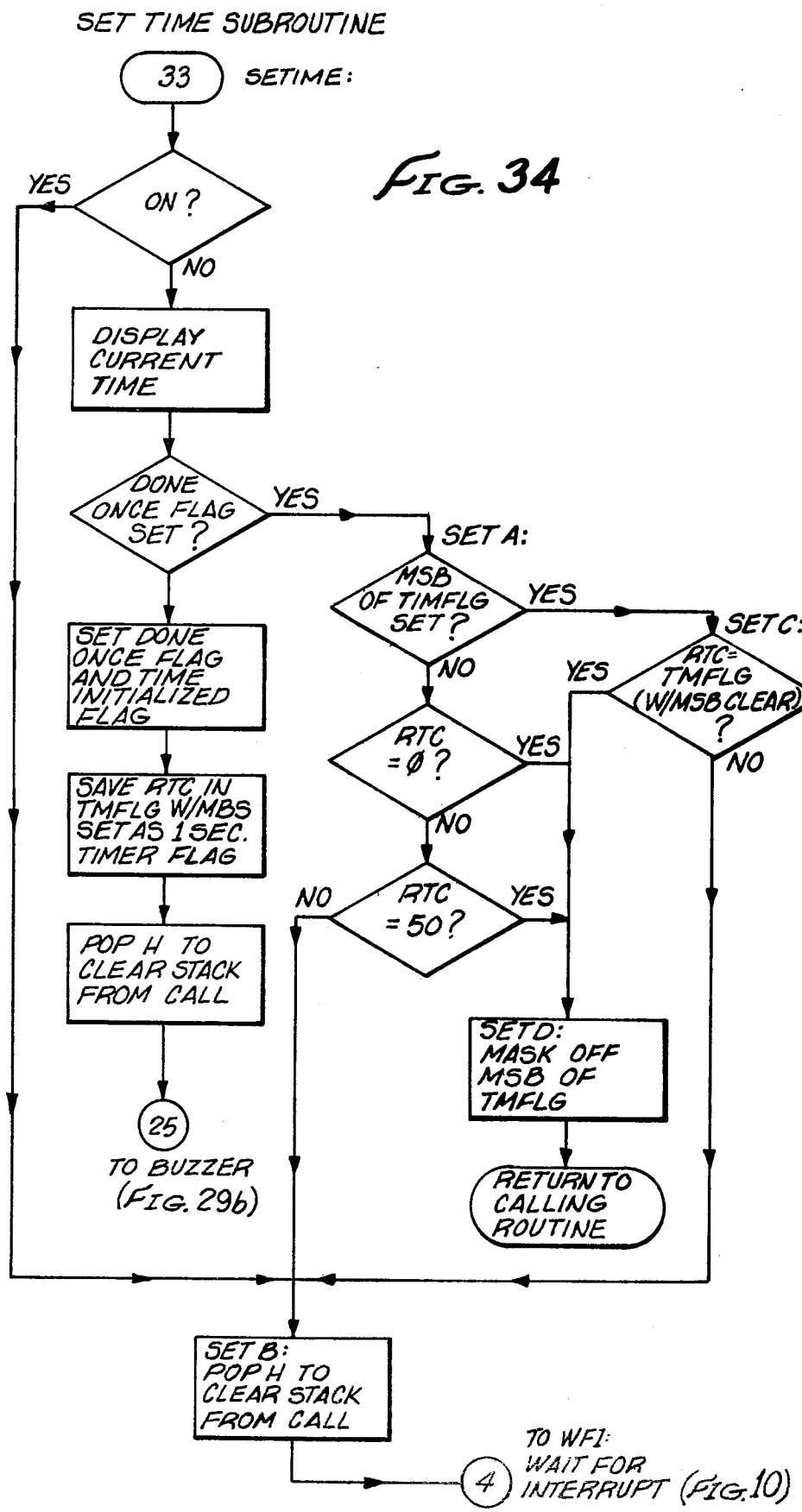

FIGS. 8 and 9, in combination, provide a general system flow chart. The remaining flow chart figures, namely, FIGS. 10-36 provide detailed flow charts of all the major routines and sub-routines of the program portion of the present invention. The flow charts comprising FIGS. 8-36, taken in conjunction with the detailed program listing comprising Appendix 1, provide those having ordinary skill in the art to which the present invention pertains with more than sufficient description of the program portion of the present invention. Accordingly, the description of FIGS. 8-36 and of Appendix 1 need only be sufficient to enable their interpretation by those skilled in the art. More specifically, FIGS. 8 and 9 provide a general system flow chart which comprises an overview of the software processes taking place during system operation. Each rectangle therein represents a routine or sub-routine which is more fully charted out in FIGS. 10-36. Where applicable, a flag abbreviation is also included in the reference to the routine or sub-routine to provide the necessary reference to find the corresponding statement or series of statements in the listing of Appendix 1.

By way of example, at the top-most portion of FIG. 8, the rectangle representative of the routine called real time clock refers to FIGS. 12a and 12b which constitute a flow chart description of the entire routine and illustrate the program interface to other routines tied in the real time clock routine. The flag used to identify the real time clock routine is "RTCINT". The last eight pages of the program listing comprising Appendix 1 lists all program statement flags in alphabetical order. Thus, if one wishes to find the statement line number in the listing of Appendix 1, which marks the beginning of the detailed step-by-step outline corresponding to real time clock, one need only refer to RTCINT in the alphabetical listing to find that the beginning line number, that is, that line number marked with an asterisk in the alphabetical listing, is 171. Referring to line number 171 in the listing of Appendix 1, it will be found that the step-by-step program statements for the entire RTCINT routine are provided beginning at line number 171 and that they continue through line number 213.

The line numbers are the listing of Appendix 1. The listing is provided in a standard computer print-out format in which the three columns immediately adjacent the line number represent the hexadecimal code of the address and instruction code of each statement. Similarly, the next three columns of the listing of Appendix 1, indicate the routine flag where appropriate and the statement instruction code in assembly language. Finally, the two right-most columns of the listing, to the right of the semicolon, include an Arabic number representative of the number of time states needed to complete an instruction, and a comment regarding the action taking place in response to the program statement.

Thus, in utilizing the flow charts of FIGS. 8–36 and the program listing of Appendix 1, one may, by way of example, refer first to the flow chart of FIG. 8 to note that the real time clock routine, labeled RTCINT, is provided in detail flow chart format in FIG. 12. One may then refer to FIG. 12 and the detailed program listing beginning at line number 171 to obtain an overview of the real time clock routine from the flow chart of FIG. 12 and a detailed step-by-step program statement of the routine including applicable addresses. The flow charts and listing thereby provide a complete description of the manner in which the present invention is programmed.

It will be understood that what has been described herein comprises a microprocessor-controlled system for delivering water at selected, controlled flow rate and temperatures and which includes a closed loop system for controlling water temperature in response to selection by the user. Also provided is a display of the output water temperature by means of a seven-segment display in a panel that may be set into a wall or deck usually in proximity to the water output means with which the present invention operates. It will be further understood that the present invention provides a microprocessor-controlled system which monitors actual output water temperature and compares the actual output water temperature to a selected output water temperature to generate electronic signals to control valves to change the actual output water temperature as needed to obtain the selected value. Also included in an open loop control of flow rate which allows flow rate to be selected and maintained constant as temperature changes are made and while the temperature control system is active.

While the invention has been described with particular reference to general purpose programmable computers and permanently programmed read only memory units, it will be understood that many features of the system which are presently programmed in software form may be embodied in hardware form. Likewise, those parts of the system which have been described as utilizing hardware programs may be embodied in software program form.

For purposes of simplifying the explanation, language has been utilized which may sound like it is concerned with mental processes but which, in fact, is concerned with physical processes. For example, the term data and particularly where reference is made to storage and transport thereof, refers specifically to information signals and data signals or other manifestations of information and data which are capable of physical manipulation. In the embodiment of the invention described, the symbols in question are stored in the computer unit in a binary form in charged cells, such cells usually being charged in one direction to represent a value 0 and in the opposite direction to represent a value 1 in the binary system. The term "transfer of data" and similar expressions refer to the manipulation of those signals or manifestations.

It is to be understood that while the invention has been described with particular reference to signals in binary form, signals in other logic forms such as trinary form may be considered within the scope of this invention. Furthermore, it is to be understood that while binary signals described herein in conjunction with this invention are considered to be in a positive or TRUE state when in a constant voltage level such as +5 volts DC and are considered to be in a negative or FALSE state when in a constant voltage level such as 0 volts DC, the scope of this invention also includes binary signals, the states of which depend upon their direction of change from one voltage level to another.

Many details of the type which would be obviously supplied by one skilled in the art have been omitted. For example, physical layouts of circuit components and their interconnections have not all been described. All of these and other details are of such a nature that they can be supplied by any one skilled in the art of designing electronic apparatus and programming computers.

The invention described herein may be employed in many different ways than those specifically set forth and many variations may be made therein within the scope of the appended claims.

```
                APPENDIX 1
    WATER TEMPERATURE AND FLOW RATE SELECTION DISPLAY AND CONTROL SYSTEM AND METHOD; DOCKET-3939
                         © 1980, PRICE-PFISTER BRASS MANUFACTURING COMPANY
PRICE PFISTER ELECTRONIC TOUCH CONTROL   09/30/80  11:30  .MACRO-80 3.36  17-Mar-80        PAGE   1-1

22
 23       ;***********************************************
 24       ;**                                           **
 25       ;**           ADDRESS DEFINITIONS             **
 26       ;**                                           **
 27       ;***********************************************
 28       ;
 29       ;**
 30       ;**   prom addresses
 31       ;**
 32
 33  0000 PROM0   EQU   0000H           ; Starting address of prom zero
 34  1000 PROM1   EQU   1000H           ; Starting address of prom one
 35
 36       ;**
 37       ;**   Ram addresses
 38       ;**
 39
 40  2000 RAM     EQU   2000H           ; Starting address of ram
 41
 42       PAGE
 43
 44       ;***********************************************
 45       ;**                                           **
 46       ;**           I/O ADDRESS DEFINITIONS         **
 47       ;**                                           **
 48       ;***********************************************
 49       ;
 50       ;**
 51       ;**   8155 port addresses
 52       ;**
 53
 54  A000 P8155CP EQU   0A000H          ; 8155 control port
 55  A001 STPMTR  EQU   0A001H          ; Stepper motor port
 56  A002 KEYSCN  EQU   0A002H          ; Keyboard scan port
 57  A002 SOUND   EQU   KEYSCN          ; Sonalert port
 58  A003 KEYRET  EQU   0A003H          ; Keyboard return port
 59  A004 TIMLOW  EQU   0A004H          ; Timer low byte
 60  A005 TIMHI   EQU   0A005H          ; Timer high byte
```

```
 64  ;***
 65  ;***   8212 port addresses
 66  ;***
 67  ;
 68  LEDS    EQU  0C000H         ; Temperature leds 0-7 port
 69  LEDTRI  EQU  0D000H         ; Temperature LED 8, drain led, colon, triacs
 70  ;
 71                              BIT 0  Hot LED     \
 72                                  1  Drain LED    \
 73                                  2  Colon         \  Saved in TRIOUT
 74                                  3  TRIAC1        /  all low active
 75                                  4  TRIAC2       /
 76                                  5  TRIAC3      /
 77                                  6  TRIAC4
 78                                  7  spare
 79  ;
 80  ;***
 81  ;***   7109 address
 82  ;***
 83  ;
 84  TEMP    EQU  0EFFFH         ; Temperature input (low) 0F00H (high)
 85  ;
 86  ;***
 87  ;***   72XX addresses
 88  ;***
 89  DISP0   EQU  0B000H         ; Right most display
 90  DISP1   EQU  DISP0+1        ; Next display to left
 91  DISP2   EQU  DISP0+2        ; Next display to left
 92  DISP3   EQU  DISP0+3        ; Left most display
 93  ;
 94          PAGE
 95  ;
 96  ;***********************************************
 97  ;**                                           **
 98  ;**        I/O BIT DEFINITIONS                *
 99  ;**                                           **
100  ;***********************************************
101  ;
102  ;
103  SOUNDB  EQU  10000000B      ; Sonalert bit
104  DRNLED  EQU  11111101B      ; Drain LED bit
105  COLONB  EQU  11111011B      ; Colon bit
106  TRIAC1  EQU  11110111B      ; Triac #1
107  TRIAC2  EQU  11101111B      ; Triac #2
108  TRIAC3  EQU  11011111B      ; Triac #3
109  TRIAC4  EQU  10111111B      ; Triac #4
110  ;
```

```
111   ;**********************************************************
112   ;**                                                      **
113   ;**          8085 INSTRUCTION DEFINITIONS                **
114   ;**                                                      **
115   ;**********************************************************
116   ;
117   SIM     MACRO
118           .SALL
119           DB      30H      ;  Set interrupt mask
120           ENDM
121   RIM     MACRO
122           .SALL
123           DB      20H      ;  Read interrupt mask
124           ENDM
125   ;
126   ;**********************************************************
127   ;**                                                      **
128   ;**              PROGRAM EQUATES                         **
129   ;**                                                      **
130   ;**********************************************************
131   ;
132                                                                      586A
133   TCNT     EQU    586AH    ; Timer divide count                      00C3
134   P8155MW  EQU    0C3H     ; 8155 mode word                          0004
135   TSTMAX   EQU    04H      ; Temperature sample time maxamum         0032
136   TUTMAX   EQU    50       ; Initial temperature update time         0020
137   VLVOS1   EQU    32       ; Offset of 1 valve                       0040
138   VLVOS2   EQU    VLVOS1*2 ; Offset of 2 valves
139   ;
140           PAGE
141   ;
142   ;**********************************************************
143   ;**                                                      **
144   ;**          STARTUP AND INTERRUPT                       **
145   ;**              VECTORS                                 **
146   ;**                                                      **
147   ;**********************************************************
148   ;
149   ;***
150   ;***    Power on jump
151   ;***
152                                                           0000'
153   START:  ORG     PROMO
154           JMP     INIT      ; 10  Go to initialization routines      0000'  C3 058F'
155   ;
156                                                           0024'
157   TRAP:   ORG     24H                                                0024'  C3 06DA'
158           JMP     PWRFAL    ; 10  Powerfail interrupt
159   ;
160           PAGE
```

```
161
162
163
164                              ORG      003CH         ; RST 7.5 interrupt
165   ;*******************************************
166   ;*                                         *
167   ;*         REAL TIME CLOCK                  *
168   ;*         INTERRUPT ROUTINES               *
169   ;*                                         *
170   ;*******************************************
171  003C  31 2100    RTCINT: LXI   SP,STACK    ; 10   Initialize stack pointer
172  003F  3A 2035            LDA   TST         ; 13   Time to update temp. sample
173  0042  B7                 ORA   A           ; 4
174  0043  C2 00EF            JNZ   DTST        ; 7/10 No? go decrement temp. sample counter
175  0046  3E 04              MVI   A,TSTMAX    ; 7    Set counter to maximum
176  0048  32 2035            STA   TST         ; 13
177  004B  2A EFFF            LHLD  TEMP        ; 16   Get new temperature
178  004E  7C                 MOV   A,H         ; 4
179  004F  E6 C0              ANI   0C0H        ; 7    set 2 MS bits
180  0051  EE 80              XRI   80H         ; 7    compliment MS bit
181  0053  C2 11B2            JNZ   TRNFAL      ; 7/10 no - transducer failure
182  0056  7C                 MOV   A,H         ; 4    set temp again
183  0057  E6 0F              ANI   0FH         ; 7    mask off MS 4 bits
184  0059  67                 MOV   H,A         ; 4    back to H
185  005A  22 2012            SHLD  TMP         ; 16   Save it
186  005D  EB                 XCHG              ; 4
187  005E  2A 201F            LHLD  TMPAVG      ; 16   Average temperature
188  0061  CD 16B7            CALL  ADDD        ; 18
189  0064  B7                 ORA   A           ; 4    clear carry
190  0065  7C                 MOV   A,H         ; 4    divide by 2
191  0066  1F                 RAR               ; 4
192  0067  67                 MOV   H,A         ; 4
193  0068  7D                 MOV   A,L         ; 4
194  0069  1F                 RAR               ; 4
195  006A  6F                 MOV   L,A         ; 4
196  006B  22 201F            SHLD  TMPAVG      ; 16   Save average
197  006E  3E C0              MVI   A,0C0H      ; 7    turn on A/D
198        SIM                                  ; 4
199  0070  30                 XCHG              ; 4    Find error
200  0071  EB                 LHLD              ; 16   from requested temp
201  0072  2A 2036            XCHG  TRRL        ; 4
202  0075  EB                 CALL  SUBT        ; 18
203  0076  CD 16E5            SHLD  TMPERR      ; 16   save Temperature error
204  0079  22 200E            MOV   A,H         ; 4
205  007C  7C                 ORA   A           ; 4    set flags
206  007D  B7                 JZ    MSBZIP      ; 7/10 sign positive
207  007E  CA 008F            CPI   0FFH        ; 7    negative?
208  0081  FE FF              JNZ   INTEGR      ; 7/10 positive or larger negative
209  0083  C2 009E            MOV   A,L         ; 4
210  0086  7D
```

```
211  0087'  FE F5         CPI   0F5H           ; 7 negative limit
212  0089'  D2 0095'      JNC   ZERINT         ; 7/10 >-10
213  008C'  C3 009E'      JMP   INTEGR         ; 10
214
215  008F'  7D            MSBZIP: MOV  A,L                ; 4
216  0090'  FE 0A         CPI   10             ; 7 positive limit
217  0092'  D2 009E'      JNC   INTEGR         ; 7/10 >10
218  0095'  21 0000       ZERINT: LXI  H,0                ; 10
219  0098'  22 2067'      SHLD  INTERR         ; 16 clear integral error
220  009B'  C3 00B0'      JMP   DIFERT         ; 10
221
222  009E'  3A 2044'      INTEGR: LDA  IGTMP              ; 13 set ignore temp flag
223  00A1'  E6 01         ANI   1              ; 7 ignore temp?
224  00A3'  C2 0095'      JNZ   ZERINT         ; 7/10 yes, clear integral error
225  00A6'  EB            XCHG                 ; 4
226  00A7'  2A 2067'      LHLD  INTERR         ; 16 set integral error
227  00AA'  CD 16B7'      CALL  ADDD           ; 18+174 TMPERR + INTERR = INTERR
228  00AD'  22 2067'      SHLD  INTERR         ; 16 save new integral error
229  00B0'  2A 200E'      DIFERT: LHLD TMPERR             ; 16 set temp error
230  00B3'  EB            XCHG                 ; 4
231  00B4'  2A 2053'      LHLD  LSTMPE         ; 16 set last temp error
232  00B7'  CD 16E5'      CALL  SUBT           ; 18+??? TMPERR - LSTMPE = DIFERR
233  00BA'  EB            XCHG                 ; 4 move TMPERR to H,L
234  00BB'  22 2053'      SHLD  LSTMPE         ; 16 save current TMPERR as last
235  00BE'  EB            XCHG                 ; 4 differential error to H,L
236  00BF'  01 0008       LXI   B,8            ; 10 multiplier
237  00C2'  CD 15C7'      CALL  MULT           ; 18+???
238  00C5'  EB            XCHG                 ; 4 result to H,L
239  00C6'  22 2010'      SHLD  DIFERR         ; 16 save multiplied differential error
240  00C9'  3A 2040'      LDA   ONFL           ; 13 set on flag
241  00CC'  B7            ORA   A              ; 4 off?
242  00CD'  C2 00FB'      JNZ   RTCT           ; 7/10 no bypass motor shut off
243  00D0'  3A 202A'      LDA   HDIFF          ; 13 set hot difference
244  00D3'  B7            ORA   A              ; 4 done?
245  00D4'  C2 00FB'      JNZ   RTCT           ; 7/10 no
246  00D7'  3A 2029'      LDA   CDIFF          ; 13 set cold difference
247  00DA'  B7            ORA   A              ; 4 done?
248  00DB'  C2 00FB'      JNZ   RTCT           ; 7/10 no
249  00DE'  AF            XRA   A              ; 4
250  00DF'  32 A001       STA   STPMTR         ; 13 turn off motor - off and done stepping
251  00E2'  32 201E'      STA   STPBYT         ; 13 save
252  00E5'  3A 2069'      LDA   PWROFF         ; 13 set power fail flag
253  00E8'  B7            ORA   A              ; 4
254  00E9'  C2 058F'      JNZ   INIT           ; 7/10 re-initialize
255  00EC'  C3 00FB'      JMP   RTCT           ; 10 Temporary jump to RTC test
256
257  00EF'  3D            DTST: DCR  A                    ; 4 Decrement temperature sample time
258  00F0'  32 2035'      STA   TST            ; 13 Save it
259  00F3'  FE 01         CPI   1              ; 7 Is it equal to one?
260  00F5'  CA 00FB'      JZ    RTCT           ; 7/10 Goto RTC test if not
```

```
261                                              MVI   A,40H      ; 7   Setup to stop A/D
262                                              SIM              ; 4   Do it
263
264   00FA'  3A 2033'                   RTCT:    LDA   RTC        ;13   Get RTC byte
265   00FB'  B7                                  ORA   A          ; 4   Is it a zero?
266   00FE'  CA 0109'                            JZ    RTCM       ;7/10 Goto RTC max if it is
267   00FF'  3D                                  DCR   A          ; 4   Decrement RTC
268   0102'  32 2033'                            STA   RTC        ;13   Save RTC
269   0103'  C3 0168'                            JMP   TUTR       ;10   Goto temperature update routine
270
271   0109'  3E 63                      RTCM:    MVI   A,99       ; 7   Set RTC to 99
272   010B'  32 2033'                            STA   RTC        ;13   Save it
273
274        ;***************************************************
275        ;**                                               **
276        ;**         UPDATE TIME ROUTINE                   **
277        ;**                                               **
278        ;***************************************************
279
280   010E'  3A 204C'                            LDA   TINT       ;13   Get time initialized flag
281   0111'  B7                                  ORA   A          ; 4   Is time initialized?
282   0112'  C2 011C'                            JNZ   SECT       ;7/10 Goto second test if it is
283   0115'  3C                                  INR   A          ; 7   Set display flash flag
284   0116'  CD 11BA'                            CALL  ERRDIS     ;18+153 Error display routine
285   0119'  C3 0168'                            JMP   TUTR       ;10   go update temp
286
287   011C'  AF                         SECT:    XRA   A          ; 4   clear error display flag
288   011D'  32 203E'                            STA   ERRFLG     ;13   clear display flash flag
289   0120'  32 204D'                            STA   DFF        ;13   clear display flash flag
290   0123'  3A 203A'                            LDA   SEC        ;13   Get seconds
291   0126'  FE 3B                               CPI   59         ; 7   Are seconds equal to 59?
292   0128'  CA 0132'                            JZ    SETS       ;7/10 Jump to set seconds if so
293   012B'  3C                                  INR   A          ; 4   Increment seconds
294   012C'  32 203A'                            STA   SEC        ;13   Save seconds
295   012F'  C3 0168'                            JMP   TUTR       ;10   Goto temperature update routine
296
297   0132'  AF                         SETS:    XRA   A          ; 4   Set seconds to 00
298   0133'  32 203A'                            STA   SEC        ;13   Save seconds
299   0136'  3A 203B'                            LDA   MIN        ;13   Get minutes
300   0139'  FE 59                               CPI   59H        ; 7   Are minutes equal to 59
301   013B'  CA 0147'                            JZ    SETM       ;7/10 Jump to set minutes if so
302   013E'  3F                                  CMC              ; 4   compliment carry for decimal adjust
303   013F'  3C                                  INR   A          ; 4   Increment minutes
304   0140'  27                                  DAA              ; 4   Decimal adjust minutes
305   0141'  32 203B'                            STA   MIN        ;13   Save minutes
306   0144'  C3 0168'                            JMP   TUTR       ;10   Goto temperature update routine
307
308   0147'  AF                         SETM:    XRA   A          ; 4   Set minutes to 0
309   0148'  32 203B'                            STA   MIN        ;13   Save minutes
310   014B'  3A 203C'                            LDA   HRS        ;13   Get hours
```

```
311  014E'  FE 12      CPI   12H           ; 7   Are hours equal to 12
312  0150'  CA 015C'   JZ    SETH          ; 7/10 Jump to set hours if so
313  0153'  3F         CMC                 ; 4   compliment carry for decimal adjust
314  0154'  3C         INR   A             ; 4   Increment hours
315  0155'  27         DAA                 ; 4   Decimal adjust hours
316  0156'  32 203C'   STA   HRS           ; 13  Save hours
317  0159'  C3 0168'   JMP   TUTR          ; 10  Goto temperature update routine
318
319  015C'  3E 01      SETH: MVI   A,1     ; 7   Set hours to 1
320  015E'  32 203C'   STA   HRS           ; 13  Save hours
321  0161'  3A 203D'   LDA   AMPM          ; 13  Get AM/PM flag
322  0164'  2F         CMA                 ; 4   Compliment AM/PM flag
323  0165'  32 203D'   STA   AMPM          ; 13  Save AM/PM flag
324  0168'  3A 2034'   TUTR: LDA   TUT     ; 13  Get Temperature Update Time counter
325  016B'  B7         ORA   A             ; 4   Is it equal to zero?
326  016C'  CA 0173'   JZ    TUTM          ; 7/10 Jump to TUT max if it is
327  016F'  3D         DCR   A             ; 4   Decrement TUT
328  0170'  C3 0175'   JMP   STUT          ; 10  Jump to Save TUT
329
330  0173'  3E 32      TUTM: MVI   A,TUTMAX ; 7  Set temp update time to max.
331  0175'  32 2034'   STUT: STA   TUT     ; 13  Save TUT
332
333  0178'  3A 204A'   LDA   CALFLG        ; 13  set calibrate flag
334  017B'  B7         ORA   A             ; 4   calibrate function?
335  017C'  CA 0182'   JZ    SCAN          ; 7/10 no
336  017F'  CD 142B'   CALL  UPDTMP        ; 18+??? yes - update temp display
337
338  ;******************************************************
339  ;**                                                  **
340  ;**          SCAN KEYBOARD ROUTINE                   **
341  ;**                                                  **
342  ;******************************************************
343
344  0182'  21 2004'   SCAN: LXI   H,NKEY+4 ; 10  Load address of newkey table
345  0185'  11 2009'   LXI   D,DBKEY+4     ; 10  Load address of debounced key table
346  0188'  3E 6F      MVI   A,6FH         ; 7   Initial keyscan value
347  018A'  32 A002'   STA   KEYSCN        ; 13  Output to keyboard
348  018D'  E3         SCNLP: XTHL         ; 16  Kill some time for cable ringing
349  018E'  E3         XTHL                ; 16  Put things back as they where
350  018F'  3A A003'   LDA   KEYRET        ; 13  Input from keyboard return
351  0192'  2F         CMA                 ; 4   Invert it
352  0193'  E6 0F      ANI   0FH           ; 7   only LS 4 bits
353  0195'  47         MOV   B,A           ; 4   save original scan
354  0196'  A6         ANA   M             ; 4   Debounce newkey
355  0197'  12         STAX  D             ; 7   Save in debounce table
356  0198'  70         MOV   M,B           ; 7   Save original scan in new key table
357  0199'  3A A002'   LDA   KEYSCN        ; 13  Get last keyscan value
358  019C'  1F         RAR                 ; 4   Move scan bit over
359  019D'  F6 40      ORI   40H           ; 7   Set MSB high
360  019F'  32 A002'   STA   KEYSCN        ; 7   Put scan pattern back
```

```
361  01A2'  1D              DCR     E                ; 4 update debounce key table pointer
362  01A3'  2D              DCR     L                ; 4 update newkey table pointer
363  01A4'  F2 0180'        JP      SCNLP            ; 7/10 Go back if we havent scanned all keys
364
365                         PAGE
366
367        ;****************************************************
368        ;**                                                **
369        ;**         UPDATE DISPLAY ROUTINE                 **
370        ;**                                                **
371        ;****************************************************
372
373
374  01A7'  3A 204D'        LDA     DFF              ; 13  Get display flash flag
375  01AA'  B7              ORA     A                ; 4   Is it set (flash display)?
376  01AB'  CA 01CF'        JZ      MOVDT            ; 7/10 If not, goto Move Display Table
377  01AE'  3A 2034'        LDA     TUT              ; 13  Get temperature update time flag
378  01B1'  B7              ORA     A                ; 4   Is TUT equal to zero?
379  01B2'  C2 01BC'        JNZ     DOFFT            ; 7/10 If not, goto display off test
380  01B5'  3A 203F'        LDA     DFL              ; 13  Get display on/off flag
381  01B8'  2F              CMA                      ; 4   Complement it
382  01B9'  32 203F'        STA     DFL              ; 13  Save display on/off flag
383  01BC'  3A 203F'  DOFFT: LDA    DFL              ; 13  Get display on/off flag
384  01BF'  B7              ORA     A                ; 4   Is display on?
385  01C0'  C2 01CF'        JNZ     MOVDT            ; 7/10 Goto Move display
386  01C3'  21 0F0F'        LXI     H,0F0FH          ; 10\
387  01C6'  22 B000'        SHLD    DISP0            ; 16  Blank display table
388  01C9'  22 B002'        SHLD    DISP2            ; 16/
389  01CC'  C3 01DB'        JMP     TEMLED           ; 10  bypass table to display move
390
391        ; MOVE DISPLAY TABLE TO DISPLAY PORT
392
393  01CF'  2A 200A'  MOVDT: LHLD   DTAB             ; 16  First two bytes
394  01D2'  22 B000'        SHLD    DISP0            ; 16  Store
395  01D5'  2A 200C'        LHLD    DTAB+2           ; 16  Second two bytes
396  01D8'  22 B002'        SHLD    DISP2            ; 16  Store
397
398        ; TEMLED - LIGHTS;CORRECT TEMPERTURE LED
399
400  01DB'  0E 07     TEMLED: MVI   C,7              ; 7   set counter
401  01DD'  21 14F6'        LXI     H,TMPEND+1       ; 10  Get table address
402  01E0'  E5              PUSH    H                ; 12  Save table address on stack
403  01E1'  2A 2038'        LHLD    TR               ; 16  Get temp required for subtract
404  01E4'  E3        LED1: XTHL                     ; 16  Save on stack , set address
405  01E5'  56              MOV     D,M              ; 4  \
406  01E6'  2B              DCX     H                ; 4   \ Get table contents and decrement
407  01E7'  5E              MOV     E,M              ; 4   / for next table location
408  01E8'  2B              DCX     H                ; 4  /
409  01E9'  E3              XTHL                     ; 16  New address to stack,TR to H,L,tbl to D,E
410  01EA'  EB              XCHG                     ; 4   Tbl to H,L , TR to D,E
```

```
411  01EB'  CD 16E5'           CALL  SUBT           ; 18 Subtract subroutine
412  01EE'  FA 0207'           JM    LED2           ; 7/10 found temp.
413  01F1'  7D                 MOV   A,L            ; 4  Was result
414  01F2'  B4                 ORA   H              ; 4  zero?
415  01F3'  CA 0207'           JZ    LED2           ; 7/10 Yes - found temp.
416  01F6'  0D                 DCR   C              ; 4  Decrement counter
417  01F7'  F2 01E1'           JP    LED1           ; 7/10 Not done with table yet
418                    ; Done with table - LED is last one -- HOT
419  01FA'  3E FF              MVI   A,0FFH         ; 7  turn off low 8 LED's
420  01FC'  32 C000            STA   LEDS           ; 13
421  01FF'  3A 2025'           LDA   TRIOUT         ; 13 Get current output word
422  0202'  E6 FE              ANI   0FEH           ; 7  Set HOT LED bit
423  0204'  C3 021A'           JMP   LED4           ; 10 To store
424  ;
425  0207'  79         LED2:   MOV   A,C            ; 4  Count to A
426  0208'  21 14FF'           LXI   H,LEDTBL       ; 10 Point LED table
427  020B'  85                 ADD   L              ; 4  Add count as index into table
428  020C'  D2 0210'           JNC   LED3           ; 7/10 No need to increment H
429  020F'  24                 INR   H              ; 4  Was carry,increment H
430  0210'  6F         LED3:   MOV   L,A            ; 4  Restore L after add
431  0211'  7E                 MOV   A,M            ; 4  Move table value to A
432  0212'  32 C000            STA   LEDS           ; 13 Write to port - turn on correct LED
433  0215'  3A 2025'           LDA   TRIOUT         ; 13 Get TRIAC output
434  0218'  F6 01              ORI   1              ; 4  Turn off bit 0
435  021A'  32 2025'   LED4:   STA   TRIOUT         ; 13 Save
436  021D'  32 D000            STA   LEDTRI         ; 13 To output port
437  ;
438                    PAGE
439  ;********************************************
440  ;*                                          *
441  ;*       MOTOR STEP ROUTINE                 *
442  ;*                                          *
443  ;********************************************
444  ;
445
446
447  0220'  3A 202C'   MTRSTP: LDA   HDIR           ; 13 set hot direction
448  0223'  B7                 ORA   A              ; 4
449  0224'  CA 022E'           JZ    MAXCHK         ; 7/10 openings, check limits
450  0227'  3A 022B'           LDA   CDIR           ; 13 set cold direction
451  022A'  B7                 ORA   A              ; 4
452  022B'  C2 024C'           JNZ   STP            ; 7/10 both closing, go step
453  022E'  3A 204B'   MAXCHK: LDA   DWNFLG         ; 13 set volume down flag
454  0231'  B7                 ORA   A              ; 4
455  0232'  C2 024C'           JNZ   STP            ; 7/10 is volume down, bypass max check
456  0235'  3A 2028'           LDA   HPOS           ; 13 set hot position
457  0238'  5F                 MOV   E,A            ; 4
458  0239'  3A 2027'           LDA   CPOS           ; 13 set cold position
459  023C'  6F                 MOV   L,A            ; 4
460  023D'  16 00              MVI   D,0            ; 7
```

```
461         62              MOV     H,D             ; 4  clear MSBs for 16 bit add
462  0240'  CD 16B7'        CALL    ADDD            ; 18+174 add positions
463  0243'  22 2061'        SHLD    TOTPOS          ; 16 save total positions
464  0246'  7D              MOV     A,L             ; 4
465  0247'  FE 45           CPI     VLVOS2+101      ; 7  combined valve position at max
466  0249'  D2 0362'        JNC     ONCHEK          ; 7/10 yes >165
467  024C'  3A 2044'        LDA     IGTMP           ; 13 set ignore temp flag
468  024F'  47              MOV     B,A             ; 4  save
469  0250'  E6 41           ANI     41H             ; 7  only bit 0,6
470  0252'  FE 01           CPI     1               ; 7  bit 0=1,bit 6=0
471  0254'  CC 02E2'        CZ      TEMPIG          ; 7/10 if set, ignore temp
472  0257'  3A 2029'        LDA     CDIFF           ; 13 cold difference
473  025A'  B7              ORA     A               ; 4  is it zero?
474  025B'  CA 027E'        JZ      STEPB           ; 7/10 yes - don't step cold
475  025E'  3D              DCR     A               ; 4  will take step on cold
476  025F'  32 2029'        STA     CDIFF           ; 13 decrement cold difference
477  0262'  3A 2027'        LDA     CPOS            ; 13 cold position
478  0265'  47              MOV     B,A             ; 4  save in B
479  0266'  3A 202B'        LDA     CDIR            ; 13 cold direction
480  0269'  B7              ORA     A               ; 4  is it open?
481  026A'  CA 029F'        JZ      CLD1            ; 7/10 yes - increment position
482  026D'  3A 2040'        LDA     ONFL            ; 13 set on flag
483  0270'  B7              ORA     A               ; 4  on?
484  0271'  CA 0296'        JZ      COFFMN          ; 7/10 no, go to cold off minimum
485  0274'  78              MOV     A,B             ; 4  set Cold Position
486  0275'  FE 20           CPI     VLVOS1          ; 7  on minimum?
487  0277'  CA 027E'        JZ      STEPB           ; 7/10 yes
488  027A'  3D              DCR     A               ; 4  decrement position
489  027B'  C3 02A6'        JMP     CLD2            ; 10 so on
                         ;
490  027E'  3A 2044'  STEPB:  LDA     IGTMP         ; 13 set ignore temperature flag
491  0281'  B7              ORA     A               ; 4
492  0282'  C2 02BB'        JNZ     HOTSTP          ; 7/10 hot or cold requested
493  0285'  3A 204B'        LDA     DWNFLG          ; 13 set volume down flag
494  0288'  B7              ORA     A               ; 4
495  0289'  C2 02BB'        JNZ     HOTSTP          ; 7/10 is volume down
496  028C'  3A 2040'        LDA     ONFL            ; 13 if off step hot
497  028F'  B7              ORA     A               ; 4
498  0290'  CA 02BB'        JZ      HOTSTP          ; 7/10 off
499  0293'  C3 0362'        JMP     ONCHEK          ; 10 cold closed & not vol dwn or not hot
                         ;
500  0296'  78        COFFMN: MOV   A,B             ; 4  set Cold Position
501  0297'  B7              ORA     A               ; 4  off minimum?
502  0298'  CA 02BB'        JZ      HOTSTP          ; 7/10 yes
503  029B'  3D              DCR     A               ; 4  decrement position
504  029C'  C3 02A6'        JMP     CLD2            ; 10
                         ;
505  029F'  78        CLD1:   MOV   A,B             ; 4  set Cold Position
506  02A0'  3C              INR     A               ; 4  increment position
507  02A1'  FE 84           CPI     VLVOS1+100      ; 7  maximum open?
```

```
511  02A3'  D2 02BB'         JNC   HOTSTP    ; 7/10 yes
512  02A6'  32 2027          STA   CPOS      ; 13 save new position
513  02A9'  E6 07            ANI   7         ; 7 isolate LS 3 bits
514  02AB'  21 14F7'         LXI   H,MST     ; 10 point to motor sequence table
515  02AE'  85               ADD   L         ; 4 indexes into table
516  02AF'  6F               MOV   L,A       ; 4 put back into L
517  02B0'  7E               MOV   A,M       ; 7 table value into A
518  02B1'  4F               MOV   C,A       ; 4 save in C
519  02B2'  3A 201E'         LDA   STPBYT    ; 13 set last step byte
520  02B5'  E6 F0            ANI   0F0H      ; 7 clear LS nibble
521  02B7'  B1               ORA   C         ; 4 OR in new cold step
522  02B8'  32 201E'         STA   STPBYT    ; 13 save
523  02BB'  3A 202A'         LDA   HDIFF     ; 13 hot difference
524  02BE'  B7               ORA   A         ; 4 is it zero?
525  02BF'  CA 035C'         JZ    STEP      ; 7/10 yes - go update stepper motor
526  02C2'  3D               DCR   A         ; 4 will take step on hot
527  02C3'  32 202A'         STA   HDIFF     ; 13 decrement hot difference
528  02C6'  3A 2028'         LDA   HPOS      ; 13 hot position
529  02C9'  47               MOV   B,A       ; 4 save in B
530  02CA'  3A 202C'         LDA   HDIR      ; 13 hot direction
531  02CD'  B7               ORA   A         ; 4 is it open?
532  02CE'  CA 033C'         JZ    HOT1      ; 7/10 yes - increment position
533  02D1'  3A 2040'         LDA   ONFL      ; 13 set on flag
534  02D4'  B7               ORA   A         ; 4 on?
535  02D5'  CA 0333'         JZ    HOFFMN    ; 7/10 no, go to hot off minimum
536  02D8'  78               MOV   A,B       ; 4 set Hot Position
537  02D9'  FE 20            CPI   VLVOS1    ; 7 on minimum?
538  02DB'  CA 035C'         JZ    STEP      ; 7/10 yes
539  02DE'  3D               DCR   A         ; 4 decrement position
540  02DF'  C3 0343'         JMP   HOT2      ; 10 go on
541
542  02E2'  3A 2040'  TEMPIG: LDA  ONFL      ; 13 set on flag
543  02E5'  B7               ORA   A         ; 4 off?
544  02E6'  C8               RZ              ; 6/12 yes
545  02E7'  3A 2034'         LDA   TUT       ; 13 temp update time?
546  02EA'  B7               ORA   A         ; 4
547  02EB'  C0               RNZ             ; 6/12 no
548  02EC'  78               MOV   A,B       ; 4 set back
549  02ED'  F6 40            ORI   40H       ; 7 set done once
550  02EF'  32 2044'         STA   IGTMP     ; 13 save
551  02F2'  07               RLC             ; 4 MS Bit into carry
552  02F3'  2A 2061'         LHLD  TOTPOS    ; 16 set Total Position
553  02F6'  EB               XCHG            ; 4
554  02F7'  3E 00            MVI   A,0       ; 7
555  02F9'  67               MOV   H,A       ; 4 clear H for subtraction
556  02FA'  D2 0318'         JNC   COLDIG    ; 7/10 Cold-requested
557  02FD'  32 202C'         STA   HDIR      ; 13 Hot open
558  0300'  3C               INR   A         ; 4
559  0301'  32 202B'         STA   CDIR      ; 13 Cold closed
560  0304'  3A 2027          LDA   CPOS      ; 13 Cold position into
```

```
561  0307' 32 2029'      STA    CDIFF       ; 13 Cold difference
562  030A' 3A 2028'      LDA    HPOS        ; 13 Hot position
563  030D' C6 20         ADI    VLVOS1      ;  7 add valve open offset
564  030F' 6F            MOV    L,A         ;  4
565  0310' CD 16E5'      CALL   SUBT        ; 18+170 TOTPOS - HPOS = HDIFF
566  0313' 7D            MOV    A,L         ;  4
567  0314' 32 202A'      STA    HDIFF       ; 13 new Hot difference
568  0317' C9            RET                ; 10
569      ;
570  0318' 32 202B'  COLDIG: STA CDIR       ; 13 Cold open
571  031B' 3C            INR    A           ;  4
572  031C' 32 202C'      STA    HDIR        ; 13 Hot closed
573  031F' 3A 2028'      LDA    HPOS        ; 13 Hot position into
574  0322' 32 202A'      STA    HDIFF       ; 13 Hot difference
575  0325' 3A 2027'      LDA    CPOS        ; 13 Cold position
576  0328' C6 20         ADI    VLVOS1      ;  7 add valve open offset
577  032A' 6F            MOV    L,A         ;  4
578  032B' CD 16E5'      CALL   SUBT        ; 18+170 TOTPOS - CPOS = CDIFF
579  032E' 7D            MOV    A,L         ;  4
580  032F' 32 2029'      STA    CDIFF       ; 13 new Cold difference
581  0332' C9            RET                ; 10
582      ;
583  0333' 78        HOFFMN: MOV A,B        ;  4 set Hot Position
584  0334' B7            ORA    A           ;  7 off minimum?
585  0335' CA 035C'      JZ     STEP        ; 7/10 yes
586  0338' 3D            DCR    A           ;  4 decrement position
587  0339' C3 0343'      JMP    HOT2        ; 10 go on
588      ;
589  033C' 78        HOT1:   MOV A,B        ;  4 set Hot Position
590  033D' 3C            INR    A           ;  4 increment position
591  033E' FE 84         CPI    VLVOS1+100  ;  7 maximum open?
592  0340' D2 035C'      JNC    STEP        ; 7/10 yes
593  0343' 32 2028'  HOT2:   STA HPOS       ; 13 update new position
594  0346' E6 07         ANI    7           ;  7 isolate LS 3 bits
595  0348' 21 14F7'      LXI    H,MST       ; 10 point to motor sequence table
596  034B' 85            ADD    L           ;  4 indexes into table
597  034C' 6F            MOV    L,A         ;  4 move back into L
598  034D' 7E            MOV    A,M         ;  4 table value into A
599  034E' 07            RLC                ;  4
600  034F' 07            RLC                ;  4  } move to MS
601  0350' 07            RLC                ;  4  } nibble
602  0351' 07            RLC                ;  4 /
603  0352' 4F            MOV    C,A         ;  4 save in C
604  0353' 3A 201E'      LDA    STPBYT      ; 13 set last step byte
605  0356' E6 0F         ANI    0FH         ;  7 clear MS nibble
606  0358' B1            ORA    C           ;  4 OR in new hot step
607  0359' 32 201E'      STA    STPBYT      ; 13 save
608  035C' 3A 201E'  STEP: LDA STPBYT       ; 13 set again because of bypass
609  035F' 32 A001       STA    STPMTR      ; 13 store into stepper motor port
610      ;
```

```
611             ONCHEK: XRA    A              ; 4  clear volume down fla
612  0362' AF           STA    DWNFLG         ; 13 clear volume down fla
613  0363' 32 204B'     LDA    ONFL           ; 13 Get on flag
614  0366' 3A 2040'     ORA    A              ; 4  off?
615  0369' B7           JNZ    TTOFCK         ; 7/10 no, so to timed turn off check
616  036A' C2 03C8'     LDA    SHWFLG         ; 13 set shower flag
617  036D' 3A 2047'     ORA    A              ; 4  shower mode?
618  0370' B7           JNZ    UPTMDS         ; 7/10 yes
619  0371' C2 038E'     LHLD   TFTIME         ; 16 set tub fill time
620  0374' 2A 202F'     LDA    HRS            ; 13 set hours
621  0377' 3A 203C'     CMP    H              ; 4  compare hours
622  037A' BC           JNZ    UPTMDS         ; 7/10 not same
623  037B' C2 038E'     LDA    MIN            ; 13 hours same, set minutes
624  037E' 3A 203B'     CMP    L              ; 4  compare minutes
625  0381' BD           JNZ    UPTMDS         ; 7/10 time not equal
626  0382' C2 038E'     LHLD   TFTEMP         ; 16 set tub fill temperature
627  0385' 2A 202D'     SHLD   TR             ; 16 as temp requested
628  0388' 22 2038'     JMP    MEM            ; 10 turn on
629  038B' C3 06BF'
630
631     ; UPDATE TIME DISPLAY
632
633  038E' 2A 203B'     UPTMDS: LHLD   MIN     ; 16 Get minutes and hours
634  0391' CD 0397'     CALL   TIMDIS         ; 18+184 time display routine
635  0394' C3 04E7'     JMP    KEY            ; 10
636
637     ; TIME DISPLAY (184 states 73.6us)
638  0397' 3A 203E'     TIMDIS: LDA    ERRFLG  ; 13 set error-flag
639  039A' B7           ORA    A              ; 4
640  039B' C0           RNZ                   ; 6/12 don't display time when error msg
641  039C' 7D           MOV    A,L            ; 4  set minutes
642  039D' E6 0F        ANI    0FH            ; 7  set LS nibble
643  039F' 32 200D'     STA    DTAB+3         ; 13 store in minutes display
644  03A2' 7D           MOV    A,L            ; 4  set back asain
645  03A3' E6 F0        ANI    0F0H           ; 7  set MS nibble
646  03A5' 0F           RRC                   ; 4  move to LS nibble
647  03A6' 0F           RRC                   ; 4
648  03A7' 0F           RRC                   ; 4
649  03A8' 0F           RRC                   ; 4
650  03A9' 32 200C'     STA    DTAB+2         ; 13 store in 10 minutes display
651  03AC' 7C           MOV    A,H            ; 4  set hours
652  03AD' E6 0F        ANI    0FH            ; 7  set LS nibble
653  03AF' 32 200B'     STA    DTAB+1         ; 13 store in hours display
654  03B2' 7C           MOV    A,H            ; 4  set back asain
655  03B3' E6 F0        ANI    0F0H           ; 7  set MS nibble
656  03B5' 0F           RRC                   ; 4  move to LS nibble
657  03B6' 0F           RRC                   ; 4
658  03B7' 0F           RRC                   ; 4
659  03B8' 0F           RRC                   ; 4
660  03B9' 32 200A'     STA    DTAB           ; 13 store in 10 hours display
```

| | | | | | |
|---|---|---|---|---|---|
| 661 | 03BC' | 3A 2025' | LDA | TRIOUT | ; 13 set TRIAC output |
| 662 | 03BF' | E6 FB | ANI | OFBH | ; 7 turn on COLON bit |
| 663 | 03C1' | 32 2025' | STA | TRIOUT | ; 13 save |
| 664 | 03C4' | 32 D000 | STA | LEDTRI | ; 13 output |
| 665 | 03C7' | C9 | RET | | ; 10 |
| 666 | | | ; | | |
| 667 | 03C8' | 2A 2031' | TTOFCK: LHLD | OFFTIM | ; 16 set off time |
| 668 | 03CB' | 3A 203B' | LDA | MIN | ; 13 set cuurrent minutes |
| 669 | 03CE' | BC | CMP | H | ; 4 |
| 670 | 03CF' | C2 03D9' | JNZ | NOOFF | ; 7/10 minutes don't compare |
| 671 | 03D2' | 3A 203A' | LDA | SEC | ; 13 set current seconds |
| 672 | 03D5' | BD | CMP | L | ; 4 |
| 673 | 03D6' | CA 06E6' | JZ | TTOFF | ; 7/10 time to turn off |
| 674 | 03D9' | 3A 2034' | NOOFF: LDA | TUT | ; 13 temperature update time |
| 675 | 03DC' | 47 | MOV | B,A | ; 4 save TUT |
| 676 | 03DD' | B7 | ORA | A | ; 4 |
| 677 | 03DE' | CC 142B' | CZ | UPDTMP | ; 9/18+??? update temp display |
| 678 | 03E1' | 3A 2044' | LDA | IGTMP | ; 13 ignore temp flag |
| 679 | 03E4' | E6 01 | ANI | 1 | ; 7 |
| 680 | 03E6' | C2 04E7' | JNZ | KEY | ; 7/10 don't do temp control loop |
| 681 | 03E9' | 78 | MOV | A,B | ; 4 set temperature update time |
| 682 | 03EA' | FE 01 | CPI | 1 | ; 7 stepper update or TCA time |
| 683 | 03EC' | CA 0455' | JZ | TCA | ; 7/10 TUT =1 |
| 684 | 03EF' | D2 04E7' | JNC | KEY | ; 7/10 TUT >1 |
| 685 | | | | | |
| 686 | | | ;**************************************** | | |
| 687 | | | ;* * | | |
| 688 | | | ;* STEPPER MOTOR CONTROL UPDATE * | | |
| 689 | | | ;* * | | |
| 690 | | | ;**************************************** | | |
| 691 | | | ; | | |
| 692 | | | ; | | |
| 693 | 03F2' | 2A 201C' | SMU: LHLD | STEPS | ; 16 set number of steps for correction |
| 694 | 03F5' | 7C | MOV | A,H | ; 4 set sign of error |
| 695 | 03F6' | E6 80 | ANI | 80H | ; 7 set sign |
| 696 | 03F8' | 17 | RAL | | ; 4 into carry |
| 697 | 03F9' | 17 | RAL | | ; 4 into bit 0 |
| 698 | 03FA' | 32 202C' | STA | HDIR | ; 13 save as hot direction |
| 699 | 03FD' | FE 01 | CPI | 1 | ; 7 negative? |
| 700 | 03FF' | C2 0407' | JNZ | SMUA | ; 7/10 no |
| 701 | 0402' | 57 | MOV | D,A | ; 4 save A |
| 702 | 0403' | CD 1630' | CALL | TBTC | ; 18+52 two's compliment of H,L |
| 703 | 0406' | 7A | MOV | A,D | ; 4 set A |
| 704 | 0407' | 2F | SMUA: CMA | | ; 4 compliment |
| 705 | 0408' | E6 01 | ANI | 1 | ; 7 mask off all but LS bit |
| 706 | 040A' | 32 202B' | STA | CDIR | ; 13 save compliment as cold direction |
| 707 | 040D' | 7D | MOV | A,L | ; 4 move for save |
| 708 | 040E' | 32 202A' | STA | HDIFF | ; 13 save hot-difference |
| 709 | 0411' | 32 2029' | STA | CDIFF | ; 13 save cold difference |
| 710 | 0414' | 2A 2036' | LHLD | TRRL | ; 16 set temp requested rate limited |

```
711        EB              XCHG                        ; 4
712  0417' 3A 206E'        LDA   RATE                  ; 13 set rate increment
713  0418' 6F              MOV   L,A                   ; 4
714  041B' 26 00           MVI   H,0                   ; 7
715  041C' 3A 202C'        LDA   HDIR                  ; 13 set hot direction
716  041E' B7              ORA   A                     ; 4
717  0421' CA 043A'        JZ    HTSMU                 ; 7/10 forward?
718  0422' CD 16E5'        CALL  SUBT                  ; 18+??? subtract
719  0425' EB              XCHG                        ; 4 answer to D,E
720  0428' 2A 2038'        LHLD  TR                    ; 16 set temperature requested
721  0429' EB              XCHG                        ; 4 swap
722  042C' 44              MOV   B,H                   ; 4 save H
723       4D              MOV   C,L                   ; 4 save L
724  042E' CD 16E5'        CALL  SUBT                  ; 18+??? TR-(TRRL-Rate inc)
725  042F' F2 044C'        JP    SMU1                  ; 7/10 TR in range
726  0432' 60              MOV   H,B                   ; 4 set back (TRRL-Rate inc)
727  0435' 69              MOV   L,C                   ; 4
728  0436' C3 044F'        JMP   SMU2                  ; 10
729  0437'
730  043A' CD 16B7'  HTSMU: CALL ADDD                  ; 18+??? add
731  043D' EB              XCHG                        ; 4
732  043E' 2A 2038'        LHLD  TR                    ; 16 set temperature requested
733  0441' CD 16E5'        CALL  SUBT                  ; 18+??? (TRRL+Rate inc)
734  0444' F2 044C'        JP    SMU1                  ; 7/10 TR in range
735  0447' 62              MOV   H,D                   ; 4 set back (TRRL+Rate inc)
736  0448' 6B              MOV   L,E                   ; 4
737  0449' C3 044F'        JMP   SMU2                  ; 10
738
739  044C' 2A 2038'  SMU1: LHLD  TR                    ; 16 set TR
740  044F' 22 2036'  SMU2: SHLD  TRRL                  ; 16 save TRRL
741  0452' C3 04E7'        JMP   KEY                   ; 10 so see if key pressed
742
743                        PAGE
744
745 ;*******************************************************
746 ;**                                                   **
747 ;**         TEMPERATURE CONTROL ALGORITHM             **
748 ;**                                                   **
749 ;*******************************************************
750
751
752  0455' 2A 200E'  TCA:  LHLD  TMPERR                ; 16 set temp error
753  0458' EB              XCHG                        ; 4 move to D,E
754  0459' 21 0000         LXI   H,0                   ; 10 clear H,L
755  045C' 7A              MOV   A,D                   ; 4 checking sign
756  045D' B7              ORA   A                     ; 4 set condition codes
757  045E' F2 0464'        JP    TCA2                  ; 7/10 sign positive
758  0461' 21 FFFF         LXI   H,0FFFFH              ; 10 negative
759  0464' 3A 206F'        LDA   KP                    ; 13 set KP constant
760  0467' 4F              MOV   C,A                   ; 4 put into division
```

```
761  0468'  06 00                MVI   B,O            ;  7 clear MS of divisor
762  046A'  CD 163C'             CALL  DIVIDE         ; 18+??? divide
763  046D'  EB                   XCHG                 ;  4 answer into H,L
764  046E'  22 2014'             SHLD  SPER           ; 16 save in Scaled Proportional Error
765  0471'  2A 2067'             LHLD  INTERR         ; 16 set integral error
766  0474'  EB                   XCHG                 ;  4
767  0475'  21 0000              LXI   H,0            ; 10 clear H,L
768  0478'  7A                   MOV   A,D            ;  4 checking sign
769  0479'  B7                   ORA   A              ;  4 set condition codes
770  047A'  F2 0480'             JP    TCA3           ; 7/10 sign positive
771  047D'  21 FFFF              LXI   H,0FFFFH       ; 10 negative
772  0480'  3A 2070'             LDA   KI             ; 13 integral constant
773       TCA3: 0483'  4F       MOV   C,A            ;  4
774  0484'  3A 2071'             LDA   KI+1           ; 13
775  0487'  47                   MOV   B,A            ;  4
776  0488'  CD 163C'             CALL  DIVIDE         ; 18+??? INTERR/KI = SIER
777  048B'  EB                   XCHG                 ;  4
778  048C'  22 2018'             SHLD  SIER           ; 16 save Scaled Integral Error
779  048F'  2A 2010'             LHLD  DIFERR         ; 16 set differential error
780  0492'  EB                   XCHG                 ;  4
781  0493'  21 0000              LXI   H,0            ; 10 clear H,L
782  0496'  7A                   MOV   A,D            ;  4 checking sign
783  0497'  B7                   ORA   A              ;  4 set condition codes
784  0498'  F2 049E'             JP    TCA4           ; 7/10 sign positive
785  049B'  21 FFFF              LXI   H,0FFFFH       ; 10 negative
786  049E'  3A 2072'             LDA   KD             ; 13 differential constant
787       TCA4: 04A1'  4F       MOV   C,A            ;  4
788  04A2'  3A 2073'             LDA   KD+1           ; 13
789  04A5'  47                   MOV   B,A            ;  4
790  04A6'  CD 163C'             CALL  DIVIDE         ; 18+??? DIFERR/KD = SDER
791  04A9'  EB                   XCHG                 ;  4
792  04AA'  22 2016'             SHLD  SDER           ; 16 save Scaled differential error
793  04AD'  EB                   XCHG                 ;  4
794  04AE'  2A 2014'             LHLD  SPER           ; 16 set scaled proportional error
795  04B1'  CD 16B7'             CALL  ADDD           ; 18+174 SDER + SPER =
796  04B4'  EB                   XCHG                 ;  4
797  04B5'  2A 2018'             LHLD  SIER           ; 16 set scaled integral error
798  04B8'  CD 16B7'             CALL  ADDD           ; 18+174 SDER + SPER + SIER = CERR
799  04BB'  22 201A'             SHLD  CERR           ; 16 save Composite Error
800  04BE'  2A 2061'             LHLD  TOTPOS         ; 16 set total position
801  04C1'  EB                   XCHG                 ;  4
802  04C2'  3A 206B'             LDA   OFFSET         ; 13 valve open offset
803  04C5'  6F                   MOV   L,A            ;  4
804  04C6'  26 00                MVI   H,0            ;  7
805  04C8'  CD 16E5'             CALL  SUBT           ; 18+??? = flow rate
806  04CB'  EB                   XCHG                 ;  4
807  04CC'  21 0000              LXI   H,0            ; 10 flow rate in H,L,D,E
808  04CF'  01 000F              LXI   B,15           ; 10
809  04D2'  CD 163C'             CALL  DIVIDE         ; 18+??? (flow rate / 15)
810  04D5'  4B                   MOV   C,E            ;  4 result into B,C
```

```
811  04D6'  42            MOV   B,D              ; 4
812  04D7'  2A 201A'      LHLD  CERR             ; 16 set composite error
813  04DA'  CD 15C7'      CALL  MULT             ; 18+??? (flow rate/15) * CERR = result
814  04DD'  01 0004       LXI   B,4              ; 10
815  04E0'  CD 163C'      CALL  DIVIDE           ; 18+??? ((flow rate/15) * CERR) / 4 = STEPS
816  04E3'  EB            XCHG                   ; 4
817  04E4'  22 201C'      SHLD  STEPS            ; 16 save number of steps to correct
818
819
820                       PAGE
821
822           ;************************************************
823           ;**                                            **
824           ;**           KEY PRESSED DECISION             **
825           ;**                                            **
826           ;************************************************
827
828  04E7'  3A 2043'  KEY:  LDA   BZCNT          ; 13 Get buzzer count
829  04EA'  3D            DCR   A                ; 4  Decrement count
830  04EB'  32 2043'      STA   BZCNT            ; 13 save
831  04EE'  C2 04F9'      JNZ   KEY1             ; 7/10 Not done, go on
832  04F1'  3A A002       LDA   SOUND            ; 13 get Sonalert bit
833  04F4'  E6 7F         ANI   7FH              ; 7  Turn off Sonalert
834  04F6'  32 A002       STA   SOUND            ; 13 store
835  04F9'  16 00     KEY1: MVI  D,0             ; 7  clear Key # counter
836  04FB'  42            MOV   B,D              ; 4  clear Loop 1 counter
837  04FC'  4A            MOV   C,D              ; 4  clear Loop 2 counter
838  04FD'  21 2005'      LXI   H,DBKEY          ; 10 Point to debounced key table
839  0500'  5E            MOV   E,M              ; 7  move to E
840  0501'  7B        KEYA: MOV  A,E             ; 4  restore table value to A
841  0502'  1F            RAR                    ; 4  rotate right to carry
842  0503'  DA 0568'      JC    GOTONE           ; 7/10 record key pressed
843  0506'  14        KEYB: INR  D               ; 4  increment Key # counter
844  0507'  5F            MOV   E,A              ; 4  save in E
845  0508'  04            INR   B                ; 4  increment Loop 1 counter
846  0509'  78            MOV   A,B              ; 4  into A
847  050A'  FE 04         CPI   4                ; 7  Loop 1 done?
848  050C'  C2 0501'      JNZ   KEYB             ; 7/10 no
849  050F'  06 00         MVI   B,0              ; 7  yes - clear loop counter
850  0511'  23            INX   H                ; 6  point to next table location
851  0512'  0C        KEYC: INR  C               ; 4  increment Loop 2 counter
852  0513'  79            MOV   A,C              ; 4  into A
853  0514'  FE 05         CPI   5                ; 7  Loop 2 done?
854  0516'  C2 0500'      JNZ   KEYA             ; 7/10 no
855  0519'  3A 204F'      LDA   KYPRSD           ; 13 yes-get key pressed flag
856  051C'  B7            ORA   A                ; 4  set?
857  051D'  C2 0527'      JNZ   DECODE           ; 7/10 yes
858  0520'  AF            XRA   A                ; 4
859  0521'  32 2048'      STA   DUNFLG           ; 13 clear done once flag
860  0524'  C3 062A'      JMP   WFI              ; 10
```

```
861                          DECODE: LXI   H,DCDTBL    ; 10 point to JMP tbl
862  0527'  21 1527'                 LDA   KEYNO1      ; 13 set key #1
863  052A'  3A 2051'                 MOV   B,A         ; 4  save in B
864  052D'  47                       LDA   MULTI       ; 13 get multi key flag
865  052E'  3A 2050'                 CPI   1           ; 7  set?
866  0531'  FE 01                    JZ    TWOPRS      ; 7/10 yes-go decode double closure
867  0533'  CA 0543'                 MOV   A,B         ; 4  set key #1 back
868  0536'  78               EXEC:   RLC               ; 4  multiply by 2
869  0537'  07                       ADC   L           ; 4  add to L
870  0538'  8D                       MOV   L,A         ; 4  move into L
871  0539'  6F                       JNC   EXEC1       ; 7/10 no carry-so on
872  053A'  D2 053E'                 INR   H           ; 4  carry-increment MSB
873  053D'  24               EXEC1:  MOV   E,M         ; 7  set LSB to E
874  053E'  5E                       INX   H           ; 6  next
875  053F'  23                       MOV   D,M         ; 7  set MSB to D
876  0540'  56                       XCHG              ; 4  set address to H,L
877  0541'  EB                       PCHL              ; 6  Jump to routine pointed to in table
878  0542'  E9
879
880                          TWOPRS: LDA   KEYNO2      ; 13 set key #2
881  0543'  3A 2052'                 MOV   C,A         ; 4  save in C
882  0546'  4F                       MOV   A,B         ; 4  set key #1 into A
883  0547'  78                       ORA   A           ; 4  zero? -OFF
884  0548'  B7                       JZ    ZIP         ; 7/10 yes
885  0549'  CA 055C'                 CPI   4           ; 7  4? -TUB FILL
886  054C'  FE 04                    JZ    FOUR        ; 7/10 yes
887  054E'  CA 0562'                 CPI   1           ; 7  8? -ON
888  0551'  FE 01                    JNZ   WFI         ; 7/10 no-illegal-Wait for interrupt
889  0553'  C2 062A'                 MOV   A,C         ; 4  set key #2 into A
890  0556'  79                       ADI   60          ; 7  add 60 to key #2
891  0557'  C6 3C                    JMP   EXEC        ; 10 go execute
892  0559'  C3 0537'
893
894  055C'  79               ZIP:    MOV   A,C         ; 4  set key #2 into A
895  055D'  C6 14                    ADI   20          ; 7  add 20 to key #2
896  055F'  C3 0537'                 JMP   EXEC        ; 10 go execute
897
898  0562'  79               FOUR:   MOV   A,C         ; 4  set key #2 into A
899  0563'  C6 28                    ADI   40          ; 7  add 40 to key #2
900  0565'  C3 0537'                 JMP   EXEC        ; 10 go execute
901
902                          ; RECORDS KEY PRESSED
903
904  0568'  5F               GOTONE: MOV   E,A         ; 4  Save key #
905  0569'  3A 204F'                 LDA   KYPRSD      ; 13 set 1 Key pressed flag
906  056C'  B7                       ORA   A           ; 4  set?
907  056D'  C2 057C'                 JNZ   GOTTWO      ; 7/10 yes
908  0570'  3C                       INR   A           ; 7  no
909  0571'  32 204F'                 STA   KYPRSD      ; 13 set it
910  0574'  7A                       MOV   A,D         ; 4  set key #
```

```
911   0575'  32 2051'         STA    KEYN01           ; 13 store in Key #1
912   0578'  7B              MOV    A,E              ;  4 restore key #
913   0579'  C3 0506'        JMP    KEYC             ; 10 return
914   ;
915   057C'  3A 2050'  GOTTWO: LDA   MULTI            ; 13 multi key pressed flag
916   057F'  B7              ORA    A                ;  4 set?
917   0580'  C2 062A'        JNZ    WFI              ; 7/10 yes-invalid
918   0583'  3C              INR    A                ;  4 no
919   0584'  32 2050'        STA    MULTI            ; 13 set it
920   0587'  7A              MOV    A,D              ;  4 set Key #
921   0588'  32 2052'        STA    KEYN02           ; 13 store in Key #2
922   058B'  7B              MOV    A,E              ;  4 restore key #
923   058C'  C3 0506'        JMP    KEYC             ; 10 return
924   ;
925   ;***********************************************
926   ;***                                         ***
927   ;***         INITIALIZATION ROUTINE          ***
928   ;***                                         ***
929   ;***********************************************
930   ;
931   ; 8155 initialization
932   ;
933   ;
934   058F'  21 586A   INIT:  LXI    H,TCNT           ; 10 Get timer count
935   0592'  22 A004         SHLD   TIMLOW           ; 16 Send it
936   0595'  3E C3           MVI    A,P8155MW        ;  7 Get mode word
937   0597'  32 A000         STA    P8155CP          ; 13 Send it
938   ;
939   ; Stepper motor initialization
940   ;
941   059A'  3E 99           MVI    A,99H            ;  7 stepper motor initial condition
942   059C'  32 A001         STA    STPMTR           ; 13 Send it
943   059F'  32 201E'        STA    STPBYT           ; 13 save
944   ;
945   ; Ram variable initialization
946   ;
947   05A2'  21 2033'  ZERO:  LXI    H,SZERO          ; 10 Set up address for zeroing ram
948   05A5'  01 206B'        LXI    B,NZERO          ; 10 Set up end address for zeroing
949   05A8'  AF              XRA    A                ;  4 Clear acc
950   05A9'  77              MOV    M,A              ;  7 Clear ram
951   05AA'  2C              INR    L                ;  4 Increment address
952   05AB'  7D              MOV    A,L              ;  4 Done yet
953   05AC'  B9              CMP    C                ;  4
954   05AD'  C2 05A8'        JNZ    ZERO             ; 7/10 If not so do more
955   05B0'  21 2027'  SETL:  LXI    H,SSET           ; 10 Set up address for setting memory
956   05B3'  01 2033'        LXI    B,NSET           ; 10 Set up end address for setting memory
957   05B6'  3E FF           MVI    A,0FFH           ;  7 Set acc
958   05B8'  77              MOV    M,A              ;  7 Set ram
959   05B9'  2C              INR    L                ;  4 Increment address
960   05BA'  7D              MOV    A,L              ;  4 Done yet
```

| Line | Addr | Bytes | Label | Op | Operand | Cycles | Comment |
|---|---|---|---|---|---|---|---|
| 961 | 05BB | B9 | | CMP | C | 7 | |
| 962 | 05BC | C2 05B6 | | JNZ | SETL | 7/10 | If not go and do more |
| 963 | 05BF | 21 0443 | | LXI | H,0443H | 10 | Init average temp |
| 964 | 05C2 | 22 201F | | SHLD | TMPAVG | 16 | |
| 965 | 05C5 | 22 2023 | | SHLD | MTMP | 16 | |
| 966 | 05C8 | 3E 34 | | MVI | A,VLVOS1+20 | 7 | Init |
| 967 | 05CA | 32 2021 | | STA | MCFLW | 13 | memory cold flow rate |
| 968 | 05CD | 3E 20 | | MVI | A,VLVOS1 | 7 | |
| 969 | 05CF | 32 2022 | | STA | MHFLW | 13 | memory hot flow rate |
| 970 | 05D2 | 3E 41 | | MVI | A,41H | 7 | |
| 971 | 05D4 | 32 2045 | | STA | MIGTMP | 13 | set memory ignore temp flag |
| 972 | 05D7 | 3E F3 | | MVI | A,0F3H | 7 | Triacs off, colon on |
| 973 | 05D9 | 32 2025 | | STA | TRIGUT | 13 | TRIAC output storage word |
| 974 | 05DC | 3E 3F | | MVI | A,3FH | 7 | |
| 975 | 05DE | 32 A002 | | STA | KEYSCN | 13 | |
| 976 | 05E1 | 3A A003 | | LDA | KEYRET | 13 | |
| 977 | 05E4 | E6 0F | | ANI | 0FH | 7 | Mask out unwanted bits |
| 978 | 05E6 | 4F | | MOV | C,A | 4 | Save this portion |
| 979 | 05E7 | 3E 5F | | MVI | A,5FH | 7 | Get more options |
| 980 | 05E9 | 32 A002 | | STA | KEYSCN | 13 | |
| 981 | 05EC | 3A A003 | | LDA | KEYRET | 13 | |
| 982 | 05EF | E6 0F | | ANI | 0FH | 7 | Mask again |
| 983 | 05F1 | 07 | | RLC | | 4 | Put them together |
| 984 | 05F2 | 07 | | RLC | | 4 | |
| 985 | 05F3 | 07 | | RLC | | 4 | |
| 986 | 05F4 | 07 | | RLC | | 4 | |
| 987 | 05F5 | B1 | | ORA | C | 4 | |
| 988 | 05F6 | 32 2026 | | STA | SWS | 13 | Now save switch options |
| 989 | 05F9 | 21 CB73 | | LXI | H,0CB73H | 10 | Delay |
| 990 | 05FC | 2B | DLY: | DCX | H | 6 | |
| 991 | 05FD | 7D | | MOV | A,L | 4 | |
| 992 | 05FE | B4 | | ORA | H | 4 | |
| 993 | 05FF | C2 05FC | | JNZ | DLY | 4 | |
| 994 | 0602 | 3E CB | | MVI | A,0CBH | 7/10 | (.4999996 secs.) |
| 995 | 0604 | 30 | | SIM | | 7 | enable RST 7.5 and turn on A/D |
| 996 | 0605 | 3E 20 | | MVI | A,20H | 4 | Set interrupt mask |
| 997 | 0607 | 32 206E | | STA | RATE | | |
| 998 | 060A | 3E 20 | | MVI | A,VLVOS1 | | |
| 999 | 060C | 32 206C | | STA | HOFFST | | |
| 1000 | 060F | 3E 34 | | MVI | A,VLVOS1+20 | | |
| 1001 | 0611 | 32 206D | | STA | COFFST | | |
| 1002 | 0614 | 3E 40 | | MVI | A,VLVOS2 | | |
| 1003 | 0616 | 32 206B | | STA | OFFSET | | |
| 1004 | 0619 | 3E 14 | | MVI | A,14H | | |
| 1005 | 061B | 32 206F | | STA | KP | | |
| 1006 | 061E | 21 0FC0 | | LXI | H,0FC0H | | |
| 1007 | 0621 | 22 2070 | | SHLD | KI | | |
| 1008 | 0624 | 21 0010 | | LXI | H,10H | | |
| 1009 | 0627 | 22 2072 | | SHLD | KD | | |

```
;***********************************************************
;                                                       
;**              WAIT FOR INTERRUPT                       **
;**                                                       **
;***********************************************************
;
062A'                 INVLD:
062A'                 UNDEF:
062A'  AF             WFI:    XRA   A               ; Invalid key(s) depressed
062B'  32 204F'               STA   KYPRSD          ; Undefined key(s) depressed
062E'  32 2050'               STA   MULTI           ; 4 Clear A
0631'  3E 10                  MVI   A,10H           ; 13 Clear 1 key pressed flag
                                                    ; 13 Clear multi key pressed flag
                                                    ; 7 Reset RST 7.5
                              SIM                   ; 4 Set interrupt mask
0633'  30
0634'  FB             WFI1:   EI                    ; 4 Enable interrupts
0635'  C3 0635'               JMP   WFI1            ; 10 wait
;
;       PAGE
;
;***********************************************************
;                                                       
;**                      ON                               **
;**                                                       **
;***********************************************************
;
0638'  3A 2040'       ON:     LDA   ONFL            ; 13 set on flag
063B'  B7                     ORA   A               ; 4 off?
063C'  C2 062A'               JNZ   WFI             ; 7/10 no
063F'  3A 2034'               LDA   TUT             ; 13 set temperature update time
0642'  B7                     ORA   A               ; 4 zero
0643'  C2 062A'               JNZ   WFI             ; 7/10 no
0646'  3A 2026'               LDA   SWS             ; 13 set switch options
0649'  E6 20                  ANI   20H             ; 7 memory mode?
064B'  C2 06B9'               JNZ   MEMODE          ; 7/10 yes
064E'  3A 206C'               LDA   HOFFST          ; 13
0651'  32 202A'               STA   HDIFF           ; 13 open hot valve to location 30
0654'  3A 206D'               LDA   COFFST          ; 13
0657'  32 2029'               STA   CDIFF           ; 13 open cold valve to location 50
065A'  3E 41                  MVI   A,41H           ; 7 ignore temp,stepping done flags
065C'  32 2044'               STA   IGTMP           ; 13 set ignore temp flag
065F'  21 0443                LXI   H,0443H         ; 10 cold temp
0662'  22 2038'               SHLD  TR              ; 16 save temperature requested
0665'  AF             ON1:    XRA   A               ; 4
0666'  32 202B'               STA   CDIR            ; 13 direction to open
0669'  32 202C'               STA   HDIR            ; 13
066C'  3C                     INR   A               ; 4
066D'  32 2040'               STA   ONFL            ; 13 set on flag
```

| | | | | | | |
|---|---|---|---|---|---|---|
| 1061 | 0670' | 3E 8C | | MVI | A,140 | ; 7 set temp update time to 3X normal |
| 1062 | 0672' | 32 2034' | | STA | TUT | ; 13 set switch options |
| 1063 | 0675' | 3A 2026' | | LDA | SWS | ; 13 |
| 1064 | 0678' | E6 0F | | ANI | 0FH | ; 7 mask off upper 4 bits |
| 1065 | 067A' | 07 | | RLC | | ; 4 multiply by 2 |
| 1066 | 067B' | 21 1507' | | LXI | H,TIMTBL | ; 10 point to table |
| 1067 | 067E' | 85 | | ADD | L | ; 4 add offset to pointer |
| 1068 | 067F' | D2 0683' | | JNC | GETIME | ; 7/10 |
| 1069 | 0682' | 24 | | INR | H | ; 4 |
| 1070 | 0683' | 6F | GETIME: | MOV | L,A | ; 4 restore L |
| 1071 | 0684' | 4E | | MOV | C,M | ; 7 set seconds |
| 1072 | 0685' | 23 | | INX | H | ; 6 next |
| 1073 | 0686' | 46 | | MOV | B,M | ; 7 set minutes |
| 1074 | 0687' | 79 | | MOV | A,C | ; 4 |
| 1075 | 0688' | B0 | | ORA | B | ; 4 zero? |
| 1076 | 0689' | CA 06B3' | | JZ | BLNKTM | ; 7/10 yes blank off time |
| 1077 | 068C' | 2A 203A' | | LHLD | SEC | ; 16 set current second,minute |
| 1078 | 068F' | 7D | | MOV | A,L | ; 4 |
| 1079 | 0690' | 81 | | ADD | C | ; 4 add seconds |
| 1080 | 0691' | FE 3C | | CPI | 60 | ; 7 |
| 1081 | 0693' | DA 0699' | | JC | FIX1 | ; 7/10 result <60 |
| 1082 | 0696' | D6 3C | | SUI | 60 | ; 7 result >60 |
| 1083 | 0698' | 3C | | INR | H | ; 4 increment minutes |
| 1084 | 0699' | 6F | FIX1: | MOV | L,A | ; 4 restore seconds |
| 1085 | 069A' | 7C | | MOV | A,H | ; 4 set minutes |
| 1086 | 069B' | 80 | | ADD | B | ; 4 add minutes |
| 1087 | 069C' | 27 | | DAA | | ; 4 adjust |
| 1088 | 069D' | D2 06A9' | | JNC | FIX3 | ; 7/10 result <100 |
| 1089 | 06A0' | C6 40 | | ADI | 40H | ; 7 result >99 |
| 1090 | 06A2' | 67 | FIX2: | MOV | H,A | ; 4 restore minutes |
| 1091 | 06A3' | 22 2031' | TIMOFF: | SHLD | OFFTIM | ; 16 store off time |
| 1092 | 06A6' | C3 107B' | | JMP | BUZZER | ; 10 start buzzer, wait for interrupt |
| 1093 | | | ; | | | |
| 1094 | 06A9' | FE 60 | FIX3: | CPI | 60 | ; 7 |
| 1095 | 06AB' | DA 06A2' | | JC | FIX2 | ; 7/10 <60 |
| 1096 | 06AE' | D6 60 | | SUI | 60 | ; 7 correct minutes |
| 1097 | 06B0' | C3 06A2' | | JMP | FIX2 | ; 10 |
| 1098 | | | ; | | | |
| 1099 | 06B3' | 21 FFFF | BLNKTM: | LXI | H,0FFFFH | ; 10 blank offtime |
| 1100 | 06B6' | C3 06A3' | | JMP | TIMOFF | ; 10 |
| 1101 | | | ; | | | |
| 1102 | 06B9' | 2A 2023' | MEMODE: | LHLD | MTMP | ; 16 set memory temperature requested |
| 1103 | 06BC' | 22 2038' | | SHLD | TR | ; 16 temperature requested |
| 1104 | 06BF' | 3A 2022' | MEM: | LDA | MHFLW | ; 13 set memory hot flow |
| 1105 | 06C2' | 32 202A' | | STA | HDIFF | ; 13 hot difference |
| 1106 | 06C5' | 3A 2021' | | LDA | MCFLW | ; 13 set memory cold flow |
| 1107 | 06C8' | 32 2029' | | STA | CDIFF | ; 13 cold difference |
| 1108 | 06CB' | 3A 2045' | | LDA | MIGTMP | ; 13 memory ignore temp |
| 1109 | 06CE' | 32 2044' | | STA | IGTMP | ; 13 ignore temp flag |
| 1110 | 06D1' | 21 0443 | | LXI | H,0443H | ; 16 set cold temp |

```
1111  06D4'  22 2036'        SHLD   TRRL
1112  06D7'  C3 0665'        JMP    ON1              ; 16 set rate limiting
1113
1114                         PAGE
1115
1116
1117
1118      ;************************************************************
1119      ;**                                                        **
1120      ;**                         OFF                            **
1121      ;**                                                        **
1122      ;************************************************************
1123  06DA'  3E 01      PWRFAL: MVI   A,1
1124  06DC'  32 2069'           STA   PWROFF         ; 7
1125  06DF'  3A 2040'           LDA   ONFL           ; 13 save in power fail flag
1126  06E2'  B7         OFF:    ORA   A              ; 13 set on flag
1127  06E3'  CA 062A'           JZ    WFI            ; 4 off?
1128  06E6'  3A 2027'   TTOFF:  LDA   CPOS           ; 7/10 yes
1129  06E9'  32 2021'           STA   MCFLW          ; 13 set cold position
1130  06EC'  32 2029'           STA   CDIFF          ; 13 save in memory cold flow rate
1131  06EF'  3A 2028'           LDA   HPOS           ; 13 save in memory cold difference
1132  06F2'  32 202A'           STA   MHFLW          ; 13 set hot position
1133  06F5'  32 2038'           STA   HDIFF          ; 13 save in memory hot flow rate
1134  06F8'  2A 2038'           LHLD  TR             ; 13 save in hot difference
1135  06FB'  22 2023'           SHLD  MTMP           ; 16 set temperature requested
1136  06FE'  3A 2044'           LDA   IGTMP          ; 16 save for memory mode
1137  0701'  32 2045'           STA   MIGTMP         ; 13 set ignore temp flag
1138  0704'  AF                 XRA   A              ; 13 set memory ignore temp fla
1139  0705'  32 2040'           STA   ONFL           ; 4
1140  0708'  32 2044'           STA   IGTMP          ; 13 reset on flag
1141  070B'  3C                 INR   A              ; 13 clear ignore temp flag
1142  070C'  32 202B'           STA   CDIR           ; 4 set to 1
1143  070F'  32 202C'           STA   HDIR           ; 13 set direction to reverse
1144  0712'  C3 107B'           JMP   BUZZER         ; 13 set direction to reverse
1145                                                 ; 10 start buzzer, wait for interrupt
1146                         PAGE
1147
1148                         ORG    PROM1
1149
1150      ;************************************************************
1151      ;**                                                        **
1152      ;**                      VOLUME UP                         **
1153      ;**                                                        **
1154      ;************************************************************
1155
1156  1000'  3A 2040'   VOLUP:  LDA   ONFL           ; 13 set ON flag
1157  1003'  B7                 ORA   A              ; 4 off?
1158  1004'  CA 062A'           JZ    WFI            ; 7/10 yes-wait for interrupt
1159  1007'  3A 2033'           LDA   RTC            ; 13
1160  100A'  FE 60              CPI   96             ; 7 RTC = 96?
```

```
1161  100C  C2 1053'              JNZ    DSVALV      ; 7/10 no - display amount valves open
1162  100F  CD 1163'              CALL   PEROPN      ; 18+??? calculate amount valves open
1163  1012' 3A 2063'              LDA    VALVOP      ; 13 set valve position
1164  1015  FE 64                 CPI    100         ; 7
1165  1017  D2 062A'              JNC    WFI         ; 7/10 sum > 100
1166  101A  3A 2044'              LDA    IGTMP       ; 13 ignore temp flag
1167  101D  E6 81                 ANI    81H         ; 7
1168  101F  4F                    MOV    C,A         ; 4
1169  1020  FE 01                 CPI    1           ; 7 cold requested?
1170  1022  CA 1039'              JZ     UPCOLD      ; 7/10 yes,bypass hot volume up
1171  1025' 3A 202A'              LDA    HDIFF       ; 13 set HOT difference
1172  1028  47                    MOV    B,A         ; 4 save
1173  1029' 3A 202C'              LDA    HDIR        ; 13 set HOT direction
1174  102C  B7                    ORA    A           ; 4 closed?
1175  102D  C2 108B'              JNZ    UPSUB1      ; 7/10 yes go subtract
1176  1030  78                    MOV    A,B         ; 4 set/difference
1177  1031  C6 02                 ADI    2           ; 7 add 2
1178  1033  DA 062A'              JC     WFI         ; 7/10 diff > 255
1179  1036' 32 202A'              STA    HDIFF       ; 13 save new HOT difference
1180  1039        UPCOLD:         
1180  1039  79                    MOV    A,C         ; 4 set masked IGTMP
1181  103A  FE 81                 CPI    81H         ; 7 hot requested?
1182  103C  CA 1053'              JZ     DSVALV      ; 7/10 yes,bypass cold volume up
1183  103F' 3A 2029'              LDA    CDIFF       ; 13 set COLD difference
1184  1042  4F                    MOV    C,A         ; 4 save
1185  1043' 3A 202B'              LDA    CDIR        ; 13 set COLD direction
1186  1046  B7                    ORA    A           ; 4 closed?
1187  1047  C2 10AC'              JNZ    UPSUB2      ; 7/10 yes-go subtract
1188  104A  79                    MOV    A,C         ; 4 set/difference
1189  104B  CE 02                 ACI    2           ; 7 add 2
1190  104D  DA 062A'              JC     WFI         ; 7/10 diff > 255
1191  1050' 32 2029'              STA    CDIFF       ; 13 save new COLD difference
1192  1053        DSVALV:
1192  1053  CD 1163'              CALL   PEROPN      ; 18+??? calculate percent valves open
1193  1056' 3A 200D'              LDA    VOLONE      ; 13 set % (ones)
1194  1059' 32 2066'              STA    DTAB+3      ; 13 store in display table
1195  105C' 3A 200C'              LDA    VOLTEN      ; 13 set % (tens)
1196  105F' 32 2065'              STA    DTAB+2      ; 13
1197  1062' 3A 200B'              LDA    VOLHUN      ; 13 set % (hundreds)
1198  1065' 32 2064'              STA    DTAB+1      ; 13
1199  1068' 3A 2025'              LDA    TRIOUT      ; 13 set TRIAC output byte
1200  106B  F6 04                 ORI    4           ; 4 set COLON bit
1201  106D' 32 2025'              STA    TRIOUT      ; 13 save
1202  1070  32 D000               STA    LEDTRI      ; 13 turn off COLON
1203  1073' 3A 2033'              LDA    RTC         ; 13
1204  1076  FE 60                 CPI    96          ; 7
1205  1078  C2 062A'              JNZ    WFI         ; 7/10 allow buzzer only 1/sec
1206  107B        BUZZER:
1206  107B  3E FF                 MVI    A,255       ; 7 set buzzer count
1207  107D' 32 2043'              STA    BZCNT       ; 13 store
1208  1080  3A A002               LDA    SOUND       ; 13 set Sonalert port
1209  1083  F6 80                 ORI    80H         ; 7 set Sonalert bit
1210  1085  32 A002               STA    SOUND       ; 13 turn it on
```

```
1211                                  JMP   WFI         ; 10 done--wait for interrupt
1212
1213   ;
1214   1088'  C3 062A'  UPSUB1: MOV   A,B         ;  4 set difference
1215   108B'  78                SUI   2           ;  7 subtract 2
1216   108C'  D6 02             CPI   0FFH        ;  7 result -1?
1217   108E'  FE FF             JZ    IS1         ;  7/10 yes-change dir to open
1218   1090'  CA 109B'          CPI   0FEH        ;  7 result -2?
1219   1093'  FE FE             JZ    IS2         ;  7/10 yes
1220   1095'  CA 10A0'          JMP   UP1         ; 10 now do cold
1221   1098'  C3 1036'
1222   ;
1223   109B'  3E 01     IS1:    MVI   A,1         ;  7 difference to 1
1224   109D'  C3 10A2'          JMP   CHGDR1      ; 10 go save and change direction
1225   ;
1226   10A0'  3E 02     IS2:    MVI   A,2         ;  7 difference to 2
1227   10A2'  32 202A'  CHGDR1: STA   HDIFF       ; 13 save new HOT difference
1228   10A5'  AF                XRA   A           ;  4 clear A
1229   10A6'  32 202C'          STA   HDIR        ; 13 make direction open
1230   10A9'  C3 1039'          JMP   UPCOLD      ; 10 now do cold
1231   ;
1232   10AC'  79        UPSUB2: MOV   A,C         ;  4 set difference
1233   10AD'  D6 02             SUI   2           ;  7 subtract 2
1234   10AF'  FE FF             CPI   0FFH        ;  7 result -1?
1235   10B1'  CA 10BC'          JZ    IS1A        ;  7/10 yes-change dir to open
1236   10B4'  FE FE             CPI   0FEH        ;  7 result -2?
1237   10B6'  CA 10C1'          JZ    IS2A        ;  7/10 yes
1238   10B9'  C3 1050'          JMP   UP2         ; 10 go on
1239   ;
1240   10BC'  3E 01     IS1A:   MVI   A,1         ;  7 difference to 1
1241   10BE'  C3 10C3'          JMP   CHGDR2      ; 10 go save and change direction
1242   ;
1243   10C1'  3E 02     IS2A:   MVI   A,2         ;  7 difference to 2
1244   10C3'  32 2029'  CHGDR2: STA   CDIFF       ; 13 save new difference
1245   10C6'  AF                XRA   A           ;  4 clear A
1246   10C7'  32 202B'          STA   CDIR        ; 13 make COLD direction open
1247   10CA'  C3 1053'          JMP   DSVALV      ; 10 go on
1248
1249                            PAGE
1250   ;
1251   ;**************************************************
1252   ;**                                              **
1253   ;**               VOLUME DOWN                    **
1254   ;**                                              **
1255   ;**************************************************
1256   ;
1257   10CD'  3A 2040'  VOLDWN: LDA   ONFL        ; 13 set ON flag
1258   10D0'  B7                ORA   A           ;  4 off?
1259   10D1'  CA 062A'          JZ    WFI         ;  7/10 yes-wait for interrupt
1260   10D4'  3A 2033'          LDA   RTC         ; 13 set RTC count
```

| | | | | | |
|---|---|---|---|---|---|
| 1261 | 10D7' | FE 60 | | CPI | 96 | ; 7 RTC=96? |
| 1262 | 10D9' | C2 1053' | | JNZ | DSVALV | ; 7/10 no-display amount valves open |
| 1263 | 10DC' | CD 1163' | | CALL | PEROPN | ; 18+??? calculate amount valves open |
| 1264 | 10DF' | 3A 2063' | | LDA | VALVOP | ; 13 set position |
| 1265 | 10E2' | FE 19 | | CPI | 25 | ; 7 sum < 25? |
| 1266 | 10E4' | DA 062A' | | JC | WFI | ; 7/10 yes |
| 1267 | 10E7' | 3E 01 | | MVI | A,1 | ; 7 |
| 1268 | 10E9' | 32 204B' | | STA | DWNFLG | ; 13 set volume down flag |
| 1269 | 10EC' | 3A 2044' | | LDA | IGTMP | ; 13 ignore temp flag |
| 1270 | 10EF' | E6 81 | | ANI | 81H | ; 7 |
| 1271 | 10F1' | 4F | | MOV | C,A | ; 4 save |
| 1272 | 10F2' | FE 01 | | CPI | 1 | ; 7 cold requested? |
| 1273 | 10F4' | CA 110B' | | JZ | DNCOLD | ; 7/10 yes,bypass hot volume down |
| 1274 | 10F7' | 3A 202A' | | LDA | HDIFF | ; 13 set HOT difference |
| 1275 | 10FA' | 47 | | MOV | B,A | ; 4 save |
| 1276 | 10FB' | 3A 202C' | | LDA | HDIR | ; 13 set HOT direction |
| 1277 | 10FE' | B7 | | ORA | A | ; 4 open? |
| 1278 | 10FF' | CA 111F' | | JZ | DSUB1 | ; 7/10 yes - go subtract |
| 1279 | 1102' | 78 | | MOV | A,B | ; 4 set difference |
| 1280 | 1103' | C6 02 | | ADI | 2 | ; 7 add 2 |
| 1281 | 1105' | DA 062A' | | JC | WFI | ; 7/10 difference > 255 |
| 1282 | 1108' | 32 202A' | | STA | HDIFF | ; 13 save new difference |
| 1283 | 110B' | 79 | DV1: | MOV | A,C | ; 4 set masked IGTMP |
| 1284 | 110C' | FE 81 | DNCOLD: | CPI | 81H | ; 7 hot requested? |
| 1285 | 110E' | CA 1053' | | JZ | DSVALV | ; 7/10 yes,bypass cold volume down |
| 1286 | 1111' | 3A 2029' | | LDA | CDIFF | ; 13 set COLD difference |
| 1287 | 1114' | 4F | | MOV | C,A | ; 4 save |
| 1288 | 1115' | 3A 202B' | | LDA | CDIR | ; 13 set COLD direction |
| 1289 | 1118' | B7 | | ORA | A | ; 4 open? |
| 1290 | 1119' | CA 1141' | | JZ | DSUB2 | ; 7/10 yes - go subtract |
| 1291 | 111C' | C3 104A' | | JMP | DUNVOL | ; 10 go turn on buzzer |
| 1292 | | | ; | | | |
| 1293 | 111F' | 78 | DSUB1: | MOV | A,B | ; 4 set difference |
| 1294 | 1120' | D6 02 | | SUI | 2 | ; 7 subtract 2 |
| 1295 | 1122' | FE FF | | CPI | 0FFH | ; 7 result -1? |
| 1296 | 1124' | CA 112F' | | JZ | IS1B | ; 7/10 yes |
| 1297 | 1127' | FE FE | | CPI | 0FEH | ; 7 result -2 |
| 1298 | 1129' | CA 1134' | | JZ | IS2B | ; 7/10 yes |
| 1299 | 112C' | C3 1108' | | JMP | DV1 | ; 10 go on to cold |
| 1300 | | | | | | |
| 1301 | 112F' | 3E 01 | IS1B: | MVI | A,1 | ; 7 difference to 1 |
| 1302 | 1131' | C3 1136' | | JMP | CHGDR3 | ; 10 go save and change direction |
| 1303 | | | ; | | | |
| 1304 | 1134' | 3E 02 | IS2B: | MVI | A,2 | ; 7 difference to 2 |
| 1305 | 1136' | 32 202A' | CHGDR3: | STA | HDIFF | ; 13 save new HOT difference |
| 1306 | 1139' | 3E 01 | | MVI | A,1 | ; 7 direction to closed |
| 1307 | 113B' | 32 202C' | | STA | HDIR | ; 13 save |
| 1308 | 113E' | C3 110B' | | JMP | DNCOLD | ; 10 go on to cold |
| 1309 | | | ; | | | |
| 1310 | 1141' | 79 | DSUB2: | MOV | A,C | ; 4 set difference |

| | | | | | |
|---|---|---|---|---|---|
| 1311 | 1142' | D6 02 | | SUI | 2 | ; 7 subtract 2 |
| 1312 | 1144' | FE FF | | CPI | 0FFH | ; 7 result -1? |
| 1313 | 1146' | CA 1151' | | JZ | IS1C | ; 7/10 yes |
| 1314 | 1149' | FE FE | | CPI | 0FEH | ; 7 result -2? |
| 1315 | 114B' | CA 1156' | | JZ | IS2C | ; 7/10 yes |
| 1316 | 114E' | C3 1050' | | JMP | UP2 | ; 10 go turn on buzzer |
| 1317 | | | ; | | | |
| 1318 | 1151' | 3E 01 | IS1C: | MVI | A,1 | ; 7 difference to 1 |
| 1319 | 1153' | C3 1158' | | JMP | CHGDR4 | ; 10 go save and change direction |
| 1320 | | | ; | | | |
| 1321 | 1156' | 3E 02 | IS2C: | MVI | A,2 | ; 7 difference to 2 |
| 1322 | 1158' | 32 2029' | CHGDR4: | STA | CDIFF | ; 13 save new COLD difference |
| 1323 | 115B' | 3E 01 | | MVI | A,1 | ; 7 direction to closed |
| 1324 | 115D' | 32 202B' | | STA | CDIR | ; 13 save new COLD direction |
| 1325 | 1160' | C3 107B' | | JMP | BUZZER | ; 10 go turn on buzzer |
| 1326 | | | ; | | | |
| 1327 | 1163' | 3A 2028' | PEROPN: | LDA | HPOS | ; 13 get HOT position |
| 1328 | 1166' | D6 20 | | SUI | VLVOS1 | ; 7 subtract valve offset |
| 1329 | 1168' | 47 | | MOV | B,A | ; 4 save |
| 1330 | 1169' | 3A 2027' | | LDA | CPOS | ; 13 get COLD position |
| 1331 | 116C' | D6 20 | | SUI | VLVOS1 | ; 7 subtract valve offset |
| 1332 | 116E' | 80 | | ADD | B | ; 4 add |
| 1333 | 116F' | DA 062A' | | JC | WFI | ; 7/10 >255 |
| 1334 | 1172' | 32 2063' | | STA | VALVOP | ; 13 save |
| 1335 | 1175' | 4F | | MOV | C,A | ; 4 save |
| 1336 | 1176' | AF | | XRA | A | ; 4 |
| 1337 | 1177' | 32 2064' | | STA | VOLHUN | ; 13 clear RAM |
| 1338 | 117A' | 32 2065' | | STA | VOLTEN | ; 13 |
| 1339 | 117D' | 32 2066' | | STA | VOLONE | ; 13 |
| 1340 | 1180' | 79 | | MOV | A,C | ; 4 get back |
| 1341 | 1181' | D6 64 | | SUI | 100 | ; 7 subtract hundreds |
| 1342 | 1183' | FA 1192' | | JM | TENVL | ; 7/10 < 100 |
| 1343 | 1186' | 3E 01 | | MVI | A,1 | ; 7 |
| 1344 | 1188' | 32 2064' | | STA | VOLHUN | ; 13 set hundreds to 1 |
| 1345 | 118B' | 21 0000 | | LXI | H,0 | ; 10 |
| 1346 | 118E' | 22 2065' | | SHLD | VOLTEN | ; 16 clear tens,ones |
| 1347 | 1191' | C9 | | RET | | ; 10 |
| 1348 | | | ; | | | |
| 1349 | 1192' | 79 | TENVL: | MOV | A,C | ; 4 set original # |
| 1350 | 1193' | D6 0A | | SUI | 10 | ; 7 subtract tens |
| 1351 | 1195' | FA 11A3' | | JM | ONEVL | ; 7/10 <10 |
| 1352 | 1198' | 4F | | MOV | C,A | ; 4 save |
| 1353 | 1199' | 3A 2065' | | LDA | VOLTEN | ; 13 |
| 1354 | 119C' | 3C | | INR | A | ; 4 |
| 1355 | 119D' | 32 2065' | | STA | VOLTEN | ; 13 increment VOLTEN |
| 1356 | 11A0' | C3 1192' | | JMP | TENVL | ; 10 |
| 1357 | | | ; | | | |
| 1358 | 11A3' | 79 | ONEVL: | MOV | A,C | ; 4 get subtracted value |
| 1359 | 11A4' | D6 01 | | SUI | 1 | ; 7 subtract ones |
| 1360 | 11A6' | F8 | | RM | | ; 6/12 <1 |

```
1361  11A7'  4F              MOV    C,A          ; 4  save
1362  11A8'  3A 2066'        LDA    VOLONE       ; 13
1363  11AB'  3C              INR    A            ; 4
1364  11AC'  32 2066'        STA    VOLONE       ; 13 increment VOLONE
1365  11AF'  C3 11A3'        JMP    ONEVL        ; 10
1366
1367                ;*********************************************
1368                ;**
1369                ;**            TRANSDUCER FAIL
1370                ;**
1371                ;*********************************************
1372
1373
1374  11B2'  3E 02           TRNFAL: MVI    A,2          ; 7  error 2
1375  11B4'  CD 11BA'        CALL   ERRDIS       ; 18+153 display error msg
1376  11B7'  C3 06DF'        JMP    OFF          ; 10 turn off
1377.
1378  11BA'  32 200D'        ERRDIS: STA    DTAB+3       ; 13 store error number
1379  11BD'  3E 0B           MVI    A,0BH        ; 7  E
1380  11BF'  32 200C'        STA    DTAB+2       ; 13
1381  11C2'  21 FFFF         LXI    H,0FFFFH     ; 10
1382  11C5'  22 200A'        SHLD   DTAB         ; 16 blank top 2 displays
1383  11C8'  CD 14DB'        CALL   COLOUT       ; 18+56 turn off colon
1384  11CB'  3E FF           MVI    A,0FFH       ; 7
1385  11CD'  32 203E'        STA    ERRFLG       ; 13 set flash flag
1386  11D0'  3E C0           MVI    A,0C0H       ; 7
1387                          SIM                 ; 4  turn on A/D
1388
1389  11D2'  30              RET                  ; 10
1390  11D3'  C9              PAGE
1391
1392
1393
1394
1395
1396                ;*********************************************
1397                ;**
1398                ;**            COLD TO HOT OPERATIONS
1399                ;**
1400                ;*********************************************
1401  11D4'  3E 01           COLD:  MVI    A,1          ; 7  Ignore temp flag, cold requested
1402  11D6'  21 0443         LXI    H,0443H      ; 10 80F
1403  11D9'  C3 121A'        JMP    DOIT         ; 10
1404
1405  11DC'  AF              T1:    XRA    A            ; 4  Don't ignore temperature
1406  11DD'  21 04B6         LXI    H,04B6H      ; 10 85F
1407  11E0'  C3 121A'        JMP    DOIT         ; 10
1408
1409  11E3'  AF              T2:    XRA    A            ; 4
1410  11E4'  21 0527         LXI    H,0527H      ; 10 90F
```

```
1411  11E7'  C3 121A'        JMP  DOIT 1412
1413  11EA'  AF              T3:  XRA  A             ; 10
1414  11EB'  21 059A              LXI  H,059AH       ; 4
1415  11EE'  C3 121A'             JMP  DOIT          ; 10  95F
1416
1417  11F1'  AF              T4:  XRA  A             ; 4
1418  11F2'  21 0607              LXI  H,0607H       ; 10
1419  11F5'  C3 121A'             JMP  DOIT          ; 10  100F
1420
1421  11F8'  AF              T5:  XRA  A             ; 4
1422  11F9'  21 067A              LXI  H,067AH       ; 10
1423  11FC'  C3 121A'             JMP  DOIT          ; 10  105F
1424
1425  11FF'  AF              T6:  XRA  A             ; 4
1426  1200'  21 06EB              LXI  H,06EBH       ; 10
1427  1203'  C3 121A'             JMP  DOIT          ; 10  110F
1428
1429  1206'  AF              T7:  XRA  A             ; 4
1430  1207'  21 075E              LXI  H,075EH       ; 10
1431  120A'  C3 121A'             JMP  DOIT          ; 10  115F
1432
1433  120D'  06 81           HOT: MVI  B,81H         ; 7   Ignore temperature flag, hot requested
1434  120F'  21 07CF              LXI  H,07CFH       ; 10  120F
1435  1212'  3A 2047'             LDA  SHWFLG        ; 13  set shower flag
1436  1215'  B7                   ORA  A             ; 4   shower?
1437  1216'  CA 121B'             JZ   DOIT1         ; 7/10 no, so ignore temp
1438  1219'  AF                   XRA  A             ; 4   clear ignore temp flag
1439  121A'  47              DOIT: MOV  B,A          ; 12  save A
1440  121B'  3A 2040'        DOIT1: LDA  ONFL        ; 13  set on flag
1441  121E'  B7                   ORA  A             ; 4   off?
1442  121F'  CA 062A'             JZ   WFI           ; 7/10 yes
1443  1222'  3A 2048'             LDA  DUNFLG        ; 13  done once flag
1444  1225'  B7                   ORA  A             ; 4   set?
1445  1226'  C2 1309'             JNZ  DISPLY        ; 7/10 yes already done
1446  1229'  78                   MOV  A,B           ; 10  set A
1447  122A'  32 2044'             STA  IGTMP         ; 13  store ignore temp flag
1448  122D'  22 2038'             SHLD TR            ; 16  save temperature requested
1449  1230'  2A 201F'             LHLD TMPAVG        ; 16  set current average temperature
1450  1233'  22 2036'             SHLD TRRL          ; 16  save as temp requested rate limited
1451  1236'  C3 12F7'             JMP  BUZDUN        ; 10  turn on Sonalert - go wait for interrupt 1452
1453  ;*************************************************
1454  ;**                                             **
1455  ;**           SHOWER / DISPOSAL                 **
1456  ;**                                             **
1457  ;*************************************************
1458
1459  1239'  3A 2048'        SHOWER: LDA  DUNFLG     ; 13  set done once flag
1460  123C'  B7                     ORA  A            ; 4   set?
```

```
1461          JNZ   WFI              ; 7/10 yes
1462   C2 062A'  INR   A             ; 4
1463   3C        STA   DUNFLG        ; 13 set done once flag
1464   32 2048'  LDA   TRIOUT        ; 13 set TRIAC output
1465   3A 2025'  XRI   10H           ; 7  compliment TRIAC2 bit
1466   EE 10     STA   TRIOUT        ; 13 save
1467   32 2025'  STA   LEDTRI        ; 13 output
1468   32 D000   LDA   SWS           ; 13 set switch options
1469   3A 2026'  ANI   40H           ; 7  isolate shower mode bit
1470   E6 40     JZ    DISPOS        ; 7/10 not shower, is disposal
1471   CA 1261'  LDA   SHWFLG        ; 13 set shower flag
1472   3A 2047'  CMA                 ; 4  compliment
1473   2F        STA   SHWFLG        ; 13 save
1474   32 2047'  JMP   BUZZER        ; 10
1475   C3 107B'
1476
1477   AF       DISPOS: XRA  A       ; 4
1478   C3 125B'         JMP  SAVSHW  ; 10 clear shower flag
1479
1480           PAGE
1481
1482  ;*****************************************
1483  ;**                                     **
1484  ;**           DRAIN                     **
1485  ;**                                     **
1486  ;*****************************************
1487
1488   3A 2048' DRAIN: LDA   DUNFLG  ; 13 done once flag
1489   B7              ORA   A       ; 4  set?
1490   C2 062A'        JNZ   WFI     ; 7/10 yes
1491   3C              INR   A       ; 4
1492   32 2048'        STA   DUNFLG  ; 13 set done once flag
1493   3A 2049'        LDA   DRNFLG  ; 13 set drain flag
1494   B7              ORA   A       ; 4  off?
1495   C2 1289'        JNZ   DRNOFF  ; 7/10 no - so turn it off
1496   3C              INR   A       ; 4
1497   32 2049'        STA   DRNFLG  ; 13 set drain flag
1498   3A 2025'        LDA   TRIOUT  ; 13
1499   E6 F7           ANI   TRIAC1  ; 4  turn on drain
1500   32 2025'        STA   TRIOUT  ; 13 save output
1501   32 D000         STA   LEDTRI  ; 13 output
1502   C3 107B'        JMP   BUZZER  ; 10
1503
1504   AF      DRNOFF: XRA   A       ; 4
1505   32 2049'        STA   DRNFLG  ; 13 clear drain flag
1506   3A 2025'        LDA   TRIOUT  ; 13
1507   F6 08           ORI   8       ; 7  turn off drain
1508   32 2025'        STA   TRIOUT  ; 13 save output
1509   32 D000         STA   LEDTRI  ; 13 output
1510   C3 107B'        JMP   BUZZER  ; 10
```

```
1511                    ;****************************************************
1512                    ;**                                                **
1513                    ;**            TUB FILL                            **
1514                    ;**                                                **
1515                    ;****************************************************
1516
1517
1518 129B  3A 2048  TUBFIL: LDA  DUNFLG      ; 13 set done once flag
1519 129E  B7             ORA  A            ; 4  off?
1520 129F  C2 12B3        JNZ  TUB1         ; 7/10 just display tub fill time
1521 12A2  3C             INR  A            ; 4
1522 12A3  32 2048        STA  DUNFLG       ; 13 set done once flag
1523 12A6  3E FF          MVI  A,255        ; 7
1524 12A8  32 2043        STA  BZCNT        ; 13 set buzzer count
1525 12AB  3A A002        LDA  SOUND        ; 13
1526 12AE  F6 80          ORI  80H          ; 7  set Sonalert bit
1527 12B0  32 A002        STA  SOUND        ; 13 output
1528 12B3  2A 202F  TUB1:  LHLD TFTIME       ; 16 set tub fill time
1529 12B6  CD 0397        CALL TIMDIS       ; 18+??? time display
1530 12B9  C3 062A        JMP  WFI          ; 10
1531
1532                    ;****************************************************
1533                    ;**                                                **
1534                    ;**          TEMPERATURE UP                        **
1535                    ;**                                                **
1536                    ;****************************************************
1537
1538 12BC  3A 2040  TMPUP:  LDA  ONFL         ; 13 on flag
1539 12BF  B7             ORA  A            ; 4  off?
1540 12C0  CA 062A        JZ   WFI          ; 7/10 yes
1541 12C3  3A 2048        LDA  DUNFLG       ; 13 done once flag
1542 12C6  B7             ORA  A            ; 4  set?
1543 12C7  C2 1309        JNZ  DISPLY       ; 7/10 yes
1544 12CA  3A 2047        LDA  SHWFLG       ; 13 set shower flag
1545 12CD  B7             ORA  A            ; 7
1546 12CE  CA 12E6        JZ   INCTMP       ; 7/10 not in shower mode
1547 12D1  3A 206A        LDA  HOTFLG       ; 13 set hot & temp up flag
1548 12D4  B7             ORA  A            ; 4
1549 12D5  C2 12E6        JNZ  INCTMP       ; 7/10 set
1550 12D8  11 07CE        LXI  D,07CEH      ; 10 max temp 120F
1551 12DB  2A 2038        LHLD TR           ; 16 temperature requested
1552 12DE  CD 16E5        CALL SUBT         ; 18+167 Maxtemp-TR
1553 12E1  7C             MOV  A,H          ; 4  MSB to A
1554 12E2  B7             ORA  A            ; 4  set flags
1555 12E3  FA 1309        JM   DISPLY       ; 7/10 at max temp don't increment
1556 12E6  AF       INCTMP: XRA  A            ; 4
1557 12E7  32 206A        STA  HOTFLG       ; 13 clear hot flag
1558 12EA  2A 2038        LHLD TR           ; 16 temperature requested
1559 12ED  EB             XCHG              ; 4
1560 12EE  21 0017        LXI  H,17H        ; 10 .1 deg increment
```

```
1561  12F1'  CD 16B7'         CALL    ADDD           ; 18+174 add in increment
1562  12F4'  22 2038'  TMPCOM: SHLD    TR             ; 16 new temperature requested
1563  12F7'  3E 01     BUZDUN: MVI     A,1            ; 7
1564  12F9'  32 2048'          STA     DUNFLG         ; 13 set done once flag
1565  12FC'  3E FF             MVI     A,255          ; 7
1566  12FE'  32 2043'          STA     BZCNT          ; 13 set buzzer count
1567  1301'  3A A002           LDA     SOUND          ; 13
1568  1304'  F6 80             ORI     80H            ; 4  set Sonalert bit
1569  1306'  32 A002           STA     SOUND          ; 13 turn it on
1570  1309'  2A 2038'  DISPLY: LHLD    TR             ; 16 temperature requested
1571  130C'  EB                XCHG                   ; 4
1572  130D'  CD 142F'          CALL    TMPDIS         ; 18+??? display temperature requested
1573  1310'  C3 062A'          JMP     WFI 1574
1575                   ;       PAGE
1576
1577                   ;****************************************************
1578                   ;**                                                **
1579                   ;**            TEMPERATURE DOWN                    **
1580                   ;**                                                **
1581                   ;****************************************************
1582
1583
1584  1313'  3A 2040'  TMPDWN: LDA     ONFL           ; 13 on flag
1585  1316'  B7                ORA     A              ; 4  off?
1586  1317'  CA 062A'          JZ      WFI            ; 7/10 yes
1587  131A'  3A 2048'          LDA     DUNFLG         ; 13 done once flag
1588  131D'  B7                ORA     A              ; 4  set?
1589  131E'  C2 1309'          JNZ     DISPLY         ; 7/10 yes
1590  1321'  2A 2038'          LHLD    TR             ; 16 temperature requested
1591  1324'  EB                XCHG                   ; 4
1592  1325'  21 04B4           LXI     H,04B4H        ; 10 minimum temp 85F
1593  1328'  CD 16E5'          CALL    SUBT           ; 18+167
1594  132B'  7C                MOV     A,H            ; 4
1595  132C'  B7                ORA     A              ; 4  set flags
1596  132D'  FA 1309'          JM      DISPLY         ; 7/10 at minimum temperature
1597  1330'  21 0017           LXI     H,17H          ; 10 1 deg decrement TR in D,E
1598  1333'  CD 16E5'          CALL    SUBT           ; 18+167
1599  1336'  C3 12F4'          JMP     TMPCOM         ; 10 temperature correction complete 1600
1601                   ;       PAGE
1602
1603                   ;****************************************************
1604                   ;**                                                **
1605                   ;**            TIME MINUTES SET                    **
1606                   ;**                                                **
1607                   ;****************************************************
1608
1609
1610  1339'  CD 1368'  MINSET: CALL    SETIME         ; 18+??? Time set subroutine
```

```
1611        XRA   A               ; 4
1612 133C' AF    STA   SEC             ; 13  set seconds
1613 133D' 32 203A'  LDA   MIN         ; 13
1614 1340' 3A 203B'  ORA   A           ; 4   clear carry
1615 1343' B7   INR   A                ; 4   increment minutes
1616 1344' 3C   DAA                    ; 4
1617 1345' 27   CPI   60H              ; 7   max?
1618 1346' FE 60  JNZ   MINA           ; 7/10 no
1619 1348' C2 134C'  XRA   A           ; 4   make minute 0
1620 134B' AF   STA   MIN              ; 13  save minutes
1621 134C' 32 203B' MINA: STA MIN
1622 134F' C3 062A'  JMP   WFI         ; 10
1623
1624        ;****************************************
1625        ;*                                      *
1626        ;*       TIME HOURS SET                 *
1627        ;*                                      *
1628        ;****************************************
1629        ;
1630 1352' CD 1368' HRSSET: CALL SETIME ; 18+??? Time set subroutine
1631 1355' 3A 203C'  LDA   HRS         ; 13  set hours
1632 1358' B7   ORA   A                ; 4   clear carry
1633 1359' 3C   INR   A                ; 4
1634 135A' 27   DAA                    ; 4
1635 135B' FE 13   CPI   13H           ; 7   max?
1636 135D' C2 1362'  JNZ   HRSA        ; 7/10 no
1637 1360' 3E 01   MVI   A,1           ; 7   set hours to 1
1638 1362' 32 203C' HRSA: STA HRS      ; 13  save hours
1639 1365' C3 062A'  JMP   WFI         ; 10
1640
1641        ;
1642        PAGE
1643        ;
1644 1368' 3A 2040' SETIME: LDA ONFL   ; 13  set on flag
1645 136B' B7   ORA   A                ; 4
1646 136C' C2 13A2'  JNZ   SETB        ; 7/10 on
1647 136F' 2A 203B'  LHLD  MIN         ; 16  set time
1648 1372' CD 0397'  CALL  TIMDIS      ; 18+184 display time
1649 1375' 3A 2048'  LDA   DUNFLG      ; 13  set done once flag
1650 1378' B7   ORA   A                ; 4
1651 1379' C2 138F'  JNZ   SETA        ; 7/10 set
1652 137C' 3C   INR   A                ; 4
1653 137D' 32 2048'  STA   DUNFLG      ; 13  set done once flag
1654 1380' 32 204C'  STA   TINT        ; 13  set time initialized flag
1655 1383' 3A 2033'  LDA   RTC         ; 13  set real time clock
1656 1386' F6 80   ORI   80H           ; 7   set MSB as 1 sec timer flag
1657 1388' 32 2041'  STA   TMFLG       ; 13  save in time set flag
1658 138B' E1   POP   H                ; 10  clear stack from call
1659 138C' C3 107B'  JMP   BUZZER
1660        ;
```

```
1561  12F1'  CD 16B7'        TMPCOM: CALL  ADDD            ; 18+174 add in increment
1562  12F4'  22 2038'                SHLD  TR              ; 16 new temperature requested
1563  12F7'  3E 01           BUZDUN: MVI   A,1             ; 7
1564  12F9'  32 2048'                STA   DUNFLG          ; 13 set done once flag
1565  12FC'  3E FF                   MVI   A,255           ; 7
1566  12FE'  32 2043'                STA   BZCNT           ; 13 set buzzer count
1567  1301'  3A A002                 LDA   SOUND           ; 13
1568  1304'  F6 80                   ORI   80H             ; 4 set Sonalert bit
1569  1306'  32 A002                 STA   SOUND           ; 13 turn it on
1570  1309'  2A 2038'        DISPLY: LHLD  TR              ; 16 temperature requested
1571  130C'  EB                      XCHG                  ; 4
1572  130D'  CD 142F'                CALL  TMPDIS          ; 18+??? display temperature requested
1573  1310'  C3 062A'                JMP   WFI
1574
1575                                 PAGE
1576
1577  ;****************************************************
1578  ;**
1579  ;**            TEMPERATURE DOWN
1580  ;**
1581  ;****************************************************
1582
1583
1584  1313'  3A 2040'        TMPDOWN: LDA  ONFL             ; 13 on flag
1585  1316'  B7                      ORA   A                ; 4 off?
1586  1317'  CA 062A'                JZ    WFI              ; 7/10 yes
1587  131A'  3A 2048'                LDA   DUNFLG           ; 13 done once flag
1588  131D'  B7                      ORA   A                ; 4 set?
1589  131E'  C2 1309'                JNZ   DISPLY           ; 7/10 yes
1590  1321'  2A 2038'                LHLD  TR               ; 16 temperature requested
1591  1324'  EB                      XCHG                   ; 4
1592  1325'  21 04B4                 LXI   H,04B4H          ; 10 minimum temp 85F
1593  1328'  CD 16E5'                CALL  SUBT             ; 18+167
1594  132B'  7C                      MOV   A,H              ; 4
1595  132C'  B7                      ORA   A                ; 4 set flags
1596  132D'  FA 1309'                JM    DISPLY           ; 7/10 at minimum temperature
1597  1330'  21 0017                 LXI   H,17H            ; 10 1dez decrement TR in D,E
1598  1333'  CD 16E5'                CALL  SUBT             ; 18+167
1599  1336'  C3 12F4'                JMP   TMPCOM           ; 10 temperature correction complete
1600
1601
1602
1603
1604  ;****************************************************
1605  ;**
1606  ;**             TIME MINUTES SET
1607  ;**
1608  ;****************************************************
1609
1610  1339'  CD 1368'        MINSET: CALL  SETIME           ; 18+??? Time set subroutine
```

| | | | | | | |
|---|---|---|---|---|---|---|
| 1611 | 133C' | AF | | XRA | A | |
| 1612 | 133D' | 32 203A' | | STA | SEC | ; 4 13 set seconds |
| 1613 | 1340' | 3A 203B' | | LDA | MIN | ; 13 |
| 1614 | 1343' | B7 | | ORA | A | ; 4 clear carry |
| 1615 | 1344' | 3C | | INR | A | ; 4 increment minutes |
| 1616 | 1345' | 27 | | DAA | | ; 4 |
| 1617 | 1346' | FE 60 | | CPI | 60H | ; 7 max? |
| 1618 | 1348' | C2 134C' | | JNZ | MINA | ; 7/10 no |
| 1619 | 134B' | AF | | XRA | A | ; 4 make minute 0 |
| 1620 | 134C' | 32 203B' | MINA: | STA | MIN | ; 13 save minutes |
| 1621 | 134F' | C3 062A' | | JMP | WFI | ; 10 |
| 1622 | | | | | | |
| 1623 | | | ;*********************************************** | | | |
| 1624 | | | ;* | | | * |
| 1625 | | | ;* TIME HOURS SET | | | * |
| 1626 | | | ;* | | | * |
| 1627 | | | ;*********************************************** | | | |
| 1628 | | | ; | | | |
| 1629 | | | | | | |
| 1630 | 1352' | CD 1368' | HRSSET: | CALL | SETIME | ; 18+??? Time set subroutine |
| 1631 | 1355' | 3A 203C' | | LDA | HRS | ; 13 set hours |
| 1632 | 1358' | B7 | | ORA | A | ; 4 clear carry |
| 1633 | 1359' | 3C | | INR | A | ; 4 |
| 1634 | 135A' | 27 | | DAA | | ; 4 |
| 1635 | 135B' | FE 13 | | CPI | 13H | ; 7 max? |
| 1636 | 135D' | C2 1362' | | JNZ | HRSA | ; 7/10 no |
| 1637 | 1360' | 3E 01 | | MVI | A,1 | ; 7 set hours to 1 |
| 1638 | 1362' | 32 203C' | HRSA: | STA | HRS | ; 13 save hours |
| 1639 | 1365' | C3 062A' | | JMP | WFI | ; 10 |
| 1640 | | | ; | | | |
| 1641 | | | PAGE | | | |
| 1642 | | | | | | |
| 1643 | | | | | | |
| 1644 | 1368' | 3A 2040' | SETIME: | LDA | ONFL | ; 13 set on flag |
| 1645 | 136B' | B7 | | ORA | A | ; 4 |
| 1646 | 136C' | C2 13A2' | | JNZ | SETB | ; 7/10 on |
| 1647 | 136F' | 2A 203B' | | LHLD | MIN | ; 16 set time |
| 1648 | 1372' | CD 0397' | | CALL | TIMDIS | ; 18+184 display time |
| 1649 | 1375' | 3A 2048' | | LDA | DUNFLG | ; 13 set done once flag |
| 1650 | 1378' | B7 | | ORA | A | ; 4 |
| 1651 | 1379' | C2 138F' | | JNZ | SETA | ; 7/10 set |
| 1652 | 137C' | 3C | | INR | A | ; 4 |
| 1653 | 137D' | 32 2048' | | STA | DUNFLG | ; 13 set done once flag |
| 1654 | 1380' | 32 204C' | | STA | TINT | ; 13 set time initialized flag |
| 1655 | 1383' | 3A 2033' | | LDA | RTC | ; 13 set real time clock |
| 1656 | 1386' | F6 80 | | ORI | 80H | ; 7 set MSB as 1 sec timer flag |
| 1657 | 1388' | 32 2041' | | STA | TMFLG | ; 13 save in time set flag |
| 1658 | 138B' | E1 | | POP | H | ; 10 clear stack from call |
| 1659 | 138C' | C3 107B' | | JMP | BUZZER | ; 10 |
| 1660 | | | ; | | | |

```
1661                                   SET4:  LDA  TMFLG      ; 13 set time set flag
1662   138F'  3A 2041'                        ORA  A          ; 4 set flags
1663   1392'  B7                               JM   SETC      ; 7/10 still in 1 sec timer
1664   1393'  FA 13A6'                        LDA  RTC        ; 13 set real time clock
1665   1396'  3A 2033'                        ORA  A          ; 4
1666   1399'  B7                               JZ   SETD      ; 7/10 increment time
1667   139A'  CA 13B0'                        CPI  50         ; 7
1668   139D'  FE 32                            JZ   SETD      ; 7/10 increment time
1669   139F'  CA 13B0'                        POP  H          ; 10 clear stack from call
1670   13A2'  E1                               JMP  WFI        ; 10
1671   13A3'  C3 062A'
1672                                   SETC:  ANI  7FH        ; 7 mask off MSB
1673   13A6'  E6 7F                            MOV  B,A       ; 4 save A
1674   13A8'  47                               LDA  RTC       ; 13 set real time clock
1675   13A9'  3A 2033'                        CMP  B          ; 4 TMFLG=RTC?
1676   13AC'  B8                               JNZ  SETB      ; 7/10 no
1677   13AD'  C2 13A2'                        LDA  TMFLG     ; 13
1678   13B0'  3A 2041'                 SETD:  ANI  7FH        ; 7 mask MSB
1679   13B3'  E6 7F                            STA  TMFLG    ; 13 clear time set flag
1680   13B5'  32 2041'                         RET
1681   13B8'  C9
1682                                   ;      PAGE
1683
1684                                   ;****************************************
1685                                   ;**                                    **
1686                                   ;**        TUB FILL                    **
1687                                   ;**        COLD TO HOT OPERATIONS      **
1688                                   ;**                                    **
1689                                   ;****************************************
1690                                   ;
1691                                   ;
1692   13B9'  21 0443                  TFCOLD: LXI  H,0443H    ; 10  80F
1693   13BC'  C3 13EC'                         JMP  TFDOIT     ; 10
1694                                   ;
1695   13BF'  21 04B6                  TFT1:   LXI  H,04B6H    ; 10  85F
1696   13C2'  C3 13EC'                         JMP  TFDOIT     ; 10
1697                                   ;
1698   13C5'  21 0527                  TFT2:   LXI  H,0527H    ; 10  90F
1699   13C8'  C3 13EC'                         JMP  TFDOIT     ; 10
1700                                   ;
1701   13CB'  21 059A                  TFT3:   LXI  H,059AH    ; 10  95F
1702   13CE'  C3 13EC'                         JMP  TFDOIT     ; 10
1703                                   ;
1704   13D1'  21 0607                  TFT4:   LXI  H,0607H    ; 10  100F
1705   13D4'  C3 13EC'                         JMP  TFDOIT     ; 10
1706                                   ;
1707   13D7'  21 067A                  TFT5:   LXI  H,067AH    ; 10  105F
1708   13DA'  C3 13EC'                         JMP  TFDOIT     ; 10
1709                                   ;
1710   13DD'  21 06EB                  TFT6:   LXI  H,06EBH    ; 10  110F
```

```
1711                          ;               JMP     TFDOIT          ; 10
1712
1713  13E0'  C3 13EC'          TFT7:          LXI     H,075EH         ; 10  115F
1714  13E3'  21 075E                          JMP     TFDOIT          ; 10
1715  13E6'  C3 13EC'
1716                           ;
1717  13E9'  21 07CF           TFHOT:         LXI     H,07CFH         ; 10  120F
1718  13EC'  3A 2048'          TFDOIT:        LDA     DUNFLG          ; 13  set done once flag
1719  13EF'  B7                               ORA     A               ; 4   set
1720  13F0'  C2 1401'                         JNZ     TFDUN           ; 7/10 yes
1721  13F3'  3C                               INR     A               ; 4   set
1722  13F4'  32 2048'                         STA     DUNFLG          ; 13  set done once flag
1723  13F7'  22 202D'                         SHLD    TFTEMP          ; 16  save tub fill temp
1724  13FA'  EB                               XCHG                    ; 4
1725  13FB'  CD 142F'                         CALL    TMPDIS          ; 18+??? display temperature
1726  13FE'  C3 107B'                         JMP     BUZZER          ; 10
1727                           ;
1728  1401'  EB                TFDUN:         XCHG                    ; 4
1729  1402'  CD 142F'                         CALL    TMPDIS          ; 18+??? display temperature
1730  1405'  C3 062A'                         JMP     WFI             ; 10
1731                           ;
1732                                          PAGE
1733
1734                           ;***********************************************
1735                           ;**                                           **
1736                           ;**             ON HOURS SET                  **
1737                           ;**                                           **
1738                           ;***********************************************
1739                           ;
1740  1408'  C3 062A'          ONHRST:        JMP     WFI             ; 10
1741                           ;
1742                           ;***********************************************
1743                           ;**                                           **
1744                           ;**             ON MINUTES SET                **
1745                           ;**                                           **
1746                           ;***********************************************
1747                           ;
1748  140B'  C3 062A'          ONMNST:        JMP     WFI             ; 10
1749                           ;
1750                           ;***********************************************
1751                           ;**                                           **
1752                           ;**          HOT AND TEMPERATURE UP           **
1753                           ;**                                           **
1754                           ;***********************************************
1755                           ;
1756  140E'  3E 01             HOTUP:         MVI     A,1             ; 7
1757  1410'  32 206A'                         STA     HOTFLG          ; 13  set hot and temperature up flag
1758  1413'  C3 12BC'                         JMP     TMPUP           ; 10
1759                           ;
```

```
1762                ;****************************************************
1763                ;**                                                **
1764                ;**            CALIBRATE                           *
1765                ;**                                                *
1766                ;****************************************************
1767
1768  1416  3A 2048 CAL:    LDA     DUNFLG          ; 13 done once flag
1769  1419  B7              ORA     A               ; 4 clear?
1770  141A  C2 062A         JNZ     WFI             ; 7/10 no
1771  141D  3C              INR     A               ; 4
1772  141E  32 2048         STA     DUNFLG          ; 13 set done once flag
1773  1421  3A 204A         LDA     CALFLG          ; 13 set calibrate flag
1774  1424  2F              CMA                     ; 4 compliment it
1775  1425  32 204A         STA     CALFLG          ; 13 save it
1776  1428  C3 107B         JMP     BUZZER          ; 10
1777
1778                  PAGE
1779
1780
1781                ;****************************************************
1782                ;**                                                *
1783                ;**       UPDATE TEMPERATURE DISPLAY               *
1784                ;**            SUBROUTINE                          *
1785                ;**                                                *
1786                ;****************************************************
1787
1788  142B  2A 201F UPDTMP: LHLD    TMPAVG          ; 16 set current average temperature
1789  142E  EB              XCHG                    ; 4 into D,E
1790  142F  3A 2026 TMPDIS: LDA     SWS             ; 13 switch options
1791  1432  E6 80           ANI     80H             ; 7 set MS Bit
1792  1434  CA 1450         JZ      INITC           ; 7/10 initialize Centigrade values
1793  1437  21 08E4         LXI     H,08E4H         ; 10 100F offset
1794  143A  22 2057         SHLD    X100            ; 16 save
1795  143D  21 00E4         LXI     H,00E4H         ; 10 10F offset
1796  1440  22 2059         SHLD    X10             ; 16 save
1797  1443  21 0017         LXI     H,0017H         ; 10 1F offset
1798  1446  22 205B         SHLD    X1              ; 16 save
1799  1449  21 02DD         LXI     H,02DDH         ; 10 32F offset
1800  144C  19              DAD     D               ; 10 add offset to temperature
1801  144D  C3 1463         JMP     HUNDRD          ; 10 start conversion
1802
1803  1450  21 0FFF INITC:  LXI     H,0FFFH         ; 10 100C offset
1804  1453  22 2057         SHLD    X100            ; 16 save
1805  1456  21 019A         LXI     H,019AH         ; 10 10C offset
1806  1459  22 2059         SHLD    X10             ; 16 save
1807  145C  21 0029         LXI     H,0029H         ; 10 1C offset
1808  145F  22 205B         SHLD    X1              ; 16 save
1809  1462  EB              XCHG                    ; 4 temp into H,L
1810  1463  22 2055 HUNDRD: SHLD    TMPTMP          ; 16 save temp
1811  1466  EB              XCHG                    ; 4
```

| | | | | | |
|---|---|---|---|---|---|
| 1812 | 1467' | 2A 2057' | | LHLD | X100 | ; 16 set 100 des offset |
| 1813 | 146A' | CD 16E5' | | CALL | SUBT | ; 18+??? subtract |
| 1814 | 146D' | FA 147B' | | JM | TENS | ; 7/10 result minus |
| 1815 | 1470' | 3A 205D' | | LDA | HUNCNT | ; 13 set hundreds count |
| 1816 | 1473' | 3E 01 | | MVI | A,1 | ; 7 set to one |
| 1817 | 1475' | 32 205D' | | STA | HUNCNT | ; 13 save |
| 1818 | 1478' | C3 1463' | | JMP | HUNDRD | ; 10 again |
| 1819 | | | ; | | | |
| 1820 | 147B' | 2A 2055' | TENS: | LHLD | TMPTMP | ; 16 set modified temperature value |
| 1821 | 147E' | EB | | XCHG | | ; 4 save |
| 1822 | 147F' | 2A 2059' | | LHLD | X10 | ; 16 set 10 des offset |
| 1823 | 1482' | CD 16E5' | | CALL | SUBT | ; 18+??? subtract |
| 1824 | 1485' | FA 149B' | | JM | ONES | ; 7/10 result minus |
| 1825 | 1488' | 22 2055' | | SHLD | TMPTMP | ; 16 save new subtracted temp |
| 1826 | 148B' | 3A 205E' | | LDA | TENCNT | ; 13 set tens count |
| 1827 | 148E' | 3C | | INR | A | ; 4 increment |
| 1828 | 148F' | FE 0A | | CPI | 10 | ; 7 ten? |
| 1829 | 1491' | C2 1495' | | JNZ | TENS1 | ; 7/10 no |
| 1830 | 1494' | 3D | | DCR | A | ; 4 make it 9 |
| 1831 | 1495' | 32 205E' | TENS1: | STA | TENCNT | ; 13 save |
| 1832 | 1498' | C3 147B' | | JMP | TENS | ; 10 again |
| 1833 | | | ; | | | |
| 1834 | 149B' | 2A 2055' | ONES: | LHLD | TMPTMP | ; 16 set modified temperature value |
| 1835 | 149E' | EB | | XCHG | | ; 4 save |
| 1836 | 149F' | 2A 205B' | | LHLD | X1 | ; 16 set 1 des offset |
| 1837 | 14A2' | CD 16E5' | | CALL | SUBT | ; 18+??? subtract |
| 1838 | 14A5' | FA 14BB' | | JM | XFER | ; 7/10 result minus |
| 1839 | 14A8' | 22 2055' | | SHLD | TMPTMP | ; 16 save new subtracted temp |
| 1840 | 14AB' | 3A 205F' | | LDA | ONECNT | ; 13 set ones count |
| 1841 | 14AE' | 3C | | INR | A | ; 4 increment |
| 1842 | 14AF' | FE 0A | | CPI | 10 | ; 7 ten? |
| 1843 | 14B1' | C2 14B5' | | JNZ | ONES1 | ; 7/10 no |
| 1844 | 14B4' | 3D | | DCR | A | ; 4 make it 9 |
| 1845 | 14B5' | 32 205F' | ONES1: | STA | ONECNT | ; 13 save |
| 1846 | 14B8' | C3 149B' | | JMP | ONES | ; 10 again |
| 1847 | | | ; | | | |
| 1848 | 14BB' | 3A 205D' | XFER: | LDA | ONECNT | ; 13 digit counts to display table |
| 1849 | 14BE' | 32 200D' | | STA | DTAB+3 | ; 13 |
| 1850 | 14C1' | 3A 205E' | | LDA | TENCNT | ; 13 |
| 1851 | 14C4' | 32 200C' | | STA | DTAB+2 | ; 13 |
| 1852 | 14C7' | 3A 205D' | | LDA | HUNCNT | ; 13 |
| 1853 | 14CA' | 32 200B' | | STA | DTAB+1 | ; 13 |
| 1854 | 14CD' | 3E FF | | MVI | A,0FFH | ; 7 |
| 1855 | 14CF' | 32 200A' | | STA | DTAB | ; 13 blank |
| 1856 | 14D2' | 32 205D' | | STA | HUNCNT | ; 13 and clear |
| 1857 | 14D5' | 21 0000 | | LXI | H,0 | ; 10 Ram locations |
| 1858 | 14D8' | 22 205E' | | SHLD | TENCNT | ; 16 set TRIAC output byte |
| 1859 | 14DB' | 3A 2025' | COLOUT: | LDA | TRIOUT | ; 13 set TRIAC output byte |
| 1860 | 14DE' | F6 04 | | ORI | 4 | ; 7 set COLON bit |
| 1861 | 14E0' | 32 2025' | | STA | TRIOUT | ; 13 save |

```
1862  14E3' 32 D000           STA     LEDTRI          ; 13 turn off colon
1863  14E6' C9         RET                            ; 10
1864
1865                          PAGE
1866
1867        ;****************************************************
1868        ;*                                                  *
1869        ;*                    TABLES                        *
1870        ;*                                                  *
1871        ;****************************************************
1872
1873        ; Temperature compare table
1874        ;
1875  14E7' 079B       TMPTBL: DW      079BH           ; 117.5F
1876  14E9' 0729               DW      0729H
1877  14EB' 06B7               DW      06B7H
1878  14ED' 0645               DW      0645H
1879  14EF' 05D3               DW      05D3H
1880  14F1' 0561               DW      0561H
1881  14F3' 04EF               DW      04EFH
1882  14F5' 047D       TMPEND: DW      047DH           ; 82.5F
1883
1884        ; Motor step table
1885        ;
1886  14F7' 01         MST:    DB      0001B           ; First entry in motor step table
1887  14F8' 05                 DB      0101B
1888  14F9' 04                 DB      0100B
1889  14FA' 06                 DB      0110B
1890  14FB' 02                 DB      0010B
1891  14FC' 0A                 DB      1010B
1892  14FD' 08                 DB      1000B
1893  14FE' 09                 DB      1001B           ; Last entry in motor step table
1894
1895        ; LED Bit pattern table
1896        ;
1897  14FF' 7F         LEDTBL: DB      01111111B       ; 7FH
1898  1500' BF                 DB      10111111B       ; BFH
1899  1501' DF                 DB      11011111B       ; DFH
1900  1502' EF                 DB      11101111B       ; EFH
1901  1503' F7                 DB      11110111B       ; F7H
1902  1504' FB                 DB      11111011B       ; FBH
1903  1505' FD                 DB      11111101B       ; FDH
1904  1506' FE                 DB      11111110B       ; FEH
1905
1906                          PAGE
1907
1908        ; Time until auto turn off
1909        ;
1910  1507' 0000       TIMTBL: DW      0000H           ; minutes, seconds
1911
1912
```

```
1913   1509'  0030         DW    0030H
1914   150B'  0100         DW    0100H
1915   150D'  0200         DW    0200H
1916   150F'  0400         DW    0400H
1917   1511'  0600         DW    0600H
1918   1513'  0800         DW    0800H
1919   1515'  1000         DW    1000H
1920   1517'  1200         DW    1200H
1921   1519'  1400         DW    1400H
1922   151B'  1600         DW    1600H
1923   151D'  1800         DW    1800H
1924   151F'  2000         DW    2000H
1925   1521'  2200         DW    2200H
1926   1523'  2400         DW    2400H
1927   1525'  2600         DW    2600H
1928
1929                              PAGE
1930
1931          ;
1932          ; Key decode table
1933          ;
1934          ; normal
1935   1527'  06DF'  DCDTBL: DW   OFF        ; Off
1936   1529'  0638'        DW    ON          ; On
1937   152B'  1239'        DW    SHOWER      ; Shower/Disposal
1938   152D'  1265'        DW    DRAIN       ; Drain
1939   152F'  129B'        DW    TUBFIL      ; Tub fill
1940   1531'  11DC'        DW    T1          ; T1-85F
1941   1533'  1000'        DW    VOLUP       ; Volume up
1942   1535'  10CD'        DW    VOLDWN      ; Volume down
1943   1537'  120D'        DW    HOT         ; Hot
1944   1539'  11D4'        DW    COLD        ; Cold
1945   153B'  12BC'        DW    TMPUP       ; Temperature up
1946   153D'  1313'        DW    TMPDWN      ; Temperature down
1947   153F'  1416'        DW    CAL         ; Calibrate
1948   1541'  11E3'        DW    T2          ; T2-90F
1949   1543'  11EA'        DW    T3          ; T3-95F
1950   1545'  11F1'        DW    T4          ; T4-100F
1951   1547'  062A'        DW    UNDEF       ; S1-spare
1952   1549'  11F8'        DW    T5          ; T5-105F
1953   154B'  11FF'        DW    T6          ; T6-110F
1954   154D'  1206'        DW    T7          ; T7-115F
1955          ; OFF AND ANOTHER KEY
1956   154F'  062A'        DW    INVLD       ; Invalid
1957   1551'  062A'        DW    INVLD       ;    "
1958   1553'  062A'        DW    INVLD       ;    "
1959   1555'  062A'        DW    INVLD       ;    "
1960   1557'  062A'        DW    INVLD       ; Invalid
1961   1559'  062A'        DW    UNDEF       ; Undefined
1962   155B'  1339'        DW    MINSET      ; Time minutes set
```

| Line | Addr | Code | Label | Op | Operand | Comment |
|---|---|---|---|---|---|---|
| 1963 | 1550' | 1352' | | DW | HRSSET | ; Time hours set |
| 1964 | 155F' | 062A' | | DW | UNDEF | ; Undefined |
| 1965 | 1561' | 062A' | | DW | UNDEF | ; " |
| 1966 | 1563' | 062A' | | DW | UNDEF | ; " |
| 1967 | 1565' | 062A' | | DW | UNDEF | ; " |
| 1968 | 1567' | 062A' | | DW | UNDEF | ; " |
| 1969 | 1569' | 062A' | | DW | UNDEF | ; " |
| 1970 | 156B' | 062A' | | DW | UNDEF | ; " |
| 1971 | 156D' | 062A' | | DW | UNDEF | ; " |
| 1972 | 156F' | 062A' | | DW | UNDEF | ; " |
| 1973 | 1571' | 062A' | | DW | UNDEF | ; " |
| 1974 | 1573' | 062A' | | DW | UNDEF | ; " |
| 1975 | 1575' | 062A' | | DW | UNDEF | ; Undefined |
| 1976 | | | | | | |
| 1977 | | | | | | PAGE |
| 1978 | | | | | | |
| 1979 | | | ; TF (TUB FILL) AND ANOTHER KEY | | | |
| 1980 | | | | | | |
| 1981 | 1577' | 062A' | | DW | INVLD | ; Invalid |
| 1982 | 1579' | 062A' | | DW | INVLD | ; " |
| 1983 | 157B' | 062A' | | DW | INVLD | ; " |
| 1984 | 157D' | 062A' | | DW | INVLD | ; " |
| 1985 | 157F' | 062A' | | DW | INVLD | ; Invalid |
| 1986 | 1581' | 13BF' | | DW | TFT1 | ; Tub fill to T1 |
| 1987 | 1583' | 1408' | | DW | ONHRST | ; On hours set |
| 1988 | 1585' | 140B' | | DW | ONMNST | ; On minutes set |
| 1989 | 1587' | 13E9' | | DW | TFHOT | ; Tub fill to hot |
| 1990 | 1589' | 13B9' | | DW | TFCOLD | ; Tub fill to cold |
| 1991 | 158B' | 062A' | | DW | UNDEF | ; Undefined |
| 1992 | 158D' | 062A' | | DW | UNDEF | ; " |
| 1993 | 158F' | 062A' | | DW | UNDEF | ; Undefined |
| 1994 | 1591' | 13C5' | | DW | TFT2 | ; Tub fill to T2 |
| 1995 | 1593' | 13CB' | | DW | TFT3 | ; Tub fill to T3 |
| 1996 | 1595' | 13D1' | | DW | TFT4 | ; Tub fill to T4 |
| 1997 | 1597' | 062A' | | DW | UNDEF | ; Undefined |
| 1998 | 1599' | 13D7' | | DW | TFT5 | ; Tub fill to T5 |
| 1999 | 159B' | 13DD' | | DW | TFT6 | ; Tub fill to T6 |
| 2000 | 159D' | 13E3' | | DW | TFT7 | ; Tub fill to T7 |
| 2001 | | | ; ON AND ANOTHER KEY | | | |
| 2002 | 159F' | 062A' | | DW | INVLD | ; Invalid |
| 2003 | 15A1' | 062A' | | DW | INVLD | ; " |
| 2004 | 15A3' | 062A' | | DW | INVLD | ; " |
| 2005 | 15A5' | 062A' | | DW | INVLD | ; " |
| 2006 | 15A7' | 062A' | | DW | INVLD | ; " |
| 2007 | 15A9' | 062A' | | DW | INVLD | ; Invalid |
| 2008 | 15AB' | 062A' | | DW | INVLD | ; Undefined |
| 2009 | 15AD' | 062A' | | DW | INVLD | ; " |
| 2010 | 15AF' | 062A' | | DW | INVLD | ; " |
| 2011 | 15B1' | 062A' | | DW | UNDEF | ; Undefined |
| 2012 | 15B3' | 140E' | | DW | HOTUP | ; Hot and temperature up |

```
2013   15B5'  062A'              DW      UNDEF           ; Undefined
2014   15B7'  062A'              DW      UNDEF           ;    "
2015   15B9'  062A'              DW      UNDEF           ;    "
2016   15BB'  062A'              DW      UNDEF           ;    "
2017   15BD'  062A'              DW      UNDEF           ;    "
2018   15BF'  062A'              DW      UNDEF           ;    "
2019   15C1'  062A'              DW      UNDEF           ;    "
2020   15C3'  062A'              DW      UNDEF           ;    "
2021   15C5'  062A'              DW      UNDEF           ; Undefined
2022
2023                              PAGE
2024
2025                      ;**********************************************
2026                      ;*                                            *
2027                      ;*          SUPPORT SUBROUTINES               *
2028                      ;*                                            *
2029                      ;**********************************************
2030
2031                      ;***   Multiply Routine
2032                      ;***
2033                      ;***          B,C
2034                      ;***      x   H,L
2035                      ;***      ----------
2036                      ;***          H,L,D,E
2037                      ;***
2038                      ;***   Uses all registers
2039                      ;
2040
2041   15C7'  78          MULT:   MOV     A,B             ; 4    set MSB of B,C pair
2042   15C8'  E6 80               ANI     80H             ; 7    set MS Bit - is input negative?
2043   15CA'  CA 15DB'            JZ      MULTA           ; 7/10 no
2044   15CD'  E5                  PUSH    H               ; 13   save H,L
2045   15CE'  60                  MOV     H,B             ; 4    save B
2046   15CF'  69                  MOV     L,C             ; 4    save C
2047   15D0'  CD 1630'            CALL    TBTC            ; 18+52 16 bit 2's compliment
2048   15D3'  44                  MOV     B,H             ; 4    save new B
2049   15D4'  4D                  MOV     C,L             ; 4    save new C
2050   15D5'  E1                  POP     H               ; 10   set H,L back
2051   15D6'  3E 01               MVI     A,1             ; 7    set first param negative flag
2052   15D8'  32 2060'            STA     NEGFLG          ; 13   save
2053   15DB'  7C          MULTA:  MOV     A,H             ; 4    set MSB of H,L pair
2054   15DC'  E6 80               ANI     80H             ; 7    set MS Bit - is input negative?
2055   15DE'  CA 15EC'            JZ      MULTB           ; 7/10 no
2056   15E1'  CD 1630'            CALL    TBTC            ; 18+52 16 bit 2's compliment
2057   15E4'  3A 2060'            LDA     NEGFLG          ; 13   set input negative flag
2058   15E7'  F6 02               ORI     2               ; 7    set second param negative flag
2059   15E9'  32 2060'            STA     NEGFLG          ; 13   save
2060   15EC'  AF          MULTB:  XRA     A               ; 4    initialize counter
2061   15ED'  57                  MOV     D,A             ; 4    initialize least significant
2062   15EE'  5F                  MOV     E,A             ; 4    part of product
```

```
2063  15EF'  29            MUL1:    DAD    H           ; 10 shift multiplier left
2064  15F0'  1F                     RAR                ;  4 save carry
2065  15F1'  EB                     XCHG               ;  4 swap for shift
2066  15F2'  29                     DAD    H           ; 10 left of product
2067  15F3'  D2 15F7'               JNC    MUL2        ;  7/10
2068  15F6'  13                     INX    D           ;  6 add for carry
2069  15F7'  17            MUL2:    RAL                ;  4 unsave carry
2070  15F8'  D2 1600'               JNC    MUL3        ;  7/10
2071  15FB'  09                     DAD    B           ;  6 add in multiplicand
2072  15FC'  D2 1600'               JNC    MUL3        ;  7/10
2073  15FF'  13                     INX    D           ;  6 add for carry
2074  1600'  EB            MUL3:    XCHG               ;  4 swap back
2075  1601'  C6 10                  ADI    10H         ;  7 increment counter
2076  1603'  D2 15EF'               JNC    MUL1        ;  7/10 loop 16 times
2077  1606'  3A 2060'               LDA    NEGFLG      ; 13 set input negative flag
2078  1609'  B7                     ORA    A           ;  4 any?
2079  160A'  CA 1615'               JZ     MULEND      ;  7/10 no
2080  160D'  FE 03                  CPI    3           ;  7 both?
2081  160F'  CA 1615'               JZ     MULEND      ;  7/10 yes
2082  1612'  CD 161A'               CALL   FBTC        ; 18 Yes - do 32 bit 2's compliment
2083  1615'  AF            MULEND:  XRA    A           ;  4
2084  1616'  32 2060'               STA    NEGFLG      ; 13 clear input negative flag
2085  1619'  C9                     RET                ; 10 multiplication complete
2086
2087                       ; 32 bit 2's compliment conversion of H,L,D,E
2088                       ; 90 states
2089                       ;
2090  161A'  AF            FBTC:    XRA    A           ;  4 clear carry
2091  161B'  7B                     MOV    A,E         ;  4 set low byte
2092  161C'  2F                     CMA                ;  4 compliment
2093  161D'  C6 01                  ADI    1           ;  7 set 2's compliment
2094  161F'  5F                     MOV    E,A         ;  4 restore byte
2095  1620'  7A                     MOV    A,D         ;  4 set next
2096  1621'  2F                     CMA                ;  4 compliment
2097  1622'  CE 00                  ACI    0           ;  7 add any carry
2098  1624'  57                     MOV    D,A         ;  4 restore byte
2099  1625'  7D                     MOV    A,L         ;  4 set next
2100  1626'  2F                     CMA                ;  4 compliment
2101  1627'  CE 00                  ACI    0           ;  7 add any carry
2102  1629'  6F                     MOV    L,A         ;  4 restore byte
2103  162A'  7C                     MOV    A,H         ;  4 set highest byte
2104  162B'  2F                     CMA                ;  4 compliment
2105  162C'  CE 00                  ACI    0           ;  7 add any carry
2106  162E'  67                     MOV    H,A         ;  4 restore byte
2107  162F'  C9                     RET                ; 10 done
2108
2109                       ; 16 bit 2's compliment conversion of H,L
2110                       ; 52 states
2111                       ;
2112  1630'  AF            TBTC:    XRA    A           ;  4 clear carry
```

```
2113  1631'  7D              MOV   A,L           ;  4  set low byte
2114  1632'  2F              CMA                 ;  4  compliment
2115  1633'  C6 01           ADI   1             ;  7  set 2's compliment
2116  1635'  6F              MOV   L,A           ;  4  restore byte
2117  1636'  7C              MOV   A,H           ;  4  set high byte
2118  1637'  2F              CMA                 ;  4  compliment
2119  1638'  CE 00           ACI   0             ;  7  add any carry
2120  163A'  67              MOV   H,A           ;  4  restore byte
2121  163B'  C9              RET                 ; 10  done
2122
2123              PAGE
2124
2125  ;
2126  ;***   Divide Routine
2127  ;***
2128  ;***         H,L,D,E   =  D,E remainder H,L
2129  ;***         ─────────
2130  ;***            B,C
2131  ;***
2132  ;***   Uses all registers.
2133  ;***
2134  ;
2135
2136
2137  163C'  78              DIVIDE: MOV   A,B         ;  4  set MSB of B,C pair
2138  163D'  E6 80                   ANI   80H         ;  7  set MS Bit - is input negative?
2139  163F'  CA 1650'                JZ    DIVA        ; 7/10 no
2140  1642'  E5                      PUSH  H           ; 13  save H,L
2141  1643'  60                      MOV   H,B         ;  4  save B
2142  1644'  69                      MOV   L,C         ;  4  save C
2143  1645'  CD 1630'                CALL  TBTC        ; 18+52 16 bit 2's compliment
2144  1648'  44                      MOV   B,H         ;  4  save new B
2145  1649'  4D                      MOV   C,L         ;  4  save new C
2146  164A'  E1                      POP   H           ; 10  set H,L back
2147  164B'  3E 01                   MVI   A,1         ;  7
2148  164D'  32 2060'                STA   NEGFLG      ; 13  set first param negative flag
2149  1650'  7C              DIVA:   MOV   A,H         ;  4  set MSB of H,L,D,E
2150  1651'  E6 80                   ANI   80H         ;  7  set MS Bit - is input negative?
2151  1653'  CA 1661'                JZ    DIVST       ; 7/10 no
2152  1656'  CD 161A'                CALL  FBTC        ; 18+90 do 32 bit 2's compliment
2153  1659'  3A 2060'                LDA   NEGFLG      ; 13  set negative input flag
2154  165C'  F6 02                   ORI   2           ;  7
2155  165E'  32 2060'                STA   NEGFLG      ; 13  set second param negative flag
2156  1661'  AF              DIVST:  XRA   A           ;  4  Initialize counter
2157  1662'  29              DIVLOP: DAD   H           ; 18  Shift left most significant part of dividend
2158  1663'  F5                      PUSH  PSW         ; 12  Save counter and carry
2159  1664'  EB                      XCHG              ;  4  Shift left
2160  1665'  29                      DAD   H           ; 18   least significant
2161  1666'  EB                      XCHG              ;  4   part of dividend
2162  1667'  D2 166B'                JNC   DIV1        ; 7/10 Carry shift into
```

```
2163                    DIV1:   INX     H               ; 6      most significant part of dividend
2164     166A' 23               MOV     A,L             ; 4      Subtract
2165     166B' 7D               SUB     C               ; 4      divisor
2166     166C' 91               MOV     L,A             ; 4      from
2167     166D' 6F               MOV     A,H             ; 4      most significant
2168     166E' 7C               SBB     B               ; 4      16 bit
2169     166F' 98               MOV     H,A             ; 4      of dividend
2170     1670' 67               JC      DIV3            ; 7/10   Skip if divisor is greater
2171     1671' DA 1679'         POP     PSW             ; 10     Get counter and carry back
2172     1674' F1        DIV2:  INX     D               ; 6      Append "1" to quotient
2173     1675' 13               JMP     DIV4            ; 10
2174     1676' C3 167E'
2175                    DIV3:   POP     PSW             ; 10     Get counter and carry back
2176     1679' F1               JC      DIV2            ; 7/10
2177     167A' DA 1675'         DAD     B               ; 10     Restore dividend
2178     167D' 09               ADI     10H             ; 7      Increment counter
2179     167E' C6 10     DIV4:  JNC     DIVLOP          ; 7/10   loop 16 times
2180     1680' D2 1662'         MOV     A,D             ; 4      checking for zero result
2181     1683' 7A               ORA     E               ; 4
2182     1684' B3               JZ      DIVEND          ; 7/10   result is zero bypass sign check
2183     1685' CA 16A4'         LDA     NEGFLG          ; 13     set input negative flag
2184     1688' 3A 2060'         ORA     A               ; 4      any?
2185     168B' B7               JZ      POSRET          ; 7/10   no
2186     168C' CA 16A9'         CPI     3               ; 7      both?
2187     168F' FE 03            JZ      POSRET          ; 7/10   yes
2188     1691' CA 16A9'         XCHG                    ; 4
2189     1694' EB               CALL    TBTC            ; 18+52  do 16 bit 2's compliment
2190     1695' CD 1630'         XCHG                    ; 4
2191     1698' EB               MOV     A,D             ; 4      checking for overflow
2192     1699' 7A               RAL                     ; 4      MS Bit into carry
2193     169A' 17               JC      DIVEND          ; 7/10   is negative
2194     169B' DA 16A4'         LXI     D,8000H         ; 10     overflow
2195     169E' 11 8000          LXI     H,0             ; 10
2196     16A1' 21 0000  DIVEND: XRA     A               ; 4
2197     16A4' AF               STA     NEGFLG          ; 13     clear input negative flag
2198     16A5' 32 2060'         RET
2199     16A8' C9
2200                    POSRET: MOV     A,D             ; 4      checking for overflow
2201     16A9' 7A               RAL                     ; 4      MS Bit into carry
2202     16AA' 17               JNC     DIVEND          ; 7/10   no overflow
2203     16AB' D2 16A4'         LXI     D,7FFFH         ; 10     positive overflow
2204     16AE' 11 7FFF          LXI     H,0             ; 10
2205     16B1' 21 0000          JMP     DIVEND          ; 10     done
2206     16B4' C3 16A4'
2207
2208                            PAGE
2209
2210                    ;***
2211                    ;***    Add routine
2212                    ;***
2213                                    D,E
```

```
2214  ;***                      +  H,L
2215  ;***                     ———————
2216  ;***                         H,L
2217  ;***
2218  ;*** Positive overflow 7FFFH
2219  ;*** Negative overflow 8000H
2220  ;*** (174 states worst case 69.6 us.)
2221  ;*** uses A and B
2222  ;
2223  ;
2224  16B7'  7A              ADDD:  MOV   A,D           ; 4  set MSB of pair
2225  16B8'  E6 80                  ANI   80H           ; 7  set sign
2226  16BA'  47                     MOV   B,A           ; 4  save
2227  16BB'  7C                     MOV   A,H           ; 4  set MSB of pair
2228  16BC'  E6 80                  ANI   80H           ; 7  get sign
2229  16BE'  A8                     XRA   B             ; 4  if signs diff-MS Bit set
2230  16BF'  17                     RAL                 ; 4
2231  16C0'  17                     RAL                 ; 4  into bit 0
2232  16C1'  32 2060'               STA   NEGFLG        ; 13 save in flag
2233  16C4'  7D                     MOV   A,L           ; 4
2234  16C5'  83                     ADD   E             ; 4       \
2235  16C6'  6F                     MOV   L,A           ; 4        \  add
2236  16C7'  7C                     MOV   A,H           ; 4        /  them
2237  16C8'  8A                     ADC   D             ; 4       /
2238  16C9'  67                     MOV   H,A           ; 4
2239  16CA'  F5                     PUSH  PSW           ; 13 save flags
2240  16CB'  3A 2060'               LDA   NEGFLG        ; 13 get flag
2241  16CE'  B7                     ORA   A             ; 4  signs diff?
2242  16CF'  C2 16E0'               JNZ   COMPL         ; 7/10 yes-go compliment carry
2243  16D2'  F1                     POP   PSW           ; 10 set back flags
2244  16D3'  D2 16DB'        DESC:  JNC   POSITV        ; 7/10 result positive
2245  16D6'  F8              NEGATV: RM                 ; 5/11 result negative
2246  16D7'  21 8000                LXI   H,8000H       ; 10 set overflow
2247  16DA'  C9                     RET                 ; 10 done
2248        ;
2249  16DB'  F0              POSITV: RP                 ; 5/11 result positive
2250  16DC'  21 7FFF                LXI   H,7FFFH       ; 10 set overflow
2251  16DF'  C9                     RET                 ; 10 done
2252        ;
2253  16E0'  F1              COMPL:  POP   PSW          ; 10 set back flags
2254  16E1'  3F                     CMC                 ; 4  compliment carry
2255  16E2'  C3 16D3'               JMP   DESC          ; 10 continue
2256        ;
2257                                PAGE
2258        ;
2259        ;***
2260        ;*** Subtract routine
2261        ;***
2262        ;
2263                                        D,E
```

```
2264                               ;***           -             H,L
2265                               ;***           ---------------
2266                               ;***                          H,L
2267                               ;*** Positive overflow 7FFFH
2268                               ;*** Negative overflow 8000H
2269                               ;*** (167 states worst case 66.8 us.)
2270                               ;***           Uses A and B
2271                               ;
2272                               ;
2273                               ;
2274                               ;
2275  16E5' 7A             SUBT:   MOV     A,D             ; 4  set MSB of pair
2276  16E6' E6 80                  ANI     80H             ; 7  get sign
2277  16E8' 47                     MOV     B,A             ; 4  save
2278  16E9' 7C                     MOV     A,H             ; 4  set MSB of pair
2279  16EA' E6 80                  ANI     80H             ; 7  get sign
2280  16EC' A8                     XRA     B               ; 4  signs diff- MS Bit set
2281  16ED' 17                     RAL                     ; 4
2282  16EE' 17                     RAL                     ; 4  into bit 0
2283  16EF' 32 2060'               STA     NEGFLG          ;13  save in flag
2284  16F2' 7B                     MOV     A,E             ; 4  Subtract low
2285  16F3' 95                     SUB     L               ; 4     order byte
2286  16F4' 6F                     MOV     L,A             ; 4     and put back
2287  16F5' 7A                     MOV     A,D             ; 7  Subtract high
2288  16F6' 9C                     SBB     H               ; 4     order byte
2289  16F7' 67                     MOV     H,A             ; 4     and put back
2290  16F8' F5                     PUSH    PSW             ;13  save flags
2291  16F9' 3A 2060'               LDA     NEGFLG          ;13  set flag
2292  16FC' B7                     ORA     A               ; 4  signs diff?
2293  16FD' C2 1707'               JNZ     COMP1           ;7/10 yes - go compliment sign
2294  1700' F1                     POP     PSW             ;10  set back flags
2295  1701' DA 16D6'                JC     NEGATV          ;7/10 negative result
2296  1704' C3 16DB'               JMP     POSITV          ;10  positive result
2297
2298  1707' F1             COMP1:  POP     PSW             ;10  set back flags
2299  1708' D2 16D6'               JNC     NEGATV          ;7/10 negative result
2300  170B' C3 16DB'               JMP     POSITV          ;10  positive result
2301                               ;
2302                               PAGE
2303                               ;
2304                               ;****************************************************
2305                               ;**                                                **
2306                               ;**            RAM DEFINITIONS                     **
2307                               ;**                                                **
2308                               ;****************************************************
2309                               ;
2310                                       ORG     RAM
2311                               ;
2312                               ;***
2313
```

```
                ;***    Uninitialized storage
                ;***
                ;
2000'           NKEY:   DS      5       ; Keyboard input table
2005'           DBKEY:  DS      5       ; Debounced keyboard input table
200A'           DTAB:   DS      4       ; Display output table
200E'           TMPERR: DS      2       ; Present temperature error
2010'           DIFERR: DS      2       ; Differential error
2012'           TMP:    DS      2       ; Present temperature
2014'           SPER:   DS      2       ; Scaled proportional error
2016'           SDER:   DS      2       ; Scaled differential error
2018'           SIER:   DS      2       ; Scaled integral error
201A'           CERR:   DS      2       ; Composite error
201C'           STEPS:  DS      2       ; Number of steps for correction
201E'           STPBYT: DS      1       ; Save of output to stepper motor
                ;
                ;***    Initialized storage
                ;***
                ;
201F' 0443      TMPAVG: DW      0443H   ; Average temperature
2021' 10        MCFLW:  DB      10H     ; Memory cold flow rate
2022' 10        MHFLW:  DB      10H     ; Memory hot flow rate
2023'           MTMP:   DS      2       ; Memory temperature
2025' 01        TRIOUT: DB      01H     ; TRIAC Output storage word
2026'           SWS:    DS      1       ; Option switch storage
                ;                       Bit 0 - Time on time 0    Switch 8
                ;                           1 - Time on time 1           7
                ;                           2 - Time on time 2           6
                ;                           3 - Time on time 3           5
                ;                           4 - Stepper                  4
                ;                           5 - Memory mode              3
                ;                           6 - Shower - 1=1             2
                ;                           7 - F/C  -  1=F  0=C  Switch 1
                        PAGE
                ;
                ;***    Set storage area
                ;***
                ;
2027'           SSET:
2027' FF        CPOS:   DB      0FFH    ; Cold valve position
2028' FF        HPOS:   DB      0FFH    ; Hot valve position
2029' FF        CDIFF:  DB      0FFH    ; Cold valve step difference
202A' FF        HDIFF:  DB      0FFH    ; Hot valve step difference
202B' FF        CDIR:   DB      0FFH    ; Cold valve step direction  1 = closing
202C' FF        HDIR:   DB      0FFH    ; Hot valve step direction   1 = closing
202D'           TFTEMP: DS      2       ; Tub fill temperature
202F'           TFTIME: DS      2       ; Tub fill time
2031'           OFFTIM: DS      2       ; Off time
```

```
NSET:
;
;***    Zeroed storage area
;***
;***
;
SZERO:
RTC:     DS  1    ; Real time clock counter
TUT:     DS  1    ; Temperature control loop update counter
TST:     DS  1    ; Temperature sample update counter
TRRL:    DS  2    ; Temperature requested rate limited
TR:      DS  2    ; Temperature requested
SEC:     DS  1    ; Seconds
MIN:     DS  1    ; Minutes
HRS:     DS  1    ; Hours
AMPM:    DS  1    ; AM/PM flag
ERRFLG:  DS  1    ; Error display flag
DFL:     DS  1    ; Display flag
ONFL:    DS  1    ; On flag
TMFLG:   DS  1    ; Time set flag
TOFF:    DS  1    ; Time to turn off counter
BZCNT:   DS  1    ; Buzzer counter
IGTMP:   DS  1    ; Ignore temp  bit 0 set - ignore temp loop
                  ;              6 set - done once
;                 ;              7 set - hot requested
MIGTMP:  DS  1    ; Memory ignore temp flag
DRCNT:   DS  1    ; Drain counter
SHWFLG:  DS  1    ; Shower flag
DUNFLG:  DS  1    ; Done once flag
DRNFLG:  DS  1    ; Drain flag
CALFLG:  DS  1    ; Calibrate flag
DWNFLG:  DS  1    ; Volume down flag
TINT:    DS  1    ; Time initialized flag
DFF:     DS  1    ; Display flash flag
TMPNKEY: DS  1    ; Temporary newkey storage
KYPRSD:  DS  1    ; Single key pressed flag
MULTI:   DS  1    ; Multiple key pressed flag
KEYNO1:  DS  1    ; Key #1 offset storage for decode
KEYNO2:  DS  1    ; Key #2 offset storage for decode
LSTMPE:  DS  2    ; Last temperature error
TMPTMP:  DS  2    ; Temporary temperature storage
X100:    DS  2    ; 100 deg subtraction value
X10:     DS  2    ; 10 deg    "      "       "
X1:      DS  2    ; 1 deg     "      "       "
HUNCNT:  DS  1    ; Hundred counter
TENCNT:  DS  1    ; Tens counter
ONECNT:  DS  1    ; Ones counter
NEGFLG:  DS  1    ; Math negative value input flag
TOTPOS:  DS  2    ; Position total from both valves
VALVOP:  DS  1    ; Total # of steps valves open
```

```
2415                     VOLHUN:  DS    1        ; Open recent (hundreds)
2416                     VOLTEN:  DS    1        ;              (tens)
2417                     VOLONE:  DS    1        ;              (ones)
2418                     INTERR:  DS    2        ; Integral error before scaling
2419                     PWROFF:  DS    1        ; Power fail flag
2420                     HOTFLG:  DS    1        ; Hot and Temperature up flag
2421                     NZERO:
2422                     ;
2423              206B'  OFFSET:  DS    1        ; valve closure offset X 2
2424              206C'  HOFFST:  DS    1        ; hot offset on on
2425              206D'  COFFST:  DS    1        ; cold offset on on
2426              206E'  RATE:    DS    1        ; rate increment
2427              206F'  KP:      DS    1        ; propotional loop constant
2428              2070'  KI:      DS    2        ; integral constant
2429              2072'  KD:      DS    2        ; differential constant
2430                     ;
2431              2100'  STACK:   ORG   RAM+256
2432                              PAGE
2433
2434
2435
2436                     ;*******************************************
2437                     ;**                                       **
2438                     ;**        DIP SWITCH POSITIONS           **
2439                     ;**                                       **
2440                     ;*******************************************
2441                     ;
2442                     ; Time until auto shut-off
2443                     ;
2444                     ; Time until ! Switch no.                         !
2445                     ; turn-off   !  8  !  7  !  6  !  5  !
2446                     ;
2447                     ; Infinite   ! On  ! On  ! On  ! On  !
2448                     ;
2449                     ; 00.30      ! Off ! On  ! On  ! On  !
2450                     ;
2451                     ; 01.00      ! On  ! Off ! On  ! On  !
2452                     ;
2453                     ; 02.00      ! Off ! Off ! On  ! On  !
2454                     ;
2455                     ; 04.00      ! On  ! On  ! Off ! On  !
2456                     ;
2457                     ; 06.00      ! Off ! On  ! Off ! On  !
2458                     ;
2459                     ; 08.00      ! On  ! Off ! Off ! On  !
2460                     ;
2461                     ; 10.00      ! Off ! Off ! Off ! On  !
2462                     ;
2463                     ; 12.00      ! On  ! On  ! On  ! Off !
2464                     ;
2465                     ; 14.00      ! Off ! On  ! On  ! Off !
```

| | 4 | 3 | 2 | 1 | |
|---|---|---|---|---|---|
| 2466 | | | | | |
| 2467 | 16.00 | On | Off | On | Off |
| 2468 | | | | | |
| 2469 | 18.00 | Off | On | Off | Off |
| 2470 | | | | | |
| 2471 | 20.00 | On | On | Off | Off |
| 2472 | | | | | |
| 2473 | 22.00 | Off | Off | Off | Off |
| 2474 | | | | | |
| 2475 | 24.00 | On | Off | Off | Off |
| 2476 | | | | | |
| 2477 | 26.00 | Off | Off | Off | Off |
| 2478 | | | | | |
| 2479 | PAGE | | | | |
| 2480 | | | | | |
| 2481 | Other optins | | | | |
| 2482 | | | | | |
| 2483 | Switch position | Switch no. 4 | 3 | 2 | 1 |
| 2484 | | | | | |
| 2485 | ON | valve option | not memory mode | not shower mode | display degrees C |
| 2486 | | | | | |
| 2487 | OFF | valve option | memory mode | shower mode | display degrees F |
| 2488 | | | | | |
| 2489 | END | | | | |

Macros:
RIM        SIM

Symbols:
| | | | | | | |
|---|---|---|---|---|---|---|
| ADDD | 16B7' | AMPM | 203D' | BLNKTM | 06B3' | BUZDUN 12F7' |
| BUZZER | 107B' | BZCNT | 2043' | CAL | 1416' | CALFLG 204A' |
| CDIFF | 2029' | CDIR | 202B' | CERR | 201A' | CHGDR1 10A2' |
| CHGDR2 | 10C3' | CHGDR3 | 1136' | CHGDR4 | 1158' | CHGDR1 029F' |
| CLD2 | 02A6' | COFFMN | 0296' | COFFST | 206D' | CLD1 11D4' |
| COLDIG | 0318' | COLONB | 00FB | COLOUT | 14DB' | COMP1 1707' |
| COMPL | 16E0' | CPOS | 2027' | DBKEY | 2005' | DCDTBL 1527' |
| DECODE | 0527' | DESC | 16D3' | DFF | 204D' | DFL 203F' |
| DIFERR | 2010' | DIFERT | 00B0' | DISPO | B003 | DISP1 B001 |
| DISP2 | B002 | DISP3 | B003 | DISPLY | 1309' | DISPOS 1261' |
| DIV1 | 1650' | DIV2 | 1675' | DIV3 | 1679' | DIV4 167E' |
| DIVA | 1661' | DIVEND | 16A4' | DIVIDE | 163C' | DIVLOP 1662' |
| DIVST | 1663' | DLY | 05FC' | DNCOLD | 110B' | DOFFT 01BC' |
| DOIT | 121A' | DOIT1 | 121B' | DRAIN | 1265' | DRCNT 2046' |
| DRNFLG | 2049' | DRNLED | 00FD | DRNOFF | 1289' | DSUB1 111F' |

| Symbol | Addr | Symbol | Addr | Symbol | Addr |
|---|---|---|---|---|---|
| DSUB2 | 1141' | DSVALV | 1053' | DTAB | 200A' | DTST | 00EF' |
| DUNFLG | 2048' | DUNVOL | 104A' | DV1 | 1108' | DWNFLG | 204B' |
| ERRDIS | 11BA' | ERRFLG | 203E' | EXEC | 0537' | EXEC1 | 053E' |
| FBTC | 161A' | FIX1 | 0699' | FIX2 | 06A2' | FIX3 | 0649' |
| FOUR | 0562' | GETIME | 0683' | GOTONE | 0568' | GOTTWO | 057C' |
| HDIFF | 202A' | HDIR | 202C' | HOFFMN | 0333' | HOFFST | 206C' |
| HOT | 120D' | HOT1 | 033C' | HOT2 | 0343' | HOTFLG | 206A' |
| HOTSTP | 02BB' | HOTUP | 140E' | HPOS | 2028' | HRS | 203C' |
| HRSA | 1362' | HRSSET | 1352' | HTSMU | 043A' | HUNCNT | 205D' |
| HUNDRD | 1463' | IGTMP | 2044' | INCTMP | 12E6' | INIT | 058F' |
| INITC | 1450' | INTEGR | 009E' | INTERR | 2067' | INVLD | 062A' |
| IS1 | 109B' | IS1A | 10BC' | IS1B | 112F' | IS1C | 1151' |
| IS2 | 10A0' | IS2A | 10C1' | IS2B | 1134' | IS2C | 1156' |
| KD | 2072' | KEY | 04E7' | KEY1 | 04F9' | KEYA | 0500' |
| KEYB | 0501' | KEYC | 0506' | KEYNO1 | 2051' | KEYNO2 | 2052' |
| KEYRET | A003' | KEYSCN | A002' | KI | 2070' | KP | 206F' |
| KYPRSD | 204F' | LED1 | 01E1' | LED2 | 0207' | LED3 | 0210' |
| LED4 | 021A' | LEDS | C000' | LEDTBL | 14FF' | LEDTRI | D000' |
| LSTMPE | 2053' | MAXCHK | 022E' | MCFLW | 2021' | MEM | 06BF' |
| MEMODE | 06B9' | MHFLW | 2022' | MIGTMP | 2045' | MIN | 203B' |
| MINA | 134C' | MINSET | 1339' | MOVDT | 01CF' | MSBZIP | 008F' |
| MST | 14F7' | MTMP | 2023' | MTRSTP | 0220' | MUL1 | 15EF' |
| MUL2 | 15F7' | MUL3 | 1600' | MULEND | 1615' | MULT | 15C7' |
| MULTA | 15DB' | MULTB | 15EC' | MULTI | 2050' | NEGATV | 16D6' |
| NEGFLG | 2060' | NKEY | 2000' | NOOFF | 03D9' | NSET | 2033' |
| NZERO | 206B' | OFF | 06DF' | OFFSET | 206B' | OFFTIM | 2031' |
| ON | 0638' | ON1 | 0665' | ONCHEK | 0362' | ONECNT | 205F' |
| ONES | 149B' | ONES1 | 14B5' | ONEVL | 11A3' | ONFL | 2040' |
| ONHRST | 1408' | ONMNST | 140B' | P8155C | A000' | P8155M | 00C3' |
| PEROPN | 1163' | POSITV | 16DB' | POSRET | 16A9' | PROMO | 0000' |
| PROM1 | 1000' | PWRFAL | 06DA' | PWROFF | 2069' | RAM | 2000' |
| RATE | 206E' | RTC | 2033' | RTCINT | 003C' | RTCM | 0109' |
| RTCT | 00FB' | SAVSHW | 125B' | SCAN | 0182' | SCNLP | 018D' |
| SDER | 2016' | SEC | 203A' | SECT | 011C' | SETA | 138F' |
| SETB | 13A2' | SETC | 13A6' | SETD | 13B0' | SETH | 015C' |
| SETIME | 1368' | SETL | 05B6' | SETM | 0147' | SETS | 0132' |
| SHOWER | 1239' | SHWFLG | 2047' | SIER | 2018' | SMU | 03F2' |
| SMU1 | 044C' | SMU2 | 044F' | SMUA | 0407' | SOUND | A002' |
| SOUNDB | 0080' | SPER | 2014' | SSET | 2027' | STACK | 2100' |
| START | 0000' | STEP | 035C' | STEPB | 027E' | STEPS | 201C' |
| STP | 024C' | STPBYT | 201E' | STPMTR | A001' | STUT | 0175' |
| SUBT | 16E5' | SWS | 2026' | SZERO | 2033' | T1 | 11DC' |
| T2 | 11E3' | T3 | 11EA' | T4 | 11F1' | T5 | 11F8' |
| T6 | 11FF' | T7 | 1206' | TBTC | 1630' | TCA | 0455' |
| TCA2 | 0464' | TCA3 | 0480' | TCA4 | 049E' | TCNT | 586A |
| TEMLED | 01DB' | TEMP | EFFF | TEMPIG | 02E2' | TENCNT | 205E' |
| TENS | 147B' | TENS1 | 1495' | TENVL | 1192' | TFCOLD | 13B9' |
| TFDOIT | 13EC' | TFDUN | 1401' | TFHOT | 13E9' | TFT1 | 13BF' |
| TFT2 | 13C5' | TFT3 | 13CB' | TFT4 | 13D1' | TFT5 | 13D7' |
| TFT6 | 13DD' | TFT7 | 13E3' | TFTEMP | 202D' | TFTIME | 202F' |

Symbol table (names and hex addresses):

| Name | Addr | Name | Addr | Name | Addr | Name | Addr |
|---|---|---|---|---|---|---|---|
| TIMDIS | 0397 | TIMHI | | TIMLOW | | A005 | |
| TIMTBL | 1507 | TINT | | TMFLG | | 204C | |
| TMPAVG | 201F | TMPCOM | | TMPDIS | | 12F4 | |
| TMPEND | 14F5 | TMPERR | | TMPNKE | | 200E | |
| TMPTMP | 2055 | TMPUP | | TOFF | | 12BC | |
| TR | 2038 | TRAP | | TRIAC1 | | 0024 | |
| TRIAC3 | 00DF | TRIAC4 | | TRIOUT | | 00BF | |
| TRRL | 2036 | TST | | TSTMAX | | 2035 | |
| TTOFF | 06E6 | TUB1 | | TUBFIL | | 12B3 | |
| TUTM | 0173 | TUTMAX | | TUTR | | 0032 | |
| UNDEF | 062A | UP1 | | UP2 | | 1036 | |
| UPDTMP | 142B | UPSUB1 | | UPSUB2 | | 108B | |
| VALVOP | 2063 | VLVOS1 | | VLVOS2 | | 0020 | |
| VOLHUN | 2064 | VOLONE | | VOLTEN | | 2066 | |
| WFI | 0624 | WFI1 | | X1 | | 0635 | |
| X100 | 2057 | XFER | | ZERINT | | 14BB | |
| ZIP | 055C | | | | | | |

(Right-hand columns, continued:)

| Name | Addr | Name | Addr |
|---|---|---|---|
| A004 | 2041 | TIMOFF | 06A3 |
| 142F | | TMP | 2012 |
| 200E→204E | | TMPDWN | 1313 |
| 2042 | | TMPTBL | 14E7 |
| TRIAC1 00F7 | | TOTPOS | 2061 |
| 2025 | | TRIAC2 | 00EF |
| 0004 | | TRNFAL | 11B2 |
| 129B | | TTOFCK | 03C8 |
| 0168 | | TUT | 2034 |
| 1050 | | TWOPRS | 0543 |
| 10AC | | UPCOLD | 1039 |
| 0040 | | UPTMDS | 038E |
| 205B | | VOLDWN | 10CD |
| 0095 | | VOLUP | 1000 |
| | | X10 | 2059 |
| | | ZERO | 05A8 |

No Fatal error(s)

Cross-reference table:

| Symbol | References |
|---|---|
| ADDD | 188 227 462 730 795 798 1561 2224# |
| AMPM | 321 323 2380# |
| BLNKTM | 1076 1099# |
| BUZDUN | 1451 1563# |
| BUZZER | 1092 1144 1206# 1325 1474 1502 1510 1725 1776 1183 1191 1243 |
| BZCNT | 828 830 1207 1524 1566 2386# |
| CAL | 1768# 1947 |
| CALFLG | 333 773 1775 2395# |
| CDIFF | 246 472 476 561 580 709 1051 1107 1130 1183 1288 1324 2360# |
| | 1286 1322 2358# |
| CDIR | 450 479 559 570 706 1057 1142 1185 1245 1191 |
| CERR | 799 812 2326# |
| CHGDR1 | 1223 1226# |
| CHGDR2 | 1240 1243# |
| CHGDR3 | 1302 1305# |
| CHGDR4 | 1319 1322# |
| CLD1 | 481 508# |
| CLD2 | 489 506 512# |
| COFFMN | 484 502# |
| COFFST | 1002 1050 2425# |
| COLD | 1401# 1944 |
| COLDIG | 556 570# |
| COLONB | 105# |
| COLOUT | 1384 1859# |
| COMP1 | 2293 2298# |
| COMPL | 2242 2253# |
| CPOS | 458 477 512 560 575 1128 1330 2356# |
| DBKEY | 345 838 2318# |

| Symbol | | | | | | | | | |
|---|---|---|---|---|---|---|---|---|---|
| DCDTBL | 862 | | | | | | | | |
| DECODE | 857 | 1935# | | | | | | | |
| DESC | 2244# | 862# | | | | | | | |
| DFF | 289 | 2255 | | | | | | | |
| DFL | 380 | 374 | 2398# | | | | | | |
| DIFERR | 239 | 382 | 383 | 2382# | | | | | |
| DIFERT | 220 | 779 | 2321# | | | | | | |
| DISP0 | 89# | 229# | | | | | | | |
| DISP1 | 90# | 90 | 91 | 92 | 387 | 394 | | | |
| DISP2 | 91# | | | | | | | | |
| DISP3 | 92# | 388 | 396 | | | | | | |
| DISPLY | 1445 | 1543 | 1555 | 1570# | 1589 | 1596 | | | |
| DISPOS | 1470 | 1476# | | | | | | | |
| DIV1 | 2162 | 2164# | | | | | | | |
| DIV2 | 2172# | 2176 | | | | | | | |
| DIV3 | 2170 | 2175# | | | | | | | |
| DIV4 | 2173 | 2178# | | | | | | | |
| DIVA | 2139 | 2149# | | | | | | | |
| DIVEND | 2182 | 2193 | 2196# | 2202 | 2205 | | | | |
| DIVIDE | 762 | 776 | 790 | 809 | 815 | 2137# | | | |
| DIVLOP | 2157# | 2179 | | | | | | | |
| DIVST | 2151 | 2156# | | | | | | | |
| DLY | 990# | 993 | | | | | | | |
| DNCOLD | 1273 | 1283# | 1308 | | | | | | |
| DOFFT | 379 | 383# | | | | | | | |
| DOIT | 1403 | 1407 | 1411 | 1415 | 1419 | 1423 | 1427 | 1431 | 1439# |
| DOIT1 | 1437 | 1440# | | | | | | | |
| DRAIN | 1488# | 1938 | | | | | | | |
| DRCNT | 2391# | | | | | | | | |
| DRNFLG | 1493 | 1497 | 1505 | 2394# | | | | | |
| DRNLED | 104# | | | | | | | | |
| DRNOFF | 1495 | 1504# | | | | | | | |
| DSUB1 | 1278 | 1293# | | | | | | | |
| DSUB2 | 1290 | 1310# | | | | | | | |
| DSVALV | 1161 | 1182 | 1192# | 1246 | 1262 | 1285 | 1194 | 1196 | 1198 |
| DTAB | 393 | 395 | 643 | 650 | 653 | 660 | 1518 | 1522 | 1541 |
| | 1849 | 1851 | 1853 | 1855 | 2319# | | 1564 | 1587 | |
| DTST | 174 | 257# | | | | | | | |
| DUNFLG | 859 | 1443 | 1459 | 1463 | 1488 | 1492 | 1379 | 1381 | 1383 |
| | 1653 | 1717 | 1721 | 1768 | 1772 | 2393# | | | 1649 |
| DUNVOL | 1188# | 1291 | | | | | | | |
| DV1 | 1282# | 1299 | | | | | | | |
| DWNFLG | 453 | 494 | 612 | 1268 | 2396# | | | | |
| ERRDIS | 284 | 1375 | 1379# | | | | | | |
| ERRFLG | 288 | 638 | 1386 | 2381# | | | | | |
| EXEC | 869# | 892 | 896 | 900 | | | | | |
| EXEC1 | 872 | 874# | | | | | | | |
| FBTC | 2082 | 2090# | 2152 | | | | | | |
| FIX1 | 1081 | 1084# | | | | | | | |
| FIX2 | 1090# | 1095 | 1097 | | | | | | |

| Name | | | | | | | | | | |
|---|---|---|---|---|---|---|---|---|---|---|
| FIX3 | 1088 | 1094# | | | | | | | | |
| FOUR | 867 | 898# | | | | | | | | |
| GETIME | 1068 | 1070# | | | | | | | | |
| GOTONE | 842 | 904# | | | | | | | | |
| GOTTWO | 907 | 915# | | | | | | | | |
| HDIFF | 243 | 523 | 527 | 567 | 574 | 708 | 1049 | 1105 | 1133 | 1171 | 1179 | 1226 |
| | 1274 | 1282 | 1305 | 2359# | | 715 | 1058 | 1143 | 1173 | 1228 | 1276 | 1307 |
| HDIR | 447 | 530 | 557 | 572 | | | | | | | |
| | 2361# | | | | | | | | | | |
| HOFFMN | 535 | 583# | | | | | | | | | |
| HOFFST | 1000 | 1048 | | | | | | | | | |
| HOT | 1433# | 1943 | 2424# | | | | | | | | |
| HOT1 | 532 | 589# | | | | | | | | | |
| HOT2 | 540 | 587 | 593# | | | | | | | | |
| HOTFLG | 1547 | 1557 | 1759 | 2420# | 511 | 523# | | | | | |
| HOTSTP | 493 | 496 | 499 | 504 | | | | | | | |
| HOTUP | 1758# | 2012 | | | | | | | | | |
| HPOS | 456 | 528 | 562 | 573 | 593 | 1131 | 1327 | 2357# | | | |
| HRS | 310 | 316 | 320 | 620 | 1631 | 1638 | 2379# | | | | |
| HRSA | 1636 | 1638# | | | | | | | | | |
| HRSSET | 1630# | 1963 | | | | | | | | | |
| HTSMU | 717 | 730# | | | | | | | | | |
| HUNCNT | 1815 | 1817 | 1852 | 1856 | 2409# | | | | | | |
| HUNDRD | 1801 | 1810# | 1818 | | | | | | | | |
| IGTMP | 222 | 467 | 491 | 550 | 678 | 1053 | 1109 | 1136 | 1140 | 1166 | 1269 | 1447 |
| | 2387# | | | | | | | | | | |
| INCTMP | 1546 | 1549 | 1556# | | | | | | | | |
| INIT | 155 | 254 | 934# | | | | | | | | |
| INITC | 1792 | 1803# | | | | | | | | | |
| INTEGR | 209 | 213 | 217 | 222# | | | | | | | |
| INTERR | 219 | 226 | 228 | 765 | 2418# | | | | | | |
| INVLD | 1018# | 1956 | 1957 | 1958 | 1959 | 1960 | 1981 | 1982 | 1983 | 1984 | 1985 | 2002 |
| | 2003 | 2004 | 2005 | 2006 | 2007 | 2008 | 2009 | 2010 | | | | |
| IS1 | 1217 | 1222# | | | | | | | | | |
| IS1A | 1234 | 1239# | | | | | | | | | |
| IS1B | 1296 | 1301# | | | | | | | | | |
| IS1C | 1313 | 1318# | | | | | | | | | |
| IS2 | 1219 | 1225# | | | | | | | | | |
| IS2A | 1236 | 1242# | | | | | | | | | |
| IS2B | 1298 | 1304# | | | | | | | | | |
| IS2C | 1315 | 1321# | | | | | | | | | |
| KD | 786 | 788 | 1010 | 2429# | | | | | | | |
| KEY | 634 | 680 | 684 | 741 | 828# | | | | | | |
| KEY1 | 831 | 835# | | | | | | | | | |
| KEYA | 839# | 854 | | | | | | | | | |
| KEYB | 840# | 848 | | | | | | | | | |
| KEYC | 843# | 913 | 923 | | | | | | | | |
| KEYNO1 | 863 | 911 | 2402# | | | | | | | | |
| KEYNO2 | 881 | 921 | 2403# | | | | | | | | |
| KEYRET | 60# | 350 | 976 | 981 | | | | | | | |

| Symbol | | | | | | | | | |
|---|---|---|---|---|---|---|---|---|---|
| KEYSCN | 58# | 59 | | | | | | | |
| KI | 772 | 774 | | | | | | | |
| KP | 759 | 1006 | | | | | | | |
| KYPRSD | 855 | 905 | 2427# | 2428# | | | | | |
| LED1 | 403# | 417 | 909 | | | | | | |
| LED2 | 412 | 415 | 1021 | 2400# | | | | | |
| LED3 | 428 | 430# | 425# | | | | | | |
| LED4 | 423 | 435# | | | | | | | |
| LED5 | 68# | 420 | 432 | | | | | | |
| LEDTBL | 426 | 1898# | | | | | | | |
| LEDTRI | 69# | 436 | 664 | 1202 | 1467 | 1501 | 1509 | 1862 | |
| LSTMPE | 231 | 234 | 2404# | | | | | | |
| MAXCHK | 449 | 453# | | | | | | | |
| MCFLW | 967 | 1106 | 1129 | 2335# | | | | | |
| MEM | 628 | 1104# | | | | | | | |
| MEMODE | 1047 | 1102# | | | | | | | |
| MHFLW | 969 | 1104 | 1132 | 2336# | | | | | |
| MIGTMP | 971 | 1108 | 1137 | 2390# | | | | | |
| MIN | 299 | 305 | 309 | 623 | 632 | 668 | 1613 | 1620 | 1647 | 2378# |
| MINA | 1618 | 1620# | | | | | | | |
| MINSET | 1610# | 1962 | | | | | | | |
| MOVDT | 376 | 385 | 393# | | | | | | |
| MSBZIP | 207 | 215# | | | | | | | |
| MST | 514 | 595 | 1887# | | | | | | |
| MTMP | 965 | 1102 | 1135 | 2337# | | | | | |
| MTRSTP | 447# | | | | | | | | |
| MUL1 | 2063# | 2076 | | | | | | | |
| MUL2 | 2067 | 2069# | | | | | | | |
| MUL3 | 2070 | 2072 | 2074# | | | | | | |
| MULEND | 2079 | 2081 | 2083# | | | | | | |
| MULT | 237 | 813 | 2041# | | | | | | |
| MULTA | 2043 | 2053# | | | | | | | |
| MULTB | 2055 | 2060# | | | | | | | |
| MULTI | 865 | 915 | 919 | 1022 | 2084 | 2148 | 2153 | 2155 | 2183 | 2197 | 2232 | 2240 |
| NEGATV | 2245# | 2295 | 2299 | | 2401# | | | | |
| NEGFLG | 2052 | 2057 | 2059 | 2077 | | | | | |
| | 2283 | 2291 | 2412# | | | | | | |
| NKEY | 344 | 2317# | | | | | | | |
| NOOFF | 670 | 674# | | | | | | | |
| NSET | 956 | 2365# | | | | | | | |
| NZERO | 948 | 2421# | | | | | | | |
| OFF | 1125# | 1376 | 1935 | | | | | | |
| OFFSET | 802 | 1004 | 2423# | 2364# | | | | | |
| OFFTIM | 667 | 1091 | 2364# | | | | | | |
| ON | 1039# | 1936 | | | | | | | |
| ON1 | 1056# | 1112 | | | | | | | |
| ONCHEK | 466 | 500 | 611# | | | | | | |
| ONECNT | 1840 | 1845 | 1848 | 2411# | | | | | |
| ONES | 1824 | 1834# | 1846 | | | | | | |
| ONES1 | 1843 | 1845# | | | | | | | |
| ONEVL | 1351 | 1358# | 1365 | | | | | | |

| | | | | | | | | | | |
|---|---|---|---|---|---|---|---|---|---|---|
| ONFL | 240 | 482 | 497 | 533 | 542 | 613 | 1039 | 1060 | 1125 | 1139 | 1156 | 1257 |
| | 1440 | 1538 | 1584 | 1644 | 2383# | | | | | | |
| ONHRST | 1740# | 1987 | | | | | | | | | |
| ONMNST | 1749# | 1988 | | | | | | | | | |
| P8155C | 56# | 937 | | | | | | | | | |
| P8155M | 134# | 936 | | | | | | | | | |
| PEROPN | 1162 | 1192 | 1263 | 1327# | | | | | | | |
| POSITV | 2244 | 2249# | 2296 | 2300 | | | | | | | |
| POSRET | 2185 | 2187 | 2200# | | | | | | | | |
| PROMO | 34# | 154 | | | | | | | | | |
| PROM1 | 35# | 1148 | | | | | | | | | |
| PWRFAL | 158 | 1123# | 2419# | | | | | | | | |
| PWROFF | 252 | 1124 | 2431 | | | | | | | | |
| RAM | 41# | 2311 | 2426# | | | | | | | | |
| RATE | 712 | 998 | | | | | | | | | |
| RIM | 121# | 268 | 272 | 1159 | 1203 | 1260 | 1655 | 1664 | 1674 | 2372# | |
| RTC | 264 | 271# | | | | | | | | | |
| RTCINT | 171# | | | | | | | | | | |
| RTCM | 266 | 245 | 248 | 255 | 260 | 264# | | | | | |
| RTCT | 242 | 1477 | | | | | | | | | |
| SAVSHW | 1473# | | | | | | | | | | |
| SCAN | 335 | 344# | | | | | | | | | |
| SCNLP | 348# | 363 | | | | | | | | | |
| SDER | 792 | 2324# | | | | | | | | | |
| SEC | 290 | 294 | 298 | 671 | 1077 | 1612 | 2377# | | | | |
| SECT | 282 | 287# | | | | | | | | | |
| SETA | 1651 | 1661# | 1676 | | | | | | | | |
| SETB | 1646 | 1669# | | | | | | | | | |
| SETC | 1663 | 1672# | | | | | | | | | |
| SETD | 1666 | 1668 | 1677# | | | | | | | | |
| SETH | 312 | 319# | | | | | | | | | |
| SETIME | 1610 | 1630 | 1644# | | | | | | | | |
| SETL | 957# | 962 | | | | | | | | | |
| SETM | 301 | 308# | | | | | | | | | |
| SETS | 292 | 297# | | | | | | | | | |
| SHOWER | 1459# | 1937 | | | | | | | | | |
| SHWFLG | 616 | 1435 | 1471 | 1473 | 1544 | 2392# | | | | | |
| SIER | 778 | 797 | 2325# | | | | | | | | |
| SIM | 117# | 198 | 262 | 995 | 1024 | 1388 | | | | | |
| SMU | 693# | | | | | | | | | | |
| SMU1 | 725 | 734 | 739# | | | | | | | | |
| SMU2 | 728 | 737 | 740# | | | | | | | | |
| SMUA | 700 | 704# | | | | | | | | | |
| SOUND | 59# | 832 | 834 | 1208 | 1210 | 1525 | 1527 | 1567 | 1569 | | |
| SOUNDB | 103# | | | | | | | | | | |
| SPER | 764 | 794 | 2323# | | | | | | | | |
| SSET | 955 | 2355# | | | | | | | | | |
| STACK | 171 | 2432# | | | | | | | | | |
| START | 155# | 538 | 585 | 592 | 608# | | | | | | |
| STEP | 525 | 487 | 491# | | | | | | | | |
| STEPB | 474 | | | | | | | | | | |

| | | | | | | | | | | | | |
|---|---|---|---|---|---|---|---|---|---|---|---|---|
| STEPS | 693 | 817 | 2327# | | | | | | | | | |
| STP | 452 | 455 | 467# | | | | | | | | | |
| STPBYT | 251 | 519 | 522 | 604 | 607 | 608 | 943 | 2328# | | | | |
| STPMTR | 57# | 250 | 609 | 942 | | | | | | | | |
| STUT | 328 | 331# | | | | | | | | | | |
| SUBT | 203 | 232 | 411 | 565 | 578 | 718 | 724 | 733 | 805 | 1552 | 1593 | 1598 |
| | 1813 | 1823 | 1837 | 2275# | | | | | | | | |
| SWS | 988 | 1045 | 1063 | 1468 | 1790 | 2339# | | | | | | |
| SZERO | 947 | 2371# | | | | | | | | | | |
| T1 | 1405# | 1940 | | | | | | | | | | |
| T2 | 1409# | 1948 | | | | | | | | | | |
| T3 | 1413# | 1949 | | | | | | | | | | |
| T4 | 1417# | 1950 | | | | | | | | | | |
| T5 | 1421# | 1952 | | | | | | | | | | |
| T6 | 1425# | 1953 | | | | | | | | | | |
| T7 | 1429# | 1954 | | | | | | | | | | |
| TBTC | 702 | 2047 | 2056 | 2112# | 2143 | 2189 | | | | | | |
| TCA | 683 | 752# | | | | | | | | | | |
| TCA2 | 757 | 759# | | | | | | | | | | |
| TCA3 | 770 | 772# | | | | | | | | | | |
| TCA4 | 784 | 786# | | | | | | | | | | |
| TCNT | 133# | 934 | | | | | | | | | | |
| TEMLED | 389 | 400# | | | | | | | | | | |
| TEMP | 83# | 177 | | | | | | | | | | |
| TEMPIG | 471 | 542# | | | | | | | | | | |
| TENCNT | 1826 | 1831 | 1850 | 1858 | 2410# | | | | | | | |
| TENS | 1814 | 1820# | 1832 | | | | | | | | | |
| TENS1 | 1829 | 1831# | | | | | | | | | | |
| TENVL | 1342 | 1349# | 1356 | | | | | | | | | |
| TFCOLD | 1692# | 1990 | | | | | | | | | | |
| TFDOIT | 1693 | 1696 | 1699 | 1702 | 1705 | 1708 | 1711 | 1714 | 1717# | | | |
| TFDUN | 1719 | 1727# | | | | | | | | | | |
| TFHOT | 1716# | 1989 | | | | | | | | | | |
| TFT1 | 1695# | 1986 | | | | | | | | | | |
| TFT2 | 1698# | 1994 | | | | | | | | | | |
| TFT3 | 1701# | 1995 | | | | | | | | | | |
| TFT4 | 1704# | 1996 | | | | | | | | | | |
| TFT5 | 1707# | 1998 | | | | | | | | | | |
| TFT6 | 1710# | 1999 | | | | | | | | | | |
| TFT7 | 1713# | 2000 | | | | | | | | | | |
| TFTEMP | 626 | 1722 | 2362# | | | | | | | | | |
| TFTIME | 619 | 1528 | 2363# | | | | | | | | | |
| TIMDIS | 633 | 638# | 1529 | 1648 | | | | | | | | |
| TIMHI | 62# | | | | | | | | | | | |
| TIMLOW | 61# | 935 | | | | | | | | | | |
| TIMOFF | 1091# | 1100 | | | | | | | | | | |
| TIMTBL | 1066 | 1912# | | | | | | | | | | |
| TINT | 280 | 1654 | 2397# | | | | | | | | | |
| TMFLG | 1657 | 1661 | 1677 | 1679 | 2384# | | | | | | | |
| TMP | 185 | 2322# | | | | | | | | | | |

| Name | | | | | | | | | | | |
|---|---|---|---|---|---|---|---|---|---|---|---|
| TMPAVG | 187 | 196 | 964 | 1449 | 1788 | | | | | | |
| TMPCOM | 1562# | 1599 | | | | | | | | | |
| TMPDIS | 1572 | 1724 | 1728 | 1790# | | | | | | | |
| TMPDWN | 1584# | 1946 | | | | | | | | | |
| TMPEND | 401 | 1883# | | | | | | | | | |
| TMPERR | 204 | 229 | 752 | 2320# | | | | | | | |
| TMPNKE | 2399# | | | | | | | | | | |
| TMPTBL | 1876# | | | | | | | | | | |
| TMPTMP | 1810 | 1820 | 1825 | 1834 | 1839 | | | | | | |
| TMPUP | 1538# | 1760 | 1945 | | | | | | | | |
| TOFF | 2385# | | | | | | | | | | |
| TOTPOS | 463 | 552 | 800 | 2413# | | | | | | | |
| TR | 403 | 627 | 720 | 732 | 739 | 1055 | 1103 | 1134 | 1448 | 1551 | 1558 1562 |
| | 1570 | 1590 | 2376# | | | | | | | | |
| TRAP | 158# | | | | | | | | | | |
| TRIAC1 | 106# | 1499 | | | | | | | | | |
| TRIAC2 | 107# | | | | | | | | | | |
| TRIAC3 | 108# | | | | | | | | | | |
| TRIAC4 | 109# | | | | | | | | | | |
| TRIOUT | 421 | 433 | 435 | 661 | 663 | 973 | 1199 | 1201 | 1464 | 1466 | 1498 1500 |
| | 1506 | 1508 | 1859 | 1861 | 2338# | | | | | | |
| TRNFAL | 181 | 1374# | | | | | | | | | |
| TRRL | 201 | 710 | 740 | 1111 | 1450 | 2375# | | | | | |
| TST | 172 | 176 | 258 | 2374# | | | | | | | |
| TSTMAX | 135# | 175 | | | | | | | | | |
| TTOFCK | 615 | 667# | | | | | | | | | |
| TTOFF | 673 | 1128# | | | | | | | | | |
| TUB1 | 1520 | 1528# | | | | | | | | | |
| TUBFIL | 1518# | 1939 | | | | | | | | | |
| TUT | 324 | 331 | 377 | 545 | 674 | 1042 | 1062 | 2373# | | | |
| TUTM | 326 | 330# | | | | | | | | | |
| TUTMAX | 136# | 330 | | | | | | | | | |
| TUTR | 269 | 285 | 295 | 306 | 317 | 324# | | | | | |
| TWOPRS | 867 | 881# | | | | | | | | | |
| UNDEF | 1019# | 1951 | 1961 | 1964 | 1965 | 1966 | 1967 | 1968 | 1969 | 1970 | 1971 1972 |
| | 1973 | 1974 | 1975 | 1991 | 1992 | 1993 | 1997 | 2011 | 2013 | 2014 | 2015 2016 |
| | 2017 | 2018 | 2019 | 2020 | 2021 | | | | | | |
| UP1 | 1179# | 1220 | 1316 | | | | | | | | |
| UP2 | 1191# | 1237 | 1229 | | | | | | | | |
| UPCOLD | 1170 | 1180# | 1788# | | | | | | | | |
| UPDTMP | 336 | 677 | | | | | | | | | |
| UPSUB1 | 1175 | 1214# | | | | | | | | | |
| UPSUB2 | 1187 | 1231# | | | | | | | | | |
| UPTMDS | 618 | 622 | 625 | 632# | | | | | | | |
| VALVOP | 1163 | 1264 | 1334 | 2414# | | | | | | | |
| VLVOS1 | 137# | 138 | 486 | 510 | 537 | 563 | 576 | 591 | 966 | 968 | 999 1001 |
| | 1328 | 1331 | | | | | | | | | |
| VLVOS2 | 138# | 465 | 1003 | | | | | | | | |
| VOLDWN | 1257# | 1942 | | | | | | | | | |
| VOLHUN | 1197 | 1337 | 1344 | 2415# | | | | | | | |
| VOLONE | 1193 | 1339 | 1362 | 1364 | 2417# | | | | | | |

| | | | | | | | | | | |
|---|---|---|---|---|---|---|---|---|---|---|
| VOLTEN | 1195 | 1338 | 1346 | 1353 | 1355 | 2416# | 1127 | 1158 | 1165 | 1178 | 1190 | 1205 |
| VOLUP | 1156# | 1941 | | | | | 1461 | 1490 | 1530 | 1540 | 1573 | 1586 |
| WFI | 860 | 889 | 917 | 1020# | 1041 | 1044 | 1770 | | | | | |
| | 1211 | 1259 | 1266 | 1281 | 1333 | 1442 | | | | | | |
| | 1621 | 1639 | 1670 | 1729 | 1740 | 1749 | | | | | | |
| WFI1 | 1027# | 1027 | | | | | | | | | | |
| X1 | 1798 | 1808 | 1836 | 2408# | | | | | | | | |
| X10 | 1796 | 1806 | 1822 | 2407# | | | | | | | | |
| X100 | 1794 | 1804 | 1812 | 2406# | | | | | | | | |
| XFER | 1838 | 1848# | | | | | | | | | | |
| ZERINT | 212 | 218# | 224 | | | | | | | | | |
| ZERO | 949# | 954 | | | | | | | | | | |
| ZIP | 885 | 894# | | | | | | | | | | |

We claim:

1. A system for use with a water delivery channel forming a part of a plumbing system for a building or housing structure for delivering water at a selected temperature and flow rate with separate hot and cold water source means through the water delivery channel, the system comprising:

mechanically independent valve means for controlling the flow of hot and cold water to said water delivery channel; temperature sensing means located in said delivery channel; command input means including means for turning said valves on, means for turning said valves off, and means for selecting output water temperatures ranging from a predetermined minimum to a predetermined maximum; data processing means having outputs connected to means for controlling said valve means and having inputs connected to said temperature sensing means, and to said common input means, said data processing means responding to said input means to:

a. produce a predetermined output water volume at said delivery channel upon operation of said command input means; and b. bring the actual output water temperature to the selected output water temperature at said delivery channel while maintaining the output water flow rate at a preselected level.

2. The system of claim 1 wherein said valve means comprises two mechanically independent valve means for hot and cold water respectively, each of said valve means connected to motor means including a member linking the motor means to the valve means for selectively restricting water flow through said valve means.

3. The system of claim 1 or claim 2 further comprising means for continually displaying actual output water temperature.

4. The system of claim 1 or claim 2 wherein said command input means further comprises means for increasing and decreasing output water volume while maintaining output water temperature at a selected predetermined temperature.

5. The system of claim 1 or claim 2 wherein the command input means for water temperature selection changes the temperature incrementally each time the command input means is engaged.

6. A system for use with a water delivery device forming a part of a plumbing system for a building or housing structure having hot and cold water supplies, the system being operative for delivering water at a selected temperature and volume, the system comprising:

a. means forming a water delivery channel;

b. a pair of mechanically independent valve means for hot and cold water respectively, each of said valve means being operable to selectively restrict flow of water to said delivery channel; each of said valve means including motor means having a member movable in a path to control the delivery volume of the corresponding valve means in accordance with the position of the member in its path from ZERO to FULL volume;

c. temperature sensing means located in said delivery channel;

d. a control panel including a series of switches including an ON switch, an OFF switch, and a series of temperature switches arranged in order from COLD to HOT;

e. a digital processor having outputs connected respectively to said motor means, and having inputs connected to said temperature sensing means and to said panel switches, said digital processor including:

(1) means for actuating a preset volume upon operation of any of said temperature switches;

(2) means for determining correspondence between the temperature switch setting and temperature at said delivery channel;

(3) means for actuating a preset volume upon operation of said ON switch;

(4) means for actuating a closed position of said valv means upon operation of said OFF switch; and (5) means for actuating fixed volume during temperature adjustments.

7. The system as set forth in claim 6 further comprising means for displaying sensed temperatures.

8. The system as set forth in claim 7 further comprising means for flashing the sensed temperature during a transient period while a temperature change is being effected.

9. The system as set forth in claim 6 in which said control panel includes an UP volume switch and a DOWN volume switch, and in which said digital processor further includes means responsive to said UP and DOWN volume switches for increasing volume as a function of the time said UP volume switch is actuated and for decreasing volume as a function of the time said DOWN volume switch is actuated.

10. The system as set forth in claim 6 or claim 9 in which said control panel includes an UP temperature switch and a DOWN temperature switch, and in which said digital processor further includes means for incrementally increasing and decreasing the temperature as a function of the number of activations of said UP and DOWN temperature switches, respectively.

* * * * *